United States Patent
Hoffert et al.

(10) Patent No.: US 12,062,757 B2
(45) Date of Patent: Aug. 13, 2024

(54) SYSTEMS AND METHODS FOR A COMPOSITE SOLID-STATE BATTERY CELL WITH AN IONICALLY CONDUCTIVE POLYMER ELECTROLYTE

(71) Applicant: A123 Systems LLC, Novi, MI (US)

(72) Inventors: Wesley Hoffert, Maynard, MA (US); Adriana A. Rojas, Somerville, MA (US); David M. Laughman, Waltham, MA (US); Lucienne Buannic, Arlington, MA (US); Derek C. Johnson, Fort Collins, CO (US); Brian Sisk, Sudbury, MA (US); Brian Chiou, Billerica, MA (US); Thomas Gillooly, Boston, MA (US)

(73) Assignee: A123 SYSTEMS LLC, Novi, MI (US)

( * ) Notice: Subject to any disclaimer, the term of this patent is extended or adjusted under 35 U.S.C. 154(b) by 478 days.

(21) Appl. No.: 16/918,763

(22) Filed: Jul. 1, 2020

(65) Prior Publication Data
US 2021/0005927 A1    Jan. 7, 2021

Related U.S. Application Data

(60) Provisional application No. 62/869,407, filed on Jul. 1, 2019.

(51) Int. Cl.
*H01M 10/0565* (2010.01)
*H01M 4/04* (2006.01)
(Continued)

(52) U.S. Cl.
CPC ..... *H01M 10/0565* (2013.01); *H01M 4/0404* (2013.01); *H01M 4/0435* (2013.01);
(Continued)

(58) Field of Classification Search
None
See application file for complete search history.

(56) References Cited

U.S. PATENT DOCUMENTS

| 8,182,939 B2 | 5/2012 | Kim et al. |
| 9,818,053 B2 | 11/2017 | Alsafadi |
| (Continued) | | |

FOREIGN PATENT DOCUMENTS

| JP | 2012212652 A | 4/2014 |
| KR | 1020160085467 A | 7/2016 |
| (Continued) | | |

OTHER PUBLICATIONS

Kraytsberg et al., Conveying Advanced Li-ion Battery Materials into Practice the Impact of Electrode Slurry Preparation Skills, Adv. Energy Mater. 2016, 6, 1600655. (Year: 2016).*

(Continued)

*Primary Examiner* — Lucas J. O'Donnell
(74) *Attorney, Agent, or Firm* — McCoy Russell LLP

(57) ABSTRACT

Systems and methods are provided for a slurry for coating an electrode structure. In one example, a method may include dispersing, by mixing at one or both of a high shear and a low shear, a solid ionically conductive polymer material in at least a first portion of a solvent to form a suspension, then dispersing, by mixing at the one or both of the high shear and the low shear, one or more additives in the suspension, and then mixing, at the one or both of the high shear and the low shear, a second portion of the solvent with the suspension to form a slurry. As such, the slurry including the solid ionically conductive polymer material may be applied as a coating in a solid-state battery cell, which may reduce resistance to Li-ion transport and improve mechanical stability relative to a conventional solid-state battery cell.

19 Claims, 18 Drawing Sheets

(51) Int. Cl.
  H01M 4/62 (2006.01)
  H01M 10/0585 (2010.01)
  H01M 4/02 (2006.01)
(52) U.S. Cl.
  CPC ........... H01M 4/0471 (2013.01); H01M 4/62 (2013.01); H01M 10/0585 (2013.01); H01M 2004/021 (2013.01); H01M 2300/0082 (2013.01)

(56) References Cited

U.S. PATENT DOCUMENTS

| | | | |
|---|---|---|---|
| 2004/0043295 A1 | 3/2004 | Rodriguez et al. | |
| 2005/0005431 A1 | 1/2005 | Koo et al. | |
| 2009/0087728 A1* | 4/2009 | Less | H01M 50/417 429/129 |
| 2011/0063132 A1 | 3/2011 | Trum | |
| 2013/0078365 A1* | 3/2013 | Mori | B05D 5/12 427/58 |
| 2014/0220233 A1 | 8/2014 | Huang et al. | |
| 2015/0155559 A1 | 6/2015 | Zimmerman et al. | |
| 2015/0280218 A1 | 10/2015 | Zimmerman et al. | |
| 2015/0357644 A1 | 12/2015 | Holme et al. | |
| 2017/0018781 A1 | 1/2017 | Zimmerman | |
| 2017/0092958 A1 | 3/2017 | Zimmerman et al. | |
| 2018/0151914 A1 | 5/2018 | Zimmerman et al. | |
| 2018/0287208 A1 | 10/2018 | Sasaki et al. | |
| 2019/0027780 A1 | 1/2019 | Liu et al. | |
| 2022/0008990 A1* | 1/2022 | Gavrilov | H01M 6/045 |

FOREIGN PATENT DOCUMENTS

| | | | | |
|---|---|---|---|---|
| WO | WO-2012063827 A1 * | 5/2012 | ........ | H01M 10/0562 |
| WO | 2016196873 A1 | 12/2016 | | |
| WO | 2016197098 A1 | 12/2016 | | |

OTHER PUBLICATIONS

English translation—WO-2012063827-A1 (Year: 2012).*
S. Pour et al., Laminar and Slurry Blending Characteristics of a Dual Shaft Impeller System Chemical Engineering Research and Design; vol. 85, Issue 9, 2007, pp. 1305-1313 (Year: 2007).*

Singh, N. et al., "Printable Battery," Scientific Reports, vol. 2, No. 481, Jun. 28, 2012, 6 pages.
Kang, K. et al., "Performance improvements of pouch-type flexible thin-film lithium-ion batteries by modifying sequential screen-printing process," Electrochimica Acta, vol. 138, Aug. 20, 2014, 28 pages.
"Smart Grid Program Final Technical Report: Recovery Act—Solid State Batteries for Grid-Scale Energy Storage," U.S. Department of Energy Website, Award No. DE-OE0000223, Available Online at https://www.energy.gov/sites/prod/files/2016/10/f34/Seeo_SolidStateBatteries_FTR_DE-OE0000223_0_April_2015.pdf, Apr. 2015, 52 pages.
Gaikwad, A. et al., "Recent Progress on Printed Flexible Batteries: Mechanical Challenges, Printing Technologies, and Future Prospects," Energy Technology, vol. 3, No. 5, Apr. 2015, 26 pages.
Kim, S. et al., "Printable Solid-State Lithium-Ion Batteries: A New Route toward Shape-Conformable Power Sources with Aesthetic Versatility for Flexible Electronics," Nano Letters, vol. 15, No. 8, Jul. 15, 2015, 10 pages.
Deng, Z. et al., "Elastic Properties of Alkali Superionic Conductor Electrolytes from First Principles Calculations," Journal of the Electrochemical Society, vol. 163, No. 2, Nov. 5, 2015, 8 pages.
Zhang, J. et al., "Flexible and ion-conducting membrane electrolytes for solid-state lithium batteries: Dispersion of garnet nanoparticles in insulating polyethylene oxide," Nano Energy, vol. 28, Oct. 2016, 18 pages.
Zhang, J. et al., "High-voltage and free-standing poly(propylene carbonate)/Li6.75La3Zr1.75Ta0.25O12 composite solid electrolyte for wide temperature range and flexible solid lithium ion battery," Journal of Materials Chemistry A, vol. 5, No. 10, Feb. 1, 2017, 9 pages.
Schnell, J. et al., "All-solid-state lithium-ion and lithium metal batteries—paving the way to large-scale production," vol. 382, Apr. 2018, 3 pages.
Yang, J. et al., "High-Performance Solid Composite Polymer Electrolyte for all Solid State Lithium Battery Through Facile Microstructure Regulation," Frontiers in Chemistry, vol. 7, No. 31, May 31, 2019, 11 pages.
ISA Korean Intellectual Property Office, International Search Report and Written Opinion Issued in Application No. PCT/US2020/040559, Oct. 21, 2020, WIPO, 12 pages.

* cited by examiner

SYSTEMS AND METHODS FOR A COMPOSITE SOLID-STATE BATTERY CELL WITH AN IONICALLY CONDUCTIVE POLYMER ELECTROLYTE

CROSS REFERENCE TO RELATED APPLICATIONS

The present application claims priority to U.S. Provisional Application No. 62/869,407, entitled "SYSTEMS AND METHODS FOR A COMPOSITE SOLID-STATE BATTERY CELL WITH AN IONICALLY CONDUCTIVE POLYMER ELECTROLYTE," and filed on Jul. 1, 2019. The entire contents of the above-identified application are hereby incorporated by reference for all purposes.

FIELD

The present description relates generally to systems and methods for a solid-state battery cell including an ionically conductive polymer material.

BACKGROUND AND SUMMARY

The energy density of a secondary battery is an important figure of merit as it describes how much work can be performed per unit mass or volume when calculated in gravimetric or volumetric terms, respectively. In the context of automotive applications these measures matter as they dictate the distance a car can travel before requiring charging relative to how much of the car's total mass or volume is dedicated to the module responsible for the car's energy reserves.

The energy density of a composite energy storage device is influenced by the electrode active material's theoretical gravimetric or volumetric capacity as well as the amount of electrode active material contained there within, by mass or by volume. Furthermore, the packing efficiency of the materials including the energy storage device influence the energy density whereby inefficiencies are realized in the form of porosity or free volume, which for a given capacity, manifests in the form of increased volume, or in the case of fixed volume, results in decreased capacity. Porosity or free volume arising from inefficient packing also has the effect of increased resistance, as voids within the electrode or electrolyte layers disrupt pathways along which charged species travel. With increasing internal resistance the power characteristics of a battery diminish leading to poor performance when high charge or discharge rates are required. In the context of conventional lithium ion batteries a given degree of porosity can be accepted and may even be of functional interest as this space is infiltrated with liquid electrolyte to facilitate transport of lithium ions from the active material of one electrode to another. While this medium of ion transport provides high levels of mobility for the lithium ions, it presents the disadvantage of being highly flammable, resulting in safety concerns in the context of automotive or other transport applications.

It is the desire to eliminate risks associated with the flammability of the liquid electrolyte component of conventional lithium ion batteries that leads to the interest to replace the liquid electrolyte with a solid state electrolyte, the consequence of which being the need to eliminate any non-functional free volume from within the totality of the battery structure to optimize performance characteristics described above. Solid state electrolytes exist in many forms, including inorganic oxides and sulfides, and organic materials including a continuum from those of gel-polymer to solid polymer in form, as an example.

The inventors have recognized the above issues and have determined solutions to at least partially address them. To achieve a dense structure including a population of particulate materials, including but not limited to subpopulations of electrode active material, solid polymer electrolyte, conducting additives, binder, as well as other organic and inorganic components of a functional or passive nature, the inventors have recognized the particle size distributions of the individual components and their relative percentages of the total solid volume may be carefully selected. These criteria facilitate optimization of both the inter-particle packing and their distributions relative to one another so as to preserve the functionality of the component materials. In addition to the a priori design of the particulate populations both in isolation and in combination with one another it is paramount that the processes by which these materials are combined be taken into consideration as they influence both the size as well as the proximal distribution of the materials in composite form. Aspects of the process by which constituent materials are combined include agents introduced to facilitate mixing and forming, the sequence by which the component populations are combined, and the methods by which components including the mixtures therefrom are manipulated.

The design criteria and manufacturing methods for each layer of the energy storage device may vary depending on the functionality required from the individual layers. As an example, an electrode, including a mixture of powders of electrode active material, solid state electrolyte, and conducting additive, among other components, may, for some applications, be configured on the basis of a population of electrode active particles amongst a population a smaller solid state electrolyte and conducting additive particles. In such a configuration, particle size and distribution parameters may be selected to provide the layer with low porosity while also establishing percolative networks of the solid state electrolyte and conducting additive to support ionic and electronic conduction, respectively. To satisfy the functionality requirements of an electrode layer the design must maximize the energy content by establishing a dominant population of electrode active material with the solid state electrolyte and the conducting additive interspersed in a continuous phase such that connectivity between electrode active particle interstices may achieved. Within this context the volume occupied by the solid state electrolyte and conducting additive particles may be sufficient to wedge the electrode active material particles apart to provide percolation pathways without introducing unnecessary void space or occupying an excessive percentage of the solid volume so as to limit the layer's realized electrochemical capacity. To satisfy such configurational and performance criteria the population of electrode active material may be designed to establish a dominant phase on the basis of a larger particle size, with a concomitant population of smaller particles occupying a portion of the free volume between the electrode active material large particles. The size distribution and relative percentage of the populations of the other components may be processed to situation in a connected network amongst the larger electrode active material particulate population.

By contrast, the unique functionality of the separator dictates a different set of design criteria whereby it may provide the lowest possible resistance for lithium transport between electrodes while also serving as a mechanical barrier between said electrodes to prevent the occurrence of shorting. The resistance to lithium transport between electrodes may be minimized by formulating the electrolyte layer, which in this case may also act as a separator, out of materials possessing high lithium conductivity values. The resistance to lithium migration may also be reduced by increasing the contact area between the electrode layers and the electrolyte as well as by reducing the thickness of the electrolyte layers. Additionally, configuration of particles forming the electrolyte layer so as to reduce the tortuosity of the path the lithium ions follow from one electrode to another may decrease the resistance of the electrolyte/separator layer. Absent the requirement that the solid electrolyte must fit into the voids between electrode active materials, as may be the case for the electrode layers, the particle size distributions for the design of an optimized electrolyte layer may be different from that selected for the electrode layer(s).

The method of differential tuning of the size distributions and relative fractions of component materials in the electrode and electrolyte layers may provide opportunities for further configurational optimization by insertion of interfacial layers between the electrolyte layer and the electrode layers to facilitate matching of these layers in the most effective fashion. As an example the particle size distribution of solid electrolyte in the interface layer between an electrode and the electrolyte layers may be tuned to accommodate the surface morphology of the electrode layer to provide an optimum balance between the design criteria motivating the minimization of interfacial void space while also reducing the tortuosity of the percolation network providing connectivity between the boundaries of the electrode layers and the electrolyte layer.

The nature by which the optimal design of each layer of a battery may lead to significant differences between the layers requires particular flexibility in the manufacturing processes to realize each of these layers maximum potential functionality in combined form. In addition to identifying methods of manufacturing that accommodate this required flexibility, significant tuning of the parameters defining how each of these techniques is deployed constitutes a significant and non-intuitive challenge to the practitioner tasked with the manufacturing of solid state batteries therefrom. Described herein are methods to fabricate solid state batteries, their component layers and the mixtures and materials from which they are derived.

As one example and as detailed herein, a coated hybrid electrode is presented which provides at least some of the solutions described above. In one example, a method for forming a slurry may include dividing a solvent into portions, in accordance with a step ordering, mixing a solid ionically conductive polymer material, for example, formed from a polyphenylene sulfide or liquid crystal polymer, the solid ionically conductive polymer material having an ionic conductivity greater than $1 \times 10^{-5}$ S/cm at room temperature, and where the solid ionically conductive polymer material is in a glass state at room temperature, in a first portion of the solvent to form a suspension, wherein the first portion of the solvent is approximately half of an overall solvent content, mixing a first additive in the suspension, and following the mixing the first additive in the suspension, mixing a second portion of the solvent with the suspension to form a slurry having a solid content between 25 and 80 wt. %, a d50 particle size distribution of less than 30 μm, a Hegman gauge of less than 90 μm, and a viscosity between 500 and 2800 cps at 85 Hz, wherein mixing includes mixing at a high shear and mixing at a low shear, where the low shear is between 10 and 55 rpm. In this way, a slurry may be applied as a coating on an electrode structure which may achieve, relative to conventional solid-state batteries, reduced porosity from an optimized particle distribution and improved percolation networks from selectively staged component introduction during the formation process. Further, utilizing the solid ionically conductive polymer material may further reduce resistance to Li-ion transport and improve mechanical stability in a battery cell including the coated electrode structure.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1A:
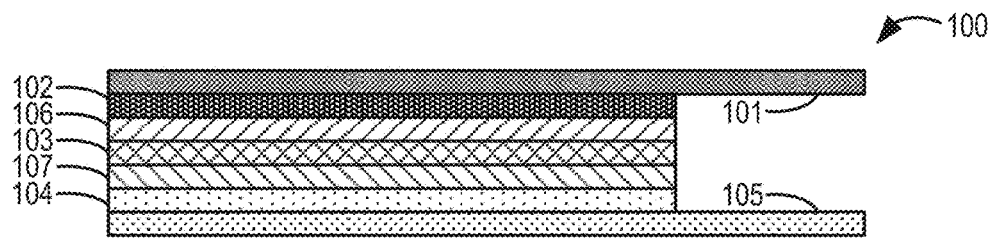
FIG. 1A shows a schematic structural diagram of a first example configuration of a coated hybrid electrode.

The following description relates to systems and methods for a solid-state battery cell including an ionically conductive polymer material as an electrolyte. Specifically, the ionically conductive polymer material may be a solid ionically conducting powder, such as the solid, ionically conductive polymer material U.S. Patent Application Publication No. 2017/0018781, International Patent Publication No. 2016/196873, and U.S. Patent Application Publication No. 2017/0005356 the contents of which are incorporated herein by reference, and such as the solid ionically conducting powder produced by Ionic Materials Inc. of Woburn, Massachusetts. The solid ionically conductive polymer material may be synthesized from: a polymer, a dopant and an ionic compound. The base polymer may be semicrystalline or fully crystalline. Typical materials that may be used for the base polymer include liquid crystal polymers and polyphenylene sulfide, also known as PPS, or a semi-crystalline polymer with a crystallinity index greater than 30%, or greater than 50%. Candidate liquid crystal polymer materials for the base polymer may include copolymers of p-hydroxybenzoic acid. Other candidate base polymers include poly(p-phenylene oxide), polyether ether ketone, polyphthalamide, polypyrrole, polyaniline, polysulfone, copolymers including monomers of the listed materials, and mixtures thereof. The solid ionically conducting material may be a thermoplastic. The solid ionically conducting material is conductive in the glassy state. The dopant is an electron acceptor, and may be DDQ, TONE, chloranil, oxygen, ozone and sulfur trioxide ($SO_3$). The ion source or "ionic compounds" may include salts typically used in lithium ion batteries or other battery systems, such as LiTFSI (lithium bis-trifluoromethanesulfonimide), LiFSI (lithium bis(fluorosulfonyl)imide), lithium bis(oxalato)borate ($LiB(C_2O_4)_2$, "LiBOB") and other lithium ionic compounds and combinations thereof. Specifically, the solid ionically conductive polymer material may have an ionic conductivity greater than $1\times10^{-5}$ S/cm at room temperature and a glassy state at room temperature. As such, the ionically conductive polymer material may have high room-temperature ionic conductivity and may be incorporated into various coatings of the solid-state battery cell for electrochemical stability in a tunable and electrode-specific manner. Further, the ionically conductive polymer material may retain a form of a solid powder which may be insoluble in typically employed solvents. The ionically conductive polymer material may therefore provide tuning/reduction of interfacial impedance by varying a particle size distribution, particle morphologies, relative volume percentages, etc. Other solid polymer materials with similar functionality and properties may be substituted within the scope of this disclosure.

As described in more detail, and as used herein, a battery may include an electrochemical storage device capable of converting chemical energy into electrical energy. A secondary battery may include a battery, which upon reaching a discharged state, that can be returned to the charged state by application of an external current or voltage according to a given set of specified criteria. A battery may include a number of cells that are configured in electrical combination with one another. Each cell may include at least two electrode layers and a separator layer. Each of the electrodes may contain electrode active materials. The positive electrode active layer may be referred to as the cathode. The negative electrode active layer may be referred to as the anode.

Further, as described in more detail herein as to the processes, the separator layer may be referred to as the separator. The separator layer may be responsible for preventing contact between the cathode and anode layers as well as facilitating the transport of ionic species between electrodes while inhibiting the transport of electronic species between electrodes.

The separator layer may contain an ion conducting polymer, specifically a solid ionically conductive polymer material, such as a material having an ionic conductivity greater than $1\times10^{-5}$ S/cm at room temperature and a crystallinity index of at least about 30%, where the material is in a glass state at room temperature, and formed from a polyphenylene sulfide polymer or a liquid crystal polymer. As used herein, "about" or "approximately" when referring to a numerical value may encompass a deviation of 5% or less.

It should be appreciated that external electrical contact to the electrodes may be established with current collectors onto which the electrode layers are coated during the manufacturing process.

Additional layers may be introduced to the cell structure to improve the interface between the electrode layers and the separator or current collector layer. As described, each layer of a cell's structure may be described by its components. For the purpose of consistency, the following convention has been adopted throughout this disclosure for describing the entirety of a composite layer:

Composite(Total)=Component A+Component B+Component C+Component D, where
    Component A: electrode active material;
    Component B: solid polymer electrolyte material, or ion conducting solid state polymer;
    Component C: free volume; and
    Component D: all other materials used in the formulation of slurries and manufacture of layers, including:
        D1: a binder material(s),
        D2: an electronic conductor or conducting additive,
        D3: a surfactant,
        D4: a solvent,
        D5: ceramic ionic conductors (for the reduction of impedance),
        D6: inorganic ceramics (for the enhancement of mechanical integrity),
        D7: lithium salt(s), and
        D8: ionically conducting additives.

Figure 1B:
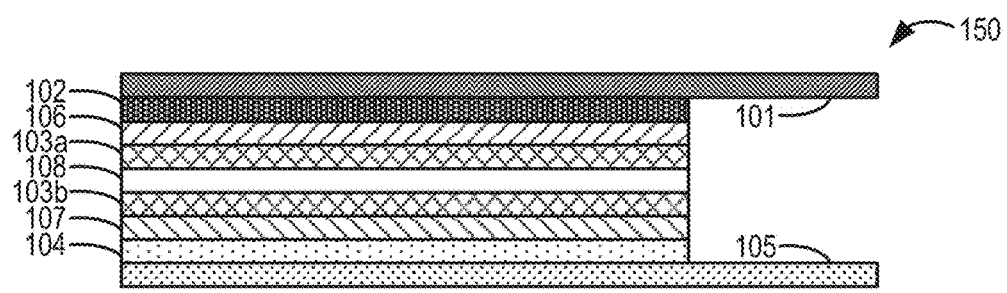
FIG. 1B shows a schematic structural diagram of a second example configuration of the coated hybrid electrode.
Figure 2:
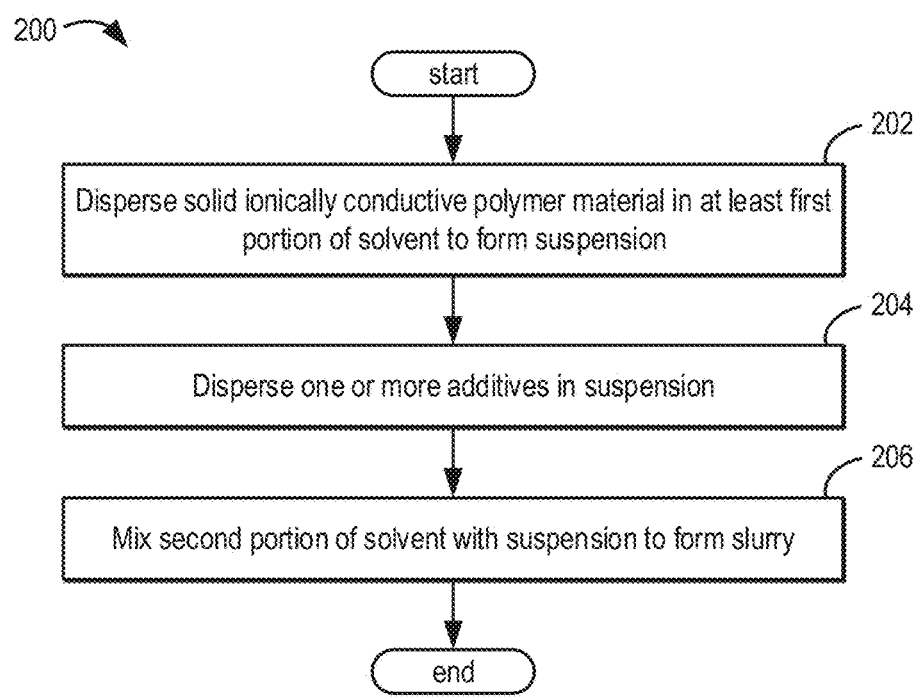
FIG. 2 shows a first example method for forming a slurry for applying a coating to an electrode structure.
Figure 3:
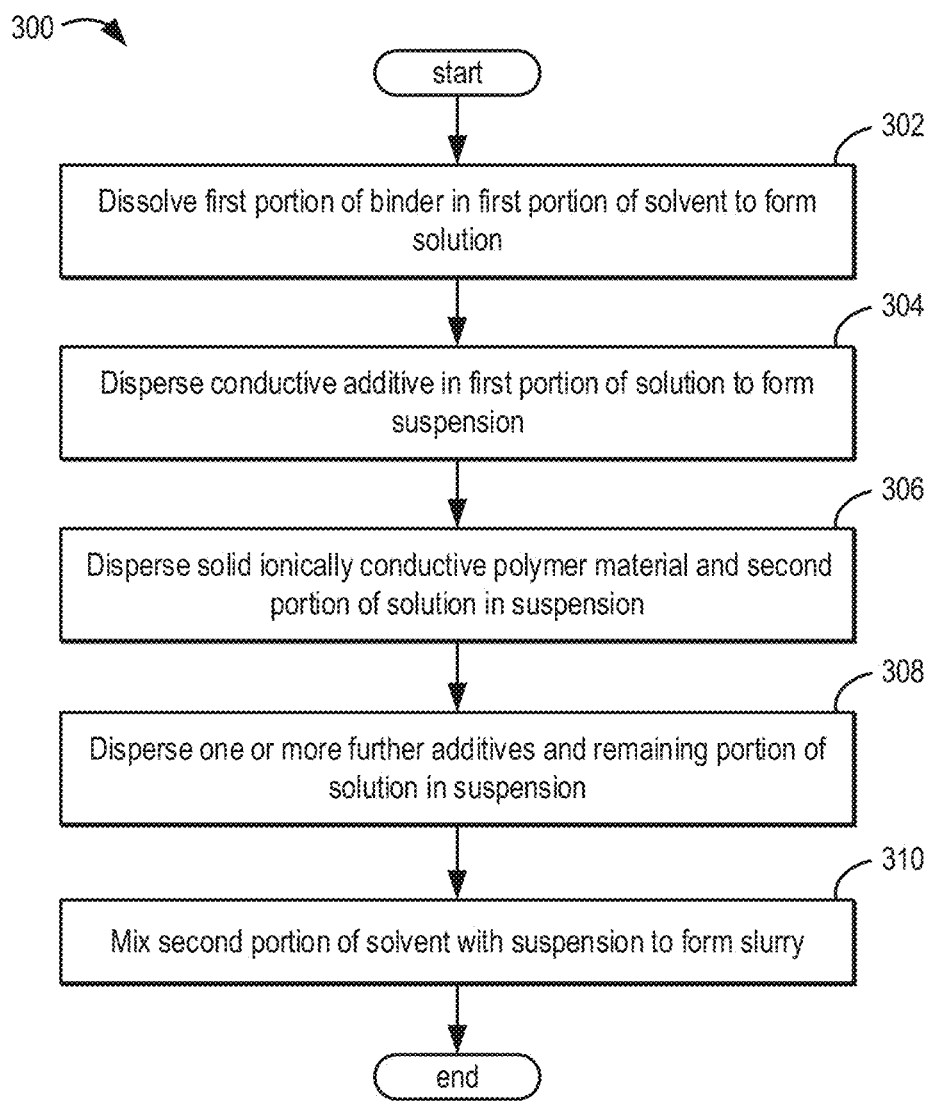
FIG. 3 shows a second example method for forming the slurry for applying the coating to the electrode structure.
Figure 4:
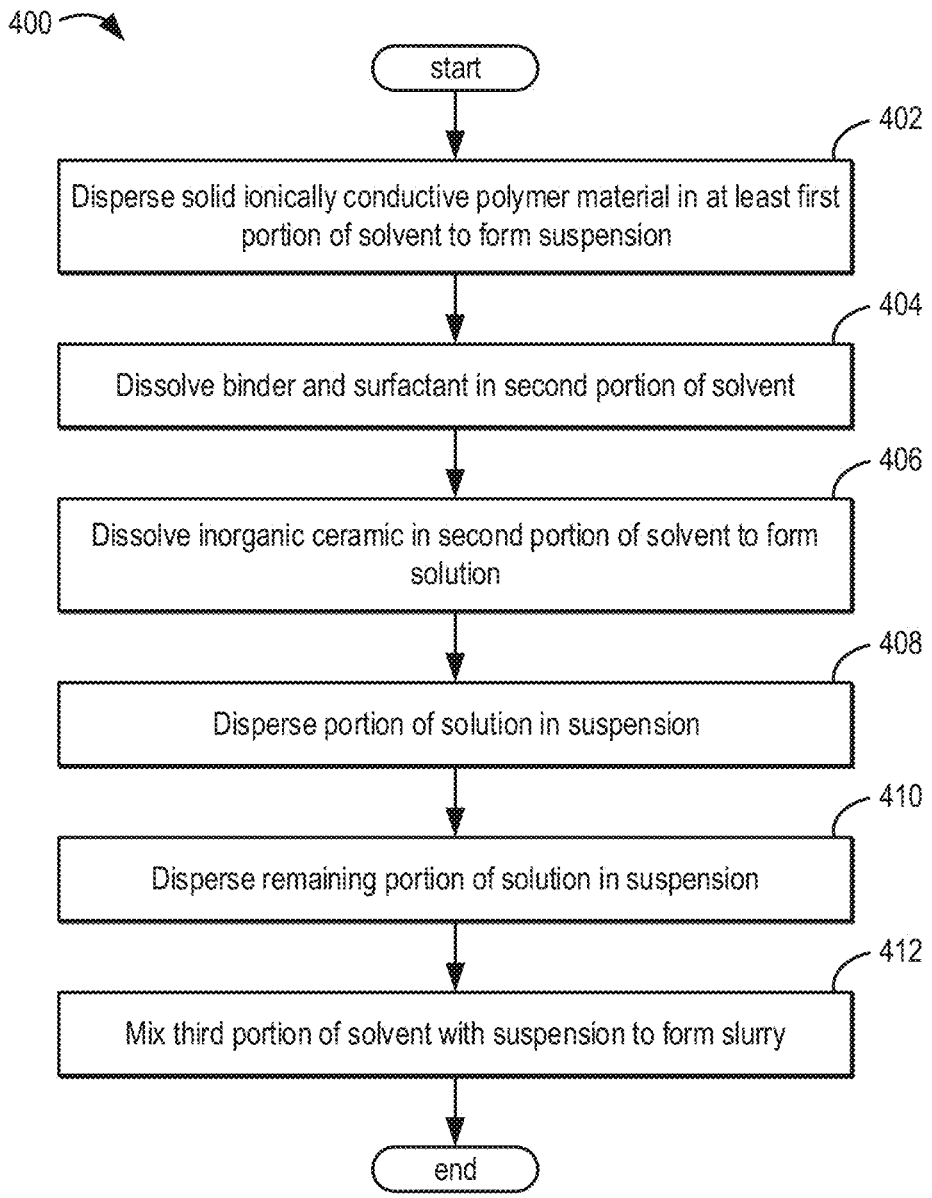
FIG. 4 shows a third example method for forming the slurry for applying the coating to the electrode structure.
Figure 5:
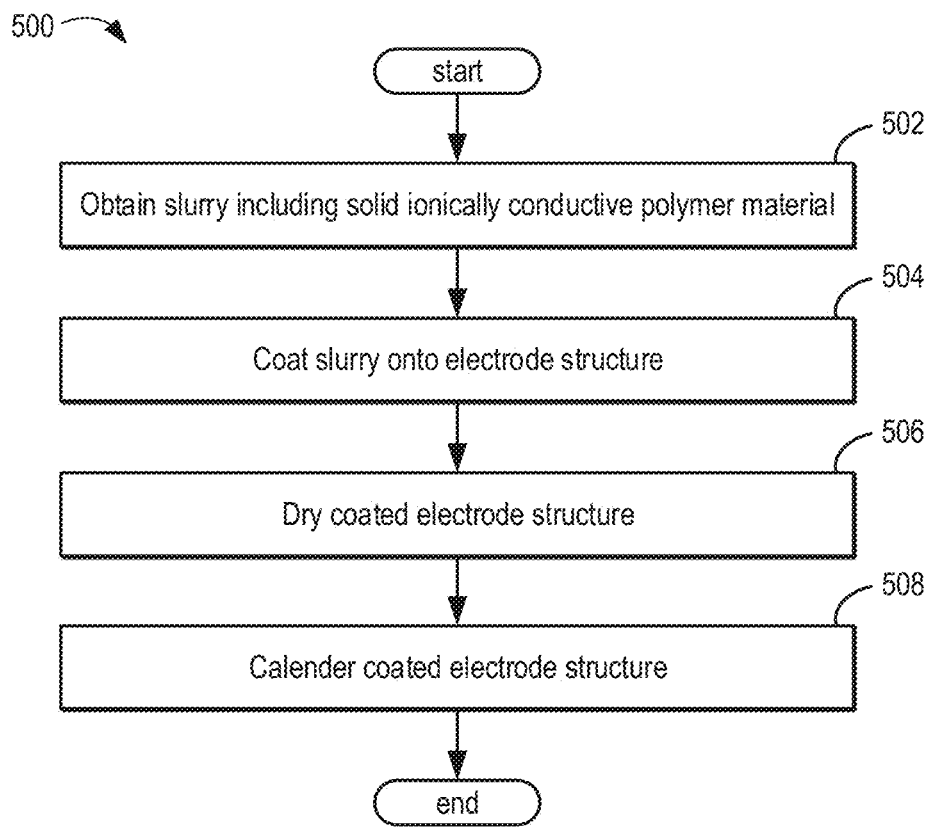
FIG. 5 shows an example method for forming the coating on the electrode structure via a slurry-based coating process.

FIGS. 1A and 1B depict various configurations of a coated hybrid electrode, or a battery cell sub-assembly. FIGS. 6-8, 10-12, 15, 16, and 19 depict plots showing various properties of the composite slurries described herein. FIGS. 2-4 depict example methods for forming the composite slurry for applying a coating to an electrode structure (e.g., a cathode material coating, an anode material coating, a cathode current collector, an anode current collector, or a combination thereof), where the electrode structure may then be incorporated into a battery cell. FIGS. 9, 13, 14, 15, and 18 depict example process flow diagrams for forming the composite slurry. FIG. 5 depicts an example method for forming a coating on an electrode structure via a slurry-based coating process.

Referring now to FIG. 1A, a first configuration 100 of the coated hybrid electrode, or battery cell sub-assembly, is depicted. Sequentially, the first configuration 100 of the coated hybrid electrode may include an anode current collector 101, an anode material coating 102, an anode separator interfacial coating 106, a separator coating 103, a cathode separator interfacial coating 107, a cathode material coating 104, and a cathode current collector 105. As such, the separator coating 103 may function as a battery separator.

One or more of the anode material coating 102 and the anode separator interfacial coating 106 may include an anode active material which contains lithium. One or more of the cathode material coating 104 and the cathode separator interfacial coating 107 may include a cathode active material which contains lithium. One or more of the anode material coating 102, the anode separator interfacial coating 106, the separator coating 103, the cathode separator interfacial coating 107, and the cathode material coating 104 may include the ionically conductive polymer material, or another solid polymer material, as described hereinabove.

In some examples, an adhesion interface may be defined between the separator coating 103 and an electrode structure. The adhesion interface may be a three-dimensional interface between the separator coating 103 and the electrode structure, such that the separator coating 103 may conform to, and permeate into, a surface of the electrode structure. As a first example, the electrode structure may be the anode material coating 102 deposited on the anode current collector 101, optionally with the anode separator interfacial coating 106 deposited thereon. As a second example, the electrode structure may be the cathode material coating 104 deposited on the cathode current collector 105, optionally with the cathode separator interfacial coating 107 deposited thereon. In some examples, the adhesion interface may have a 180° peel strength of greater than 200 gf/in. As such, the slurry-based coating methods described herein may result in greater adhesion than application of standalone polymer electrolyte films (which may, in some examples, have a 180° peel strength of about 2.1 gf/in).

Referring now to FIG. 1B, a second configuration 150 of the coated hybrid electrode, or battery cell sub-assembly, is depicted. Sequentially, the second configuration 150 of the coated hybrid electrode may include the anode current collector 101, the anode material coating 102, the anode separator interfacial coating 106, a first separator coating 103a, a conventional battery separator 108, a second separator coating 103b, the cathode separator interfacial coating 107, the cathode material coating 104, and the cathode current collector 105. In some examples, the conventional battery separator 108 may bifurcate a single separator coating 103.

FIG. 2 provides a first method 200 for forming a slurry including the solid ionically conductive polymer material. In some examples, the slurry may be applied as a coating on an electrode structure via a slurry-based coating process. In some examples, the coating may be one of a cathode material coating, a cathode separator interfacial coating, an anode separator interfacial coating, and a separator coating, such as the cathode material coating 104, the anode material coating 102, the cathode separator interfacial coating 107, the anode separator interfacial coating 106, and the separator coating 103, respectively, as described above with respect to FIGS. 1A and 1B.

In some examples, the first method 200 may employ a plurality of mixers, wherein the plurality of mixers may be configured to execute 202 to 206, as described in detail hereinbelow. Each of the plurality of mixers may operate at one or both of a high shear and a low shear. Further, in some examples, 202 to 206 may be executed in order, that is, from 202 to 204 to 206.

At 202, the solid ionically conductive polymer material (e.g., component B) may be dispersed in at least a first portion of a solvent (e.g., component D4) to form a suspension. In some example, the at least the first portion of the solvent may include one or more further components. As such the first portion of the solvent may include a solution.

At 204, one or more additives may be dispersed in the suspension. In some examples, the one or more additives may include an electrode active material (e.g., component A), a binder (e.g., component D1), a surfactant (e.g., component D1), and an inorganic ceramic (e.g., component D6).

At 206, a second portion of the solvent may be mixed with the suspension to form the slurry. The second portion of the solvent may be provided so as to reach a target solids content. As such, in some examples, the slurry may have a solid content between 40 and 80 wt. %, a d10 particle size distribution of less than 1 µm, a d50 particle size distribution of less than 30 µm, a d90 particle size distribution of less than 60 µm, a d99 particle size distribution of less than 140 µm, a Hegman gauge of less than 90 µm, and a viscosity between 500 and 2800 cps at 85 Hz. The first method 200 may then end.

Referring now to FIG. 3, a second method 300 is depicted for forming the slurry including the solid ionically conductive polymer material. In some examples, the slurry may be applied as a coating on an electrode structure via a slurry-based coating process. In some examples, the coating may be one of a cathode material coating, a cathode separator interfacial coating, and an anode separator interfacial coating, such as the cathode material coating 104, the anode material coating 102, the cathode separator interfacial coating 107, and the anode separator interfacial coating 106, respectively, as described above with respect to FIGS. 1A and 1B.

In some examples, the second method 300 may employ a plurality of mixers, wherein the plurality of mixers may be configured to execute 302 to 310, as described in detail hereinbelow. Each of the plurality of mixers may operate at one or both of a high shear and a low shear. Further, in some examples, 302 to 310 may be executed in order, that is, from 302 to 304 to 306 to 308 to 310.

At 302, a first portion of the binder (e.g., component D1) may be dissolved in a first portion of the solvent (e.g., component D4) to form a solution.

At 304, a conductive additive (e.g., component D2) may be dispersed in a first portion of the solution to form a suspension.

At 306, the solid ionically conductive polymer material (e.g., component B) and a second portion of the solution may be dispersed in the suspension.

At 308, one or more further additives and a remaining portion of the solution may be dispersed in the suspension. In some examples, the one or more further additives may include an electrode active material (e.g., component A) and a second portion of the binder (e.g., component D1).

At 310, a second portion of the solvent may be mixed with the suspension to form the slurry. The second portion of the solvent may be provided so as to reach a target solids content. As such, in some examples, the slurry may have a solid content between 40 and 80 wt. %, a d10 particle size distribution of less than 10 µm, a d50 particle size distribution of less than 30 µm, a d90 particle size distribution of less than 60 µm, a d99 particle size distribution of less than 140 µm, a Hegman gauge of less than 90 µm, and a viscosity between 500 and 2800 cps at 85 Hz. The second method 300 may then end.

Referring now to FIG. 4, a third method 400 is depicted for forming the slurry including the solid ionically conductive polymer material. In some examples, the slurry may be applied as a coating on an electrode structure via a slurry-based coating process. In some examples, the coating may be a separator coating, such as the separator coating 103 as described above with reference to FIGS. 1A and 1B.

In some examples, the third method 400 may employ a plurality of mixers, wherein each of the plurality of mixers may be configured to execute 402 to 412, as described in detail hereinbelow. Each of the plurality of mixers may operate at one or both of a high shear and a low shear. Further, in some examples, 402 to 412 may be executed in order, that is, from 402 to 404 to 406 to 408 to 410 to 412.

At 402, the solid ionically conductive polymer material (e.g., component B) may be dispersed in at least a first portion of a solvent (e.g., component D4) to form a suspension. In some example, the at least the first portion of the solvent may include one or more further components. As such the first portion of the solvent may include a solution.

At 404, the binder (e.g., component D1) and the surfactant (e.g., component D3) may be dissolvent in a second portion of the solvent. At 406, the inorganic ceramic (e.g., component D6) may be dissolved in the second portion of the solvent to form a solution. At 408, a portion of the solution may be dispersed in the suspension. At 410, a remaining portion of the solution may be dispersed in the suspension.

In some examples, at 412, a third portion of the solvent may be mixed with the suspension to form the slurry. The third portion of the solvent may be provided so as to reach a target solids content. As such, in some examples, the slurry may have a solid content between 40 and 55 wt. %, a d10 particle size distribution of less than 1 μm, a d50 particle size distribution of less than 15 μm, a d90 particle size distribution of less than 60 μm, a d99 particle size distribution of less than 100 μm, a Hegman gauge of less than 90 μm, and a viscosity between 500 and 2200 cps at 85 Hz. The third method 400 may then end.

FIG. 5 provides a further method 500 for forming a coating on an electrode structure via a slurry-based coating process, whereby the electrode structure may be included in a battery cell. In some examples, the coating may be one of a cathode material coating, a cathode separator interfacial coating, an anode separator interfacial coating, and a separator coating, such as the cathode material coating 104, the anode material coating 102, the cathode separator interfacial coating 107, the anode separator interfacial coating 106, and the separator coating 103, respectively, as described above with respect to FIGS. 1A and 1B. In other examples, the coating may form one of a first tab protection strip and a second tab protection strip for an anode current collector and a cathode current collector, respectively, such as the anode current collector 101 and the cathode current collector 105, respectively, as described above with reference to FIGS. 1A and 1B.

At 502, a slurry may be obtained including the solid ionically conductive polymer material (e.g., the component B). In some examples, the slurry may be the composite slurry described herein above, and may further include one or more of the component A, the component C, and the component D. In some examples, the slurry may be in a liquid form.

At 504, the slurry may be coated onto an electrode structure. In some examples, the electrode structure may include the anode current collector (e.g., 101), the cathode current collector (e.g., 105), a previously deposited anode material coating (e.g., 102), a previously deposited cathode material coating (e.g., 104), or a previously deposited separator coating (e.g., the separator coating 103, the anode separator interfacial coating 106, the cathode separator interfacial coating 107, etc.) Numerous slurry-based coating processes may be utilized without departing from the scope of this disclosure, including, but not limited to, slot-die coating, roll-to-roll coating (e.g., gravure coating, screen printing, flexographic printing), doctor-blade casting, tape casting, spray (aerosol) coating, reverse comma coating, etc.

At 506, the coated electrode structure may be dried, and at 508, the coated electrode structure may be calendered. Within the scope of this disclosure, each of the drying and the calendering may be optimized so as to obtain desired coating processes. The method 500 may then end.

The methods as described herein may be applied in formation of the cell coatings, or layers. Each layer will be described in more detail below.

Cathode

In one example, the cathode layer of the cell may include a number of materials that in isolated populations may be characterized as powders insofar as including a multitude of particles of similar composition and characteristics. These powders may be combined with other materials to form a slurry to facilitate deposition of a continuous layer, possessing a functionality derived from the composite thereof, onto a substrate, which in the case of the present invention may be a current collector or a previously manufactured electrode, separator, or assembly including a combination thereof. In the following, a description of the component materials, routes by which the materials may be combined to form a slurry, the characteristics of the slurry, and methods for casting of the slurry are provided.

In one example, the composite body including the cathode, and the slurry from which it is derived, may be formed from the combination of a number of materials of both active and passive functionalities. Some of these candidate materials may be deployed on a sacrificial basis during the formation of the slurry and may later be removed after the coating of the slurry.

The composite of the cathode, in the form of a slurry or other, may be defined according to the following:

Composite(Total)=Component A+Component B+Component C+Component D

Where Component A corresponds to the cathode active material

Where Component B corresponds to the ion conducting solid state polymer

Where Component C corresponds to the free volume

Where Component D corresponds to the binder, additives, and other functional and non-functional components Whereby the cathode slurry may include the following components:

Component A
  one or a combination of active materials such as one or more of the following active materials: Lithium iron phosphate (LFP), spinel LNMO, $LiCoPO_4$, $LiNiPO_4$, LVP, LVPF, $LiNi_xMn_yCo_zO_2$, or $LiNi_xCo_yAl_zO_2$, with a primary particle size between 0.01 and 20 μm Component B
  one or more solid ionically conductive polymer materials as ion-conducting agent with a primary particle size between 0.01 and 20 μm Component C Component D
  Component D1: a binder including at least one compound selected from the group including polyethers, polyesters, carboxymethylcellulose, or polymers based on at least one monomer, such as methyl methacrylate, acrylonitrile, styrene, butadiene, acrylic acid or vinylidene fluoride
  Component D2: an electronic conductor such as carbon black, super P, vapor grown carbon fiber Component D3: one or more surfactants for homogeneity of the slurry such as sulfates, sulfonates, phosphates, and carboxylates Component D4: one or more dispersing solvents such as acetone, isopropanol, methanol, toluene, n-methyl pyrrolidone, and water Component D5: one or more inorganic additives for the reduction of interfacial impedance, such as $LiNbO_3$, $LiTaO_3$, $LiNb_xTa_{1-x}O_3$, $BaTiO_3$, and including $P_2O_5$, $B_2O_3$, $Al_2O_3$, $Ga_2O_3$, $Y_2O_3$, $La_2O_3$, $SiO_2$, $ZrO_2$, $TiO_2$, and compounds arising from combinations thereof including the possible addition of $Li_2O$, with a primary particle size between 0.01 and 10 microns Component D6: one or more additives to improve the mechanical integrity and provide supplemental functionality of the polymer electrolyte in the solid electrolyte layer, such as $P_2O_5$, $B_2O_3$, $Al_2O_3$, $Ga_2O_3$, $Y_2O_3$, $La_2O_3$, $SiO_2$, $ZrO_2$, $TiO_2$, and compounds arising from combinations thereof including the possible addition of $Li_2O$, with a primary particle size between 0.01 and 10 μm Excluding the solvent, the cathode slurry may contain the previous components within the following range:

solid ionically conductive polymer materials between 0 and 15 wt. %
active material between 80 and 95 wt. %
binder content between 0.1 and 10 wt. %
electronic conductor between 1 and 10 wt. %
surfactant content between 0 and 5 wt. %

The composite volume of the cathode layer may be defined as $Vol._{total} = \% \, Vol._{Component\,A} + \% \, Volume_{Component\,B} + \% \, Volume_{Component\,C} + \% \, Volume_{Component\,D}$ The Volume % of Component A may be >35%, >45%, >55%, >60%, or >65%
The Volume % of Component B may be <30%, <25%, <20%, <15%, or <10%
The Volume % of Component C may be <40%, <30%, <20%, or <15%
The Volume % of Component D may be <30%, <25%, <10%, or <5%
The sum of the Volume % of Components C and D may be <40%, <30%, <20%, or <15%

The sizes of the particles including the powder forms of Components A and B may also be described by the following:

Of the Volume % including Component A, for which a mean particle size value $A_{mean}$ can be assigned, a percentage of the total population identified as $A_1$, will be characterized as having a size distribution for which the mean value, $A_{1,mean}$, may be greater than $A_{mean}$ Of the Volume % including Component A for which a mean particle size value $A_{mean}$ can be assigned, a percentage of the total population, identified as $A_2$, will be characterized as having a size distribution for which the mean value, $A_{2,mean}$, may be less than $A_{mean}$ Of the Volume % including Component A, particles belonging to a population with a size distribution described by a mean value $A_{1,mean} > A_{mean}$ form 100%, <95%, <85%, or <80%, with the remainder of Component A, identified by $A_2$, belonging to a population for which $A_{2,mean} < A_{mean}$, situated in the interstices between the larger particles Of the Volume % including Component B for which a mean particle size value $B_{mean}$ can be assigned, a percentage of the total population, identified as $B_1$, will be characterized as having a size distribution for which the mean value, $B_{1,mean}$, may be greater than $B_{mean}$ Of the Volume % including Component B for which a mean particle size value $B_{mean}$ can be assigned, a percentage of the total population, identified as $B_2$, will be characterized as having a size distribution for which the mean value, $B_{2,mean}$, may be less than $B_{mean}$ Of the Volume % including Component B, particles belonging to a population with a size distribution described by a mean value $B_{1,mean} > B_{mean}$ form >80%, <85%, <90%, or <95%, with the remainder of Component B, identified by $B_2$, belonging to a population for which $B_{2,mean} < B_{mean}$, situated in the interstices between the larger particles The relative fractions of Component A and Component B forming Composite(Total) can be described as follows:

As the Volume % of Component A including a percentage of the total solid volume increases the Volume % of Component B including $B_2$ will increase relative to the Volume % of Component B including $B_1$. This method may keep the porosity levels down As the ratio of Component $A_1$ to Component $A_2$ decreases the ratio of the Volume % of Component B including $B_1$ to the Volume % of Component B including $B_2$ may decrease. In some examples, this method maintains the solid polymer electrolyte perocolation network as the surface as the active material grow while maintaining the density of SPE:AM by also reducing the size ratio of B1:B2

The fraction of Component A added in the form of $A_1$ to Composite(Total) may be 100%, <95%, <90%, <85%, or <80%

The fraction of Component B added in the form of $B_1$ to Composite(Total) may be 100%, <90%, <80%, <70%, <60%, or <50%

Prior to its coating, the positive electrode slurry may, in some examples, be characterized by:

A viscosity between 1000 and 2600 cps at 85 Hz as measure by parallel plate rheometry.
A solid content between 45 and 75%
A Hegman gauge below 80 μm or below 50 μm
A particle size distribution as follows: d10<10 μm, d50<30 μm, d90<60 μm, d99<100 μm Calendering may be conducted between room temperature (20° C.) and 140° C. in a low humidity environment. The positive electrode thickness post calendering may be between 100 and 400 μm.

Figure 6:
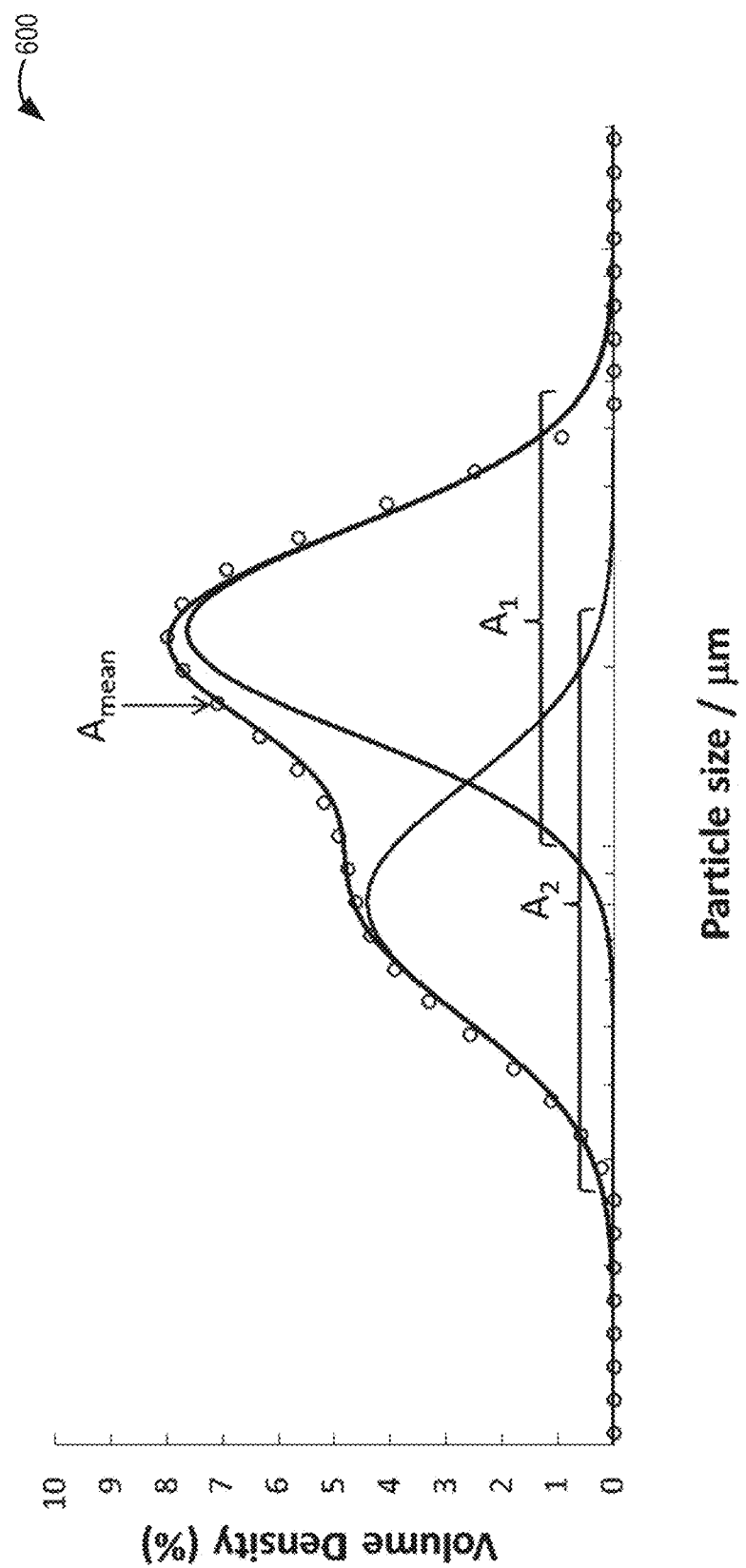
FIG. 6 shows a plot depicting a bimodal particle size distribution in a slurry for a cathode material coating.
Figure 7:
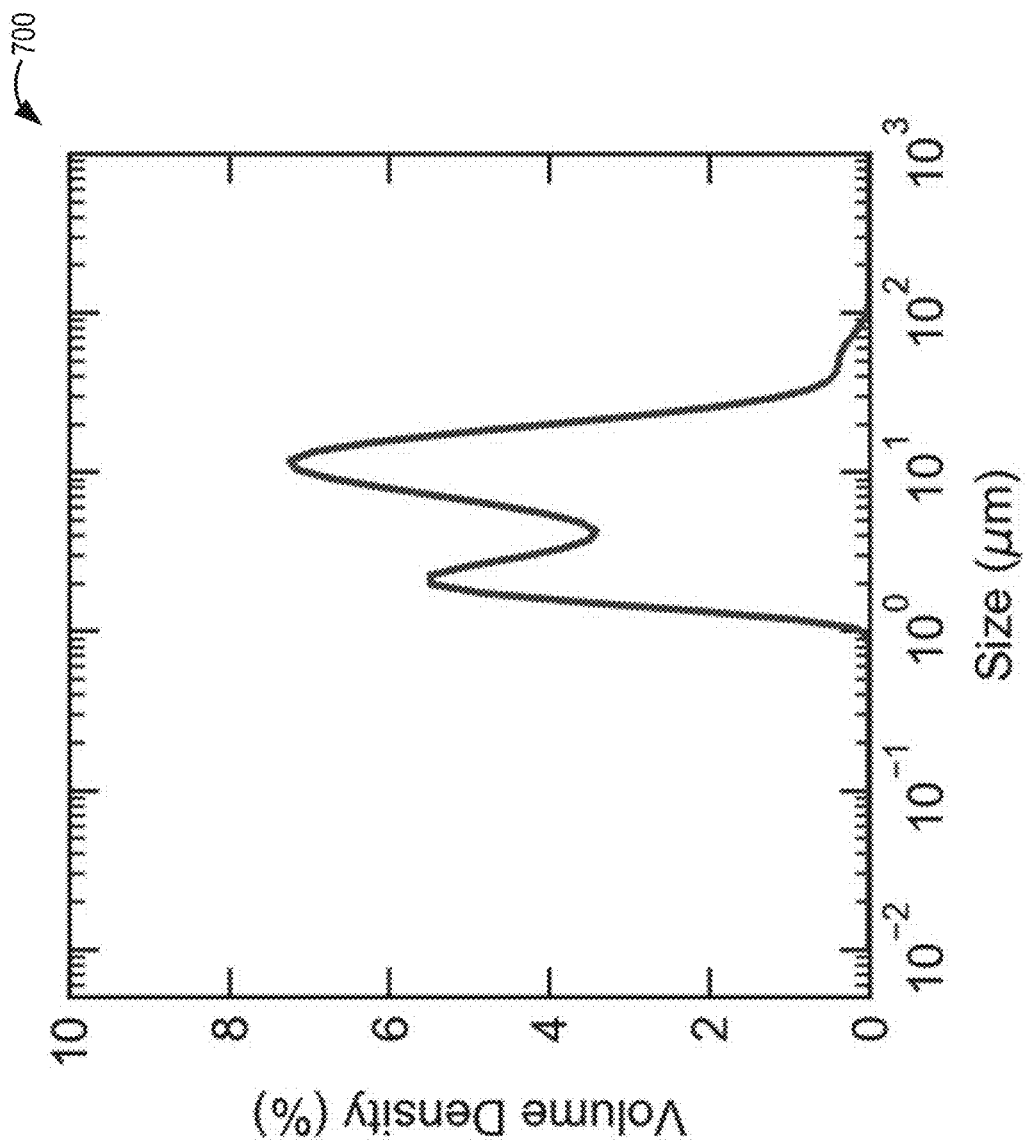
FIG. 7 shows a plot depicting a particle size distribution in the slurry for the cathode material coating.

Representative particle size distribution curves are shown in plot 600 of FIG. 6 and plot 700 of FIG. 7. The first peaks are representative of the particle size due to component B, and the second peaks at approximately 10 μm are attributed to component A.

Figure 8:
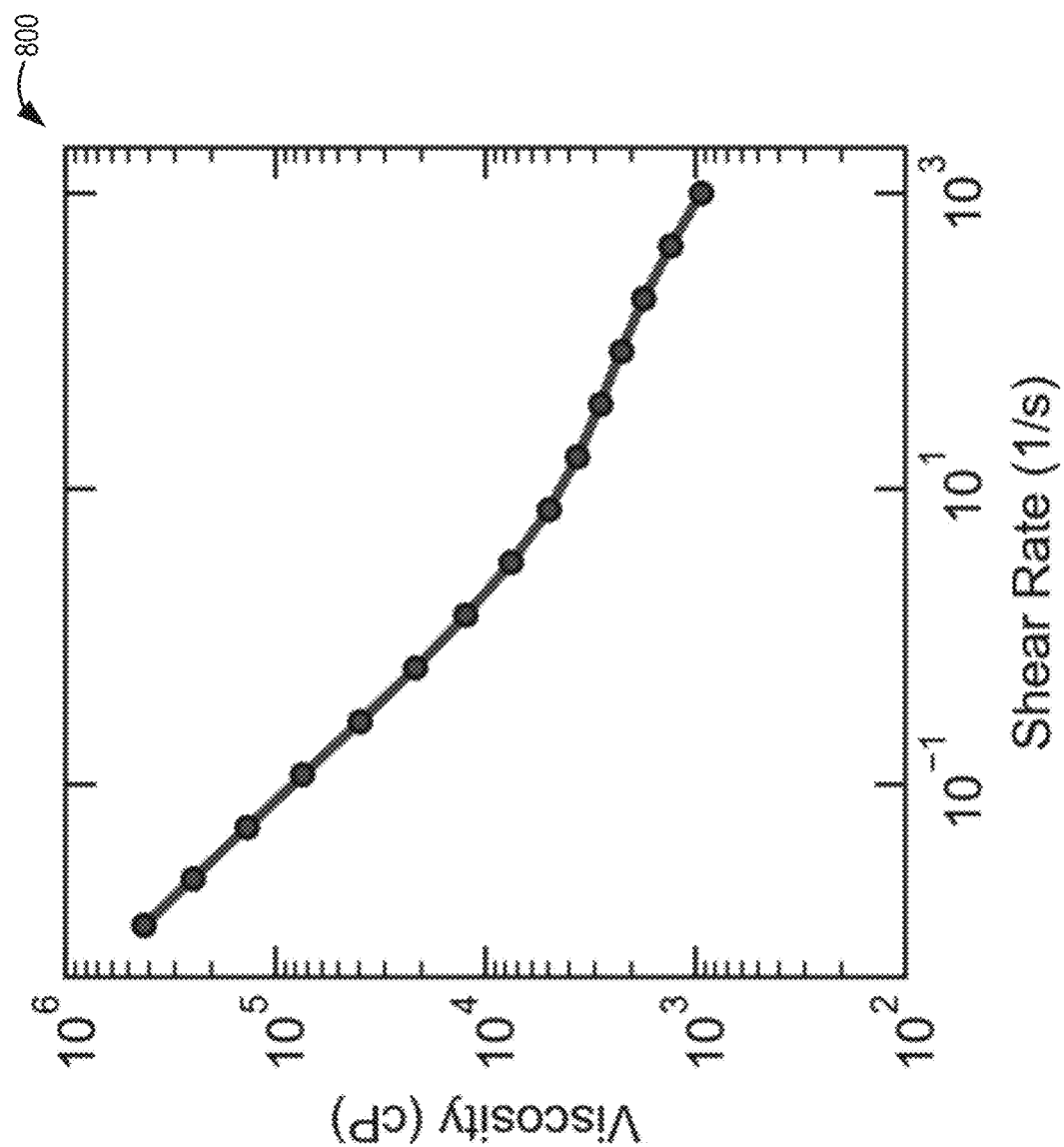
FIG. 8 shows a plot depicting viscosity versus shear rate in the slurry for the cathode material coating.

A representative viscosity curve is shown in plot 800 of FIG. 8, where the viscosity is plotted against the shear rate. The slurry, in this example, exhibits shear thinning.

Cathode Mixing Slurry Process

Provided below are example procedures of forming a cathode slurry.

Example Procedure 1 for Cathode Slurry Mixing Process: In this example, Component D1 (Binder) may be added in multiple stages as a solution.

i. Mixing Speed and Equipment

Figure 9:
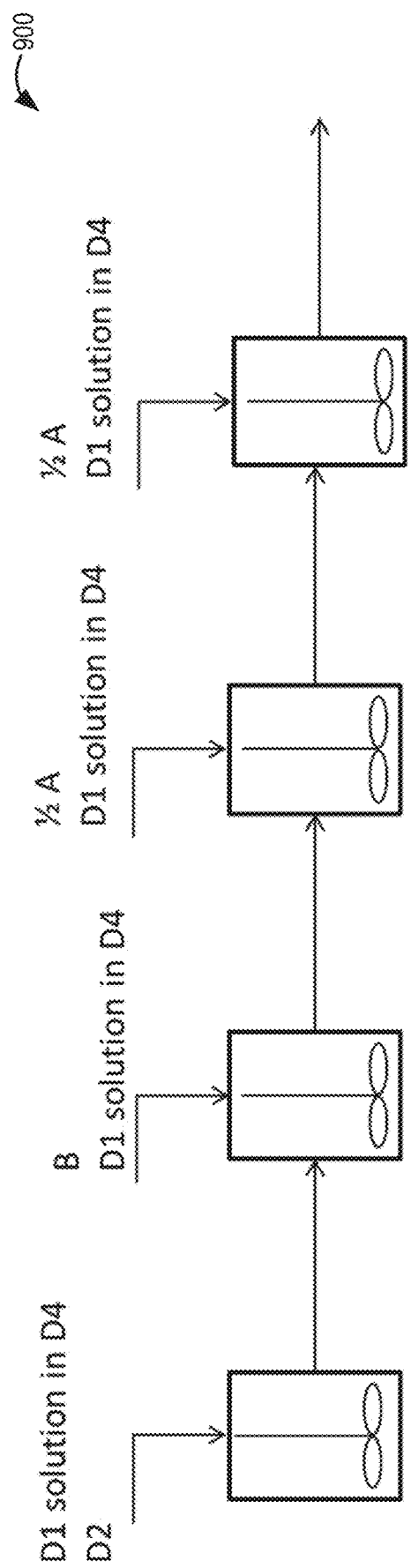
FIG. 9 shows a process flow diagram for forming the slurry for the cathode material coating.

Specifically, dispersion of the components may be achieved through a combination of single-shaft mixers equipped with saw-tooth high-shear dispersers and multi-shaft mixers equipped with multiple high-shear dispersers, and low-shear anchor agitators, or low-shear helical-shaped paddles. Throughout the entire mixing process, the mixing speeds may be kept as described below:
Low shear axis between 10 and 55 rpm
High shear axis between 0 and 1500 rpm ii. Solution of Component D1 in Component D4
First, component D1 may be dissolved in component D4 to form a solution at 1 and 15 wt. %. Component D2 may be dispersed.

iii. Disperse Component D2
A fraction of component D1 solution, between 10 and 60%, and the component D2 may be mixed between 30 and 90 minutes. After this step, the solid content lies between 5 and 30 wt. %.

iv. Disperse Component B
Component B and another fraction of component D1 solution, between 5 and 40%, may then be added to the previous suspension and mixed between 30 and 90 minutes. Following this step, the solid content may be between 10 and 50 wt. %.

v. Disperse Component A
Half of the component A may be added to the mixing vessel along with another fraction of the component D1 solution, between 10 and 70%; the solution may be mixed for another 45 to 120 minutes. After this step, the solid content may be between 40 and 80 wt. %. The other half of component A and the remaining fraction of component D1 solution may be added to the mixing vessel and mixed for 120 minutes to 16 hours.

vi. Target Solids Percentage
In some examples, an additional component D4 may be added at this point to target the final slurry characteristics described above. Following the process, the slurry characteristics may be:
d10<10 μm, d50<30 μm, d90<60 μm, d99<100 μm
Hegman gauge<50 μm
Solid content between 40 and 80 wt. %
Viscosity between 2000 and 2600 cps at 85 Hz A process flow diagram 900 of Example Procedure 1 is depicted in FIG. 9.

Example Procedure 2 for Cathode Slurry Mixing Process:
As another example, a method is provided as to addition of a binder as a powder in a single stage.

i. Mixing Speed and Equipment
In this example, dispersion of the components may be achieved through a combination of single-shaft mixers equipped with saw-tooth high-shear dispersers and multi-shaft mixers equipped with multiple high-shear dispersers, and low-shear anchor agitators, or low-shear helical-shaped paddles.
In some embodiments, throughout the entire mixing process, the mixing speeds may be kept as described below:
Low shear axis between 10 and 55 rpm
High shear axis between 0 and 1500 rpm ii. Disperse Component D2
Component D4, component D1, and component D2 may be mixed between 30 and 90 minutes. After this step, the solid content may be between 5 and 30 wt. %.

iii. Disperse Component B
Component B and some more of component D4 may be added to the previous suspension and mixed between 30 and 90 minutes. Following this step, the slurry solid content may be between 10 and 50 wt. %.

iv. Disperse Component A
Half of the component A may be added to the mixing vessel along with some more of component D4. In this example, the solution may be mixed for another 45 to 120 minutes. After this step, the slurry solid content may lie between 40 and 80 wt. %. The other half of the component A and some more of component D4 may be added to the mixing vessel and mixed for 120 minutes to 16 hours.

v. Target Solids Percentage
In some examples, additional solvent may be added at this point to target the final slurry characteristics described above. After this step, the slurry characteristics may be:
d10<10 μm, d50<30 μm, d90<60 μm, d99<100 μm
Hegman gauge<50 μm
Solid content between 40 and 80 wt. %
Viscosity between 1000 and 2000 cps at 85 Hz Example Procedure 3 for Cathode Slurry Mixing Process:
As another example, a procedure is provided which includes mixing with only a high shear disperser.

i. Mixing Speed and Equipment
In this example, dispersion of the components may be achieved with single-shaft mixers equipped with saw-tooth high-speed dispersers. Throughout the entire mixing process, the high shear axis mixing speed may be kept between 0 and 1500 rpm.

ii. Solution of Component D1 in Component D4
First, component D1 may be dissolved in component D4 to form a solution at 1 and 15 wt. %.

iii. Disperse Component D2
Component D1 in D4 solution may be used wherein component D2A from the options provided for Component D2 hereinabove may be first dispersed. This may be mixed for 30-90 minutes. Next, a second component, component D2B, from the options provided for Component D2 hereinabove may then be dispersed for another 30-90 minutes. The solids content may be approximately 10%.

iv. Disperse Component B
Next, component B may be dispersed into the slurry for 30-90 minutes. Component A may be added in its entirety after this step where the slurry may be subjected to mix for 2-12 hours.

v. Target Solids Percentage
Finally, component D4 may be added to adjust the solids content of the slurry to between 50-60%.

Table 1 provides examples of the slurry mixing process.

TABLE 1

Examples of the cathode slurry mixing process with $LiNi_{0.8}Mn_{0.1}Co_{0.1}O_2$ (NMC811) (cathode active material).

| Procedure | Dry adhesion (gf/in) | NMC811 half-cell first Coulombic efficiency |
|---|---|---|
| 1 | 102 | 90% |
| 2 | 2 | — |
| 3 | 1 | 82% |

An alternative route is also considered for the process of mixing for distribution of a solid electrolyte component. For example, to facilitate a distribution of component particles providing an optimum density with preservation of the component materials' functionality, the order with which the particulate populations of the different materials may be added to the mixture is carefully selected. A tendency exists for smaller particles to intersperse amongst larger particles. For this to happen effectively, the uniformity of the distribution of the larger particles must first be established.

Furthermore, to achieve a high gravimetric capacity the introduction of the totality of each of the component materials can be done in subsets to engineer the distribution of the large particle populations with respect to the smaller ones.

Given the previous definition of the composite volume of the cathode layer, defined as $Vol._{total}$=% $Vol._{Component\ A}$+% $Volume_{Component\ B}$+% $Volume_{Component\ C}$+% $Volume_{Component\ D}$ Where Component A corresponds to the cathode active material Where Component B corresponds to the ion conducting solid state polymer Where Component C corresponds to the free volume Where Component D corresponds to the volume arising from the presence of binder, additive, and other functional and non-functional components Of the Volume % including Component A, for which a mean particle size value $A_{mean}$ can be assigned, a percentage of the total population identified as $A_1$, will be characterized as having a size distribution for which the mean value, $A_{1,mean}$, may be greater than $A_{mean}$ Of the Volume % including Component A for which a mean particle size value $A_{mean}$ can be assigned, a percentage of the total population, identified as $A_2$, will be characterized as having a size distribution for which the mean value, $A_{2,mean}$, may be less than $A_{mean}$ Of the Volume % including Component B for which a mean particle size value $B_{mean}$ can be assigned, a percentage of the total population, identified as $B_1$, will be characterized as having a size distribution for which the mean value, $B_{1,mean}$, may be greater than $B_{mean}$ Of the Volume % including Component B for which a mean particle size value $B_{mean}$ can be assigned, a percentage of the total population, identified as $B_2$, will be characterized as having a size distribution for which the mean value, $B_{2,mean}$, may be less than $B_{mean}$ With consideration for the above design criteria the following prescribes the order by which the components of the cathode layer may be combined to form a mixture of the Components A, B, C, and D by the process of mixing:

Step 1. Initially Component $A_1$ may be mixed with a portion of Component $B_2$ Step 2. Component $A_1$ may be mixed with a portion Component D providing a dispersed population of $A_1$ particles decorated with $B_1$ particles Step 3. Independently or in combination with Component $A_1$, Component $B_1$ and $A_2$ may be mixed together with further addition of a portion of Component D Step 4. A portion of Component $B_2$ may be added to the mixture Step 5. The remainder of Component $B_2$ and Component D may be added step-wise to the mixture until the mixture may include the totality of the Components $A_1$, $A_2$, $B_1$, $B_2$, and D In addition to the above, use of a discontinuous binder medium is considered as part of Component D. The use of a discontinuous binder medium, provides the functionality of a continuous and conformal coating without inhibiting the transfer of charged species at the interfaces between the active materials of the electrodes and the ionically conducting particles dispersed throughout the entirety of the battery's layers, or between the polymeric solid state particles forming the electrolyte layers.

To deploy such a strategy staged mixing is again leveraged whereby the active materials of a given electrode may first be mixed in a wet or dry slurry with the solid electrolyte powder to establish a surface coating of the active material with the solid state electrolyte. This ionically conducting powder-coated active material may then be mixed with a binder vehicle which is resistant to dissolution in the slurry's solvent. Following mixing of the solid electrolyte coated active material and the non-soluble binder vehicle, additional soluble binder component(s) may be added to tune the mechanical durability of the electrode without jeopardizing the functionality of the ionically conducting and electroactive species.

An example of this process may be described as follows:

Step 1. Initially Component $A_1$ may be mixed with a portion of Component $B_2$ Step 2. The mixture of Component $A_1$ and Component $B_2$ may be mixed with a portion Component $D_{1A}$ (non-soluble binder) providing a dispersed population of $A_1$ particles decorated with $B_2$ particles and $D_{1A}$ (non-soluble binder) particles Step 3. A Portion of $B_1$ and Component $D_{1B}$ (soluble binder) may be added to the mixture of Component $A_1$ and Component $B_2$ and Component $D_1$ (non-soluble binder)

Step 4. Independently or in combination with the mixture of Component $A_1$, Component $B_2$ and $D_{1A}$ (non-soluble), Components $B_1$ and $A_2$ may be mixed together with further addition of a portion of Component $D_{1B}$ (soluble binder)

Step 5. A portion of Component $B_2$ may be added to the mixture

Step 6. The remainder of Component $B_2$ and Component $D_{1B}$ may be added step-wise to the mixture until the mixture may include the totality of the Components $A_1$, $A_2$, $B_1$, $B_2$, $D_{1A}$ and $D_{1B}$ To facilitate the intended distribution of the above components the following parameters may be applied in use of the method to guide the optimization of component particle size distributions:

The ratio of the average diameter of the electrode active materials to the solid polymer electrolyte may be less than 7, less than 6, less than 5, or less than 4.

The most prevalent particle size of the cathode active material Component $A_1$ may be <20 microns, greater than 5 microns, or 10 microns The most prevalent particle size of the cathode active material Component $A_2$ may be >0.5 microns, >1 micron, <15 microns, <5 microns, or 1.5 microns The minimum characteristic particle size of the cathode active material may be greater than 0.5, >1, >2, or >5 microns and the maximum characteristic particle size of the cathode may be <70, <50, <30, <20, or <15 microns The most prevalent particle size of the solid polymer electrolyte Component $B_1$ may be <5 microns or >1.6 microns The most prevalent particle size of the solid polymer electrolyte Component $B_2$ may be <1.5 microns, >0.35 microns, or 0.7 microns The minimum characteristic particle size of the solid polymer electrolyte may be <1 micron, <0.5 microns, <0.2 microns, or <0.05 microns The maximum characteristic particle size of the solid polymer electrolyte may be >10 microns, >20 microns, or <50 microns The particle size distributions of the subpopulations can be approximated using a log-normal distribution function including individual or multiple components.

Component A and Component B can be approximated using multiple components having a log-normal distribution $$f(x) = \frac{1}{x} \cdot \frac{1}{\sigma\sqrt{2\pi}} \exp\left(-\frac{(\ln x - \mu)^2}{2\sigma^2}\right)$$

where x is the particle size, µ is the mean particle size, and σ is the standard deviation or the dispersity The dispersity of Component $A_1$ may be <0.5, <0.4, <0.3, <0.2, or <0.15

The dispersity of Component $A_2$ may be <0.5, <0.45, <0.4, <0.3, <0.25, or <0.15

The dispersity of Component B may be <0.7, <0.65, or <0.6

The dispersity of Component $B_1$ may be <0.7, <0.6, <0.5, <0.4, <0.3, or <0.2

The dispersity of Component $B_2$ may be <0.9, <0.8, <0.7, <0.6, <0.5, <0.45, or <0.4

Cathode Slurry Coating Process

In one example, the cathode slurry may be coated at a speed between 1 and 10 m/min using one of the coating methods described hereinabove (e.g., Example Procedure 1, 2, or 3). Following a coating, the electrode roll passes through a set of multiple ovens where the drying conditions may be set to achieve an evaporation rate range of 30-200 g/min. This range of values may be optimized for reduced migration or spatial gradient of component D1 (binder), a networked distribution of component B (the solid ionically conductive polymer material), an optimized uniformity in coat weight across the width of a coating, and good coating adhesion (≥10 gf/in). The latter parameter may provide for subsequent stamping of electrodes without compromising the integrity of the coating with delamination on the surface or along the edges of the stamped electrode.

Characterization of 2D Distribution of Polymer Electrolyte in Cathode

Figure 10:
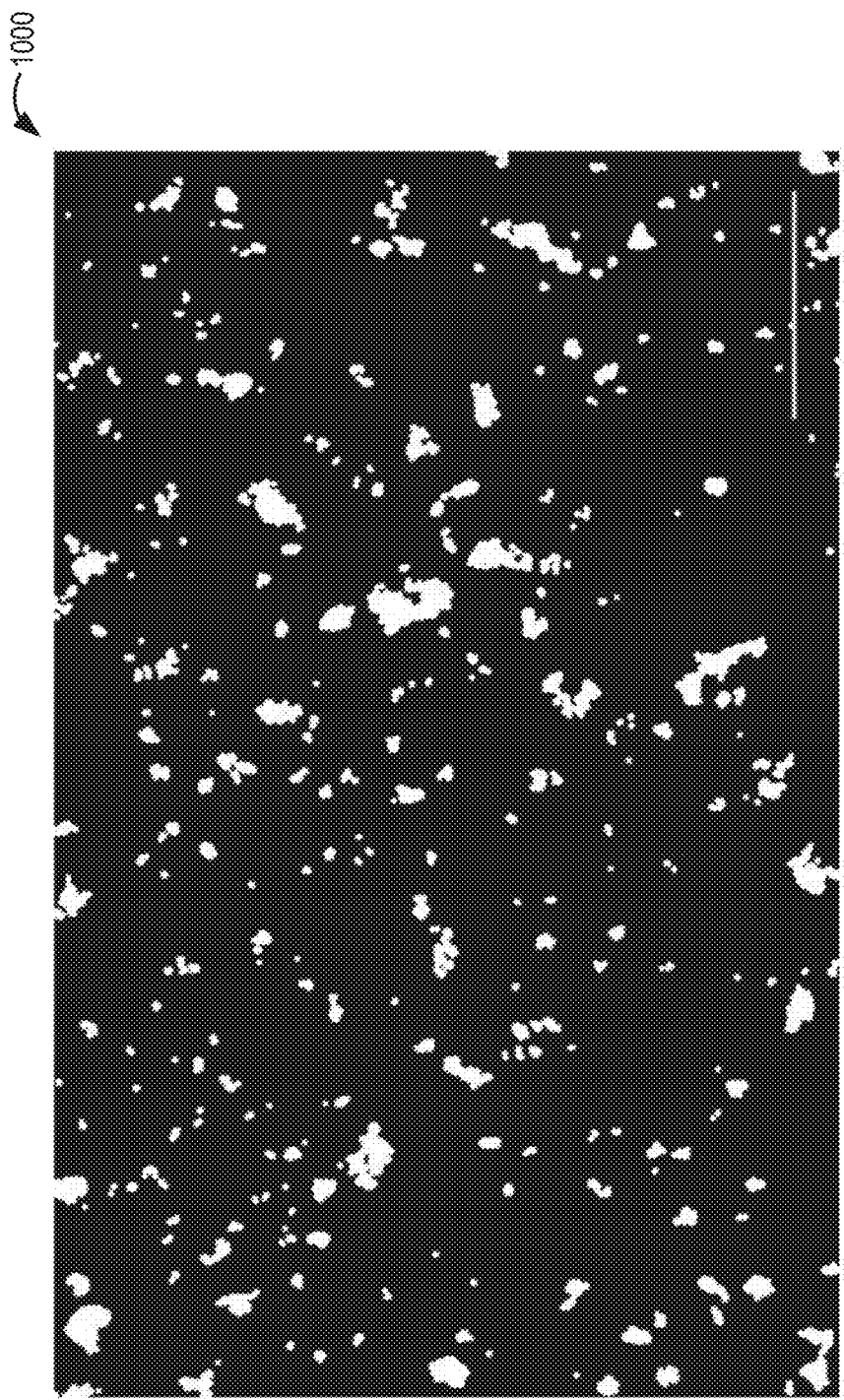
FIG. 10 shows a scanning electron microscope (SEM) image of the particle size distribution in the slurry for the cathode material coating.
Figure 11:
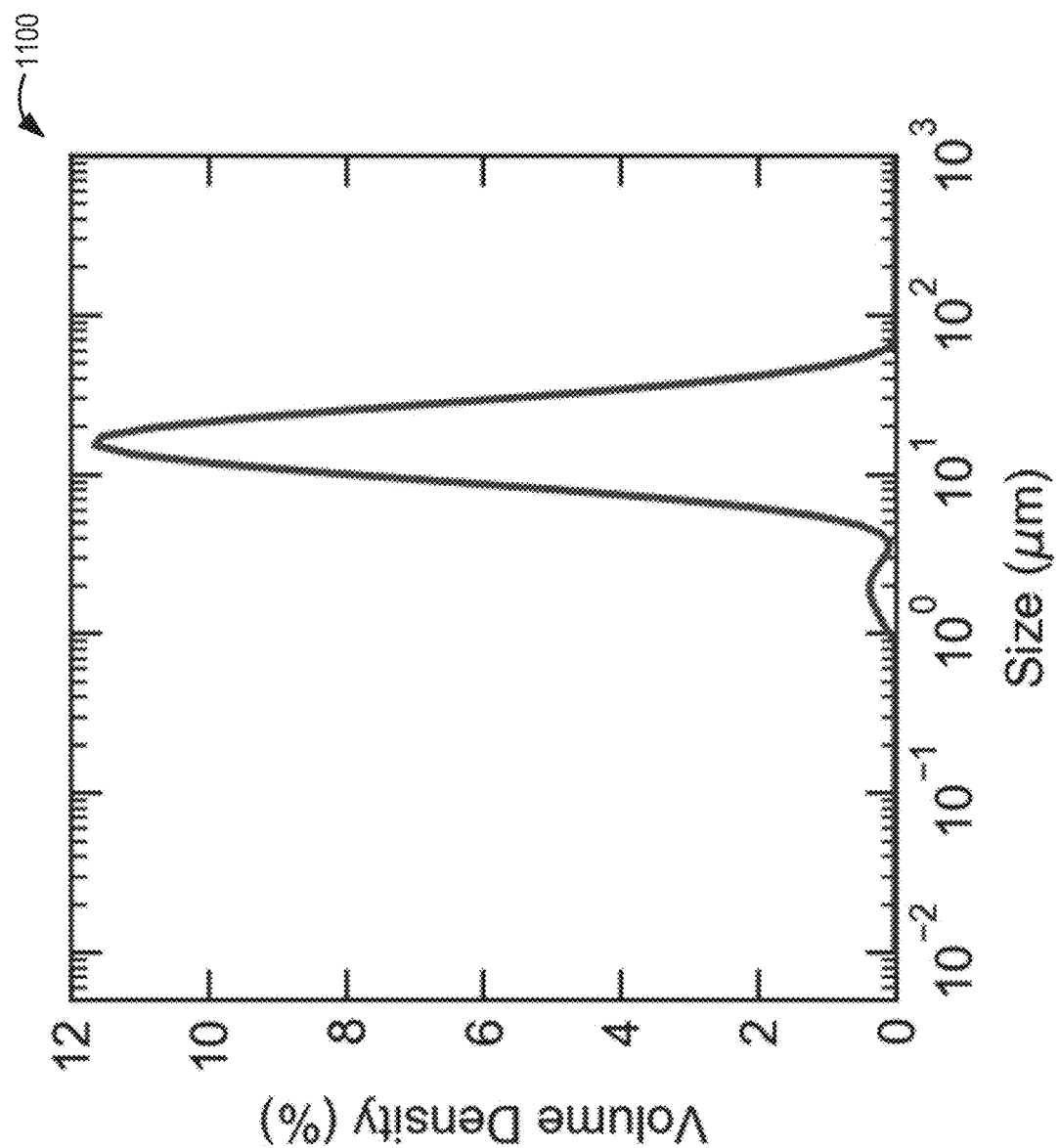
FIG. 11 shows a plot depicting a particle size distribution in a slurry for an anode material coating.
Figure 12:
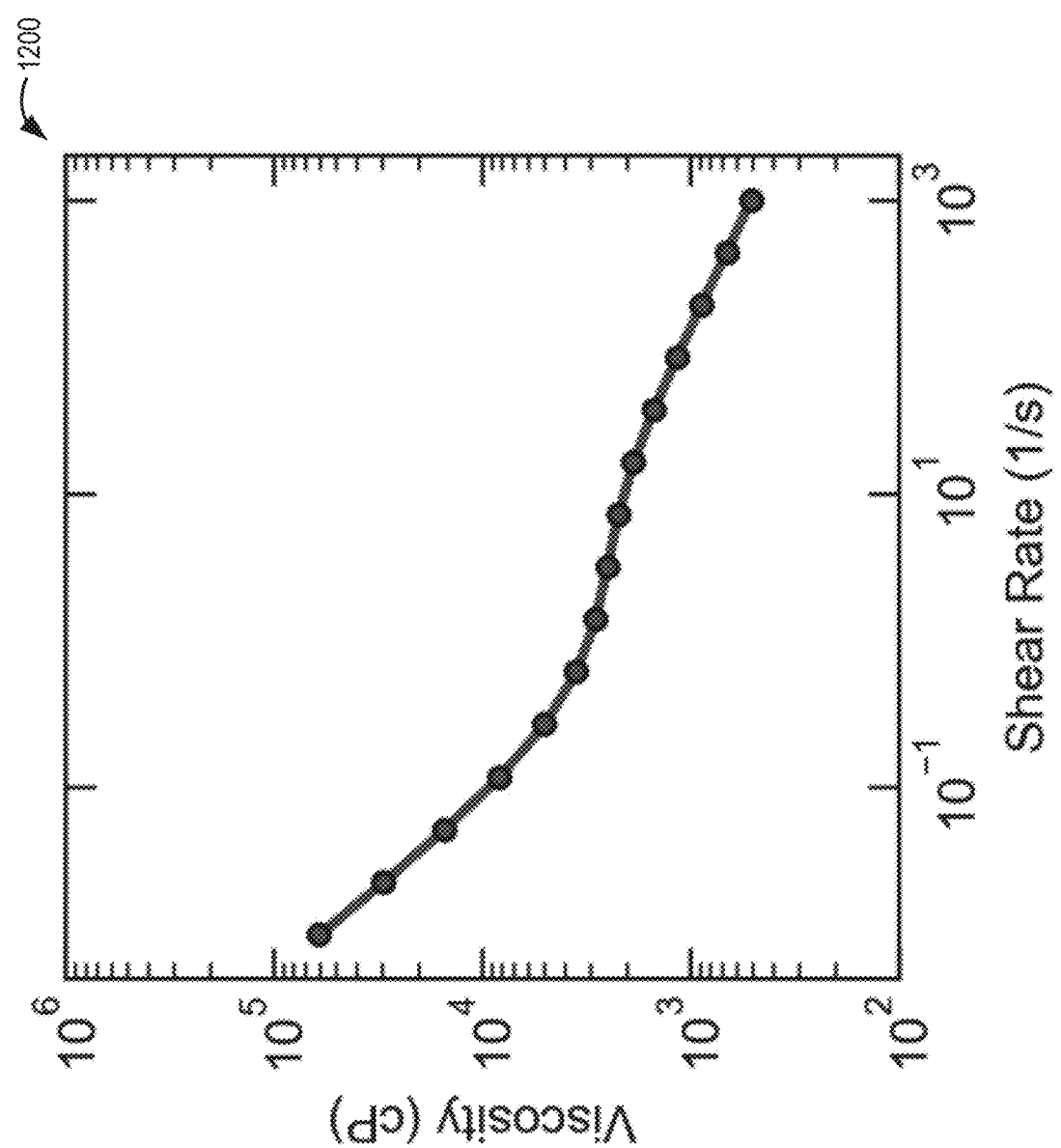
FIG. 12 shows a plot depicting viscosity versus shear rate in the slurry for the anode material coating.

The 2D distribution of component B is quantified from SEM-EDS images. In SEM image 1000 as shown by FIG. 10, the surface of the cathode coating is shown where component B is highlighted in white, and the background is shown in black.

Using a nearest neighbor distance (NND) analysis, the 2D distribution of the polymer electrolyte may be clustered with an average NND between 3-10 µm.

The maximum feret distance, the longest distance between two points on a boundary of component B particle(s), may be between 0.6-10 µm.

The area of particles may be between 0.2-23 µm².

The circularity of particle(s) in the cathode, defined by $$4\pi \frac{\text{Area}}{\text{Perimeter}^2}$$

may be between 0.2-1.0.

Anode

Similar to the discussion as to the cathode, the anode layer may also utilize the disclosed process. In one example, the anode layer of the cell may include a number of materials that in isolated populations may be characterized as powders insofar as including a multitude of particles of similar composition and characteristics. These powders may be combined with other materials to form a slurry to facilitate deposition of a continuous layer, possessing a functionality derived from the composite thereof, onto a substrate, which in the case of the present invention may be a current collector or a previously manufactured electrode, separator, or assembly including a combination thereof. In the following a description of the component materials, routes by which they may be combined to form a slurry, the characteristics of the slurry, and methods for casting of the slurry are provided.

In this example, the composite body including the anode, and the slurry from which it is derived, may be formed from the combination of a number of materials of both active and passive functionalities. Some of these candidate materials may be deployed on a sacrificial basis during the formation of the slurry and may later be removed after the casting of the slurry during steps required to finish manufacturing of said layer.

The composite of the anode in the form of a slurry or other may be defined according to the following:

Composite(Total)=Component A+Component B+Component C+Component D

Where Component A corresponds to the anode active material

Where Component B corresponds to the conducting solid state polymer

Where Component C corresponds to the free volume

Where Component D corresponds to the binder, additives, and other functional and non-functional components Whereby the anode slurry may include the following components:

Component A
  one or a combination of active materials such as graphite, silicon, silicon oxide, lithium metal, lithium titanium oxide, with a primary particle size between 0.01 and 20 µm or a foil thickness below 50 µm Component B
  one or more solid ionically conductive polymer materials as ion-conducting agent with a primary particle size between 0.01 and 20 µm Component C Component D
  Component D1: a binder including at least one compound selected from the group including polyethers, polyesters, carboxymethylcellulose, or polymers based on at least one monomer, such as methyl methacrylate, acrylonitrile, styrene, butadiene, acrylic acid or vinylidene fluoride
  Component D2: an electronic conductor such as carbon black, super P, vapor grown carbon fiber
  Component D3: one or more surfactants for homogeneity of the slurry such as sulfates, sulfonates, phosphates, and carboxylates
  Component D4: one or more dispersing solvents such as acetone, isopropanol, methanol, toluene, n-methyl pyrrolidone, and water
  Component D5: one or more inorganic additives for the reduction of interfacial impedance, such as $LiNbO_3$, $LiTaO_3$, $LiNb_xTa_{1-x}O_3$, $BaTiO_3$, and including $P_2O_5$, $B_2O_3$, $Al_2O_3$, $Ga_2O_3$, $Y_2O_3$, $La_2O_3$, $SiO_2$, $ZrO_2$, $TiO_2$, and compounds arising from combinations thereof including the possible addition of $Li_2O$, with a primary particle size between 0.01 and 10 microns
  Component D6: one or more additives to improve the mechanical integrity and provide supplemental functionality of the polymer electrolyte in the solid electrolyte layer, such as $P_2O_5$, $B_2O_3$, $Al_2O_3$, $Ga_2O_3$, $Y_2O_3$, $La_2O_3$, $SiO_2$, $ZrO_2$, $TiO_2$, and compounds arising from combinations thereof including the possible addition of $Li_2O$, with a primary particle size between 0.01 and 10 µm Excluding the solvent, the anode slurry may contain the previous components within the following ranges:
  Solid ionically conductive polymer materials between 0 and 10 wt. %
  active material between 85 and 95 wt. %
  binder content between 0.1 and 10 wt. %
  electronic conductor between 1 and 10 wt. %
  surfactant content between 0 and 5 wt. %

In this example, the composite volume of the anode layer may be defined as $Vol._{total}=\% Vol._{Component\ A}+\% Volume_{Component\ B}+\% Volume_{Component\ C}+\% Volume_{Component\ D}$
  The Volume % of Component A may be >35%, >50%, >55%, >60%, or >70%. It is noted that these values, similar as the example with the cathode, including factoring porosity values between 15 and 40% by volume.
  The Volume % of Component B may be <35%, <30%, <25%, <20%, or <15%
  The Volume % of Component C may be <40%, <30%, <20%, or <15%
  The Volume % of Component D may be <30%, <25%, <10%, or <5%
  The sum of the Volume % of Components C and D may be <40%, <30%, <20%, or <15%

The sizes of the particles including the powder forms of Components A, and B may also be described by the following:
  Of the Volume % including Component A, for which a mean particle size value $A_{mean}$ can be assigned, a percentage of the total population identified as $A_1$, will be characterized as having a size distribution for which the mean value, $A_{1,mean}$, may be greater than $A_{mean}$
  Of the Volume % including Component A for which a mean particle size value $A_{mean}$ can be assigned, a percentage of the total population, identified as $A_2$, will be characterized as having a size distribution for which the mean value, $A_{2,mean}$, may be less than $A_{mean}$
  Of the Volume % including Component A, particles belonging to a population with a size distribution described by a mean value $A_{1,mean}>A_{mean}$ form <100%, <95%, <85%, or <80%, with the remainder of Component A, identified by $A_2$, belonging to a population for which $A_{2,mean}<A_{mean}$, situated in the interstices between the larger particles
  Of the Volume % including Component B for which a mean particle size value $B_{mean}$ can be assigned, a percentage of the total population, identified as $B_1$, will be characterized as having a size distribution for which the mean value, $B_{1,mean}$, may be greater than $B_{mean}$
  Of the Volume % including Component B for which a mean particle size value $B_{mean}$ can be assigned, a percentage of the total population, identified as $B_2$, will be characterized as having a size distribution for which the mean value, $B_{2,mean}$, may be less than $B_{mean}$
  Of the Volume % including Component B, particles belonging to a population with a size distribution described by a mean value $B_{1,mean}>B_{mean}$ form >80%, <85%, <90%, or <95%, with the remainder of Component B, identified by $B_2$, belonging to a population for which $B_{2,mean}<B_{mean}$, situated in the interstices between the larger particles The relative fractions of Component A and Component B forming Composite(Total) may be described as follows:
  As the Volume % of Component A including a percentage of the total solid volume increases the Volume % of Component B including $B_2$ will increase relative to the Volume % of Component B including $B_1$
  As the ratio of Component $A_1$ to Component $A_2$ decreases the ratio of the Volume % of Component B including $B_1$ to the Volume % of Component B including $B_2$ will decrease
  The fraction of Component A added in the form of $A_1$ to Composite(Total) may be 100%, <95%, <90%, <85%, <80%, or <75%
  The fraction of Component B added in the form of $B_1$ to Composite(Total) may be 100%, <90%, <80%, <70%, <60%, <50%, 40%, <30%, <20%, or <15%

Prior its coating, the negative electrode slurry may be characterized by:
  A viscosity between 1100 and 2800 cps at 85 Hz
  A solid content between 40 and 65%
  A Hegman gauge below 80 µm or below 50 µm
  A particle size distribution as follows: d10<10 µm, d50<30 µm, d90<60 µm, d99<140 µm A representative particle size distribution curve is shown in plot 1100 of FIG. 11. Table 2 provides a particle size distribution of the slurry for the anode material coating while a representative viscosity curve is shown in plot 1200 of FIG. 12, where the viscosity is plotted against the shear rate.

TABLE 2

The particle size distribution of the slurry for the anode material coating, as depicted by the plot 1100.

| Distribution Percentile | Component A (Anode) | Representative Anode Slurry |
|---|---|---|
| $D_{10}$ | 8.69 | 7.98 |
| $D_{50}$ | 15.9 | 15.8 |
| $D_{90}$ | 29.2 | 30.6 |
| $D_{99}$ | 50.6 | 136 |

It should be appreciated that following the above methods, calendering may be conducted between room temperature (20° C.) and 60° C. in a low humidity environment. The negative electrode thickness post calendering may be between 100 and 400 µm.

Anode Slurry Mixing Process

Example Procedure 4 for Anode Slurry Mixing Process: Three-Stage Addition of Component D1A
  Component D1A may be added in steps ii, iii, and vi.
  i. Mixing Speed and Equipment
  Dispersion of the components may be achieved through a combination of single-shaft mixers equipped with sawtooth high-shear dispersers and multi-shaft mixers equipped with multiple high-shear dispersers, and low-shear anchor agitators, or low-shear helical-shaped paddles. Throughout the entire mixing process, the mixing speeds may be kept as described below:
    Low shear axis between 10 and 55 rpm
    High shear axis between 0 and 1500 rpm
  ii. Solution of Component D1 in Component D4
  First, component D1A and component D1B may each be dissolved in component D4 to form two solutions each at 0.5 to 3 wt. % and 25 to 60 wt. %, respectively.
  iii. Disperse Component D2
  A fraction of component D1A solution, between 5 and 30%, and component D2 may be mixed between 30 and 90 minutes. After this step, the slurry may be characterized by a solid content between 1 and 25 wt. %.

iv. Disperse Component B

Component B and another fraction of component D1A solution, between 30 and 70%, may be added to the previous slurry and mixed between 30 and 90 minutes. After this step, the solid content may be between 5 and 30 wt. %.

v. Disperse Component A

Half of component A may be added to the mixing vessel leading to a solid content between 25 and 60 wt. %; the solution may be mixed for 45 to 120 minutes. The other half of component A may be added to the mixing vessel leading to a solid content between 40 and 70 wt. % and mixed for 120 minutes to 16 hours.

vi. Disperse Component D1B

Another fraction of the component D1A, between 10 and 50%, may be added to the previous slurry and mixed between 30 and 90 minutes, bringing the solid content between 40 and 70 wt. %. The component D1B solution may be added to the slurry and mixed between 30 and 90 minutes. After this step, the slurry may be characterized by a solid content between 40 and 65 wt. % and a viscosity between 1100 and 2800 cps.

vii. Target Solids Percentage

Some additional solvent may be added at this point to adjust the final slurry characteristics. The slurry may be mixed for 30 to 120 minutes under vacuum.

Example Procedure 5 for Anode Slurry Mixing Process: Two-Stage Addition of Component D1A Component D1A may be added in steps ii and v.

vi. Mixing Speed and Equipment

Dispersion of the components may be achieved through a combination of single-shaft mixers equipped with saw-tooth high-shear dispersers and multi-shaft mixers equipped with multiple high-shear dispersers, and low-shear anchor agitators, or low-shear helical-shaped paddles. Throughout the entire mixing process, the mixing speeds may be kept as described below:
Low shear axis between 10 and 55 rpm
High shear axis between 0 and 1500 rpm vii. Solution of Component D1 in Component D4

First, component D1A and component D1B may each be dissolved in component D4 to form two solutions each at 0.5 to 3 wt. % and 25 to 60 wt. %, respectively.

viii. Disperse Component D2

A fraction of component D1A, between 50 and 85%, and component D2B may be mixed between 30 and 90 minutes. After this step, the solid content may be between 1 and 25 wt. %.

ix. Disperse Component B

Component B may be added to the previous slurry and mixed between 30 and 90 minutes. After this step, the solid content may be between 5 and 30 wt. %.

x. Disperse Component A

Half of the component A may be added to the mixing vessel; the solution may be mixed for 45 to 120 minutes. After this step, the solid content lies between 25 and 60 wt. %. The other half of component A and a fraction of component D1A solution, between 15 and 50%, may be added to the mixing vessel and mixed for 120 minutes to 16 hours. After this step, the slurry characteristics may include the solid content between 40 and 70 wt. %.

xi. Disperse Component D1B

Component D1B solution may be added to the slurry and mixed between 30 and 90 minutes.

xii. Target Solids Percentage

Some additional solvent may be added at this point to adjust the final slurry characteristics. The slurry may be mixed for 30 minutes to 120 minutes under vacuum. The final slurry characteristics may be the following:
d10<15 μm, d5<30 μm, d90<60 μm, d99<100 μm
Hegman gauge<80 μm
Solid content between 40 and 65 wt. %
Viscosity between 1100 and 2800 cps at 85 Hz Example Procedure 6 for Anode Slurry Mixing Process: Single Stage Addition of Primary Components A and B i. Mixing Speed and Equipment Dispersion of the components may be achieved with single-shaft mixers equipped with saw-tooth high-speed dispersers. Throughout the entire mixing process, the high shear axis mixing speed may be kept between 500 and 1200 rpm.

ii. Solution of Component D1 in Component D4

First, component D1A and component D1B may each be dissolved in component D4 to form two solutions each at 0.5 to 3 wt. % and 25 to 60 wt. %, respectively.

iii. Disperse Components D2, B, and A

Component D2 may be dispersed into a fraction of the component D1A solution together with component B, and all of component A for 90-120 minutes. The solids content of the slurry at this step may be 40-60%.

iv. Disperse Component D1B

Next, the slurry may be diluted with the remaining portion of the component D1A solution for 60-90 minutes. Lastly, a component D1B solution may be mixed into the slurry for 60-90 minutes. The final solids content may be between 45-50%.

Figure 13:
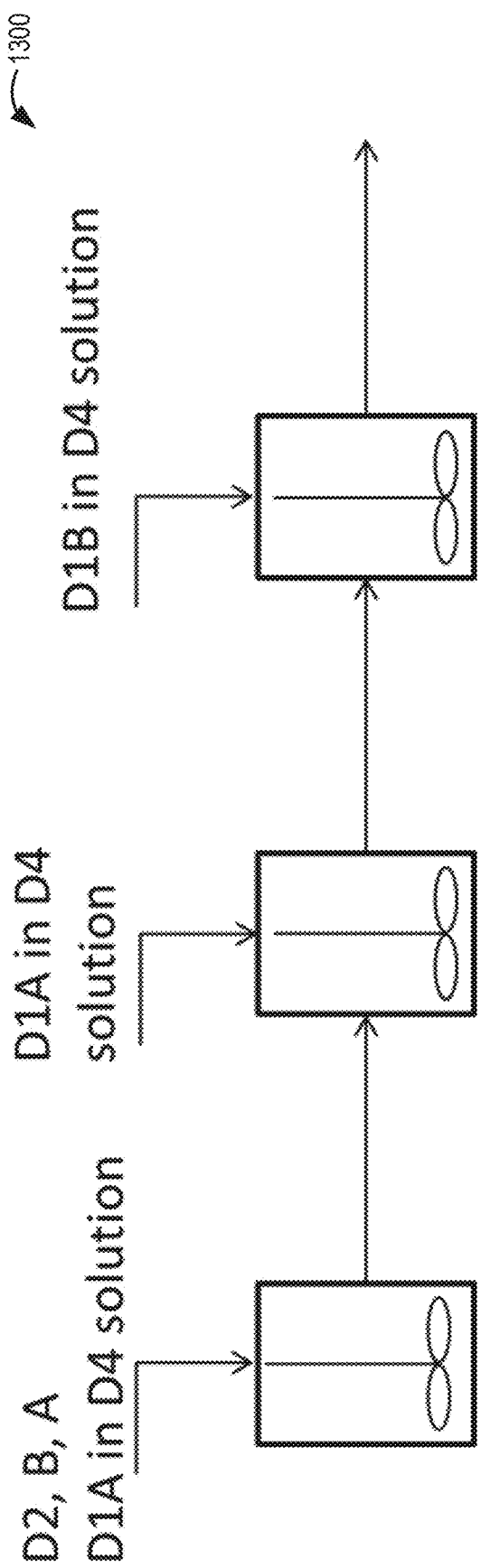
FIG. 13 shows a first process flow diagram for forming the slurry for the anode material coating.

A process flow diagram 1300 of Procedure 6 for Anode Slurry Mixing Process is depicted in FIG. 13.

Example Procedure 7 for Anode Slurry Mixing Process: Single Stage Addition of Primary Component A i. Mixing Speed and Equipment Dispersion of the components may be achieved with single-shaft mixers equipped with saw-tooth high-speed dispersers. Throughout the entire mixing process, the high shear axis mixing speed may be kept between 500 and 1200 rpm.

ii. Solution of Component D1 in Component D4

First, component D1A and component D1B may each be dissolved in component D4 to form two solutions each at 0.5 to 3 wt. % and 25 to 60 wt. %, respectively.

iii. Disperse Component D2 and D3

Component D2 and component D3 may be dispersed into component D1A solution. The solids content at this step may be 1-15%.

iv. Disperse Component B

Component B may be added and mixed for 30-90 minutes. The solids content at this step may be 5-30%.

v. Disperse Component A

Next, all of component A may be dispersed into the slurry for 90-120 minutes. The solids content at this step may be 40-70%.

vi. Disperse Component D1B

Lastly, component D1B solution may be mixed into the slurry for 30-60 minutes. The solids content at this step may be 45-65%.

Figure 14:
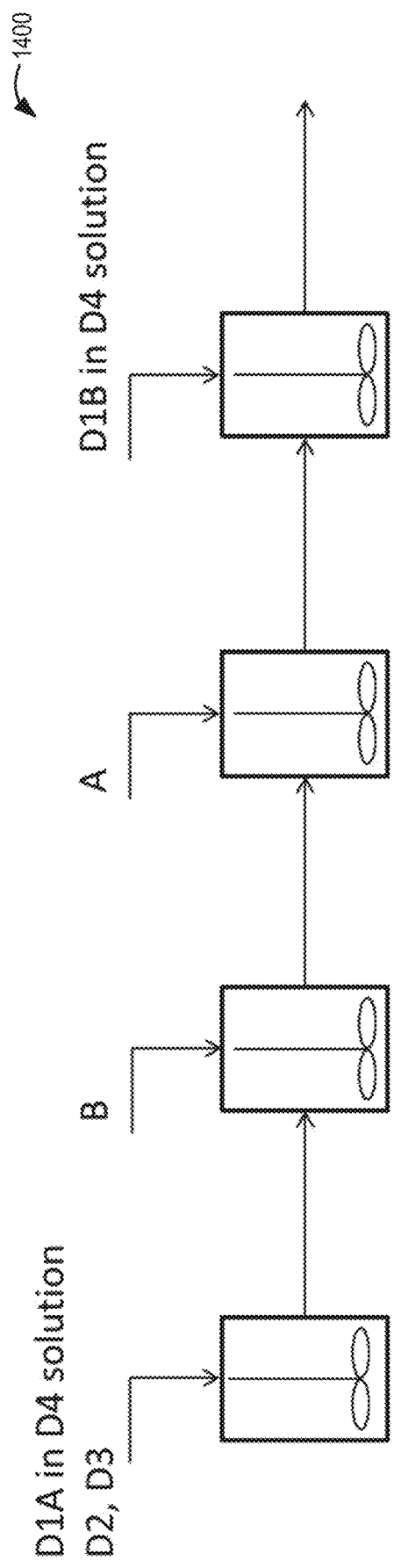
FIG. 14 shows a second process flow diagram for forming the slurry for the anode material coating.
Figure 15:
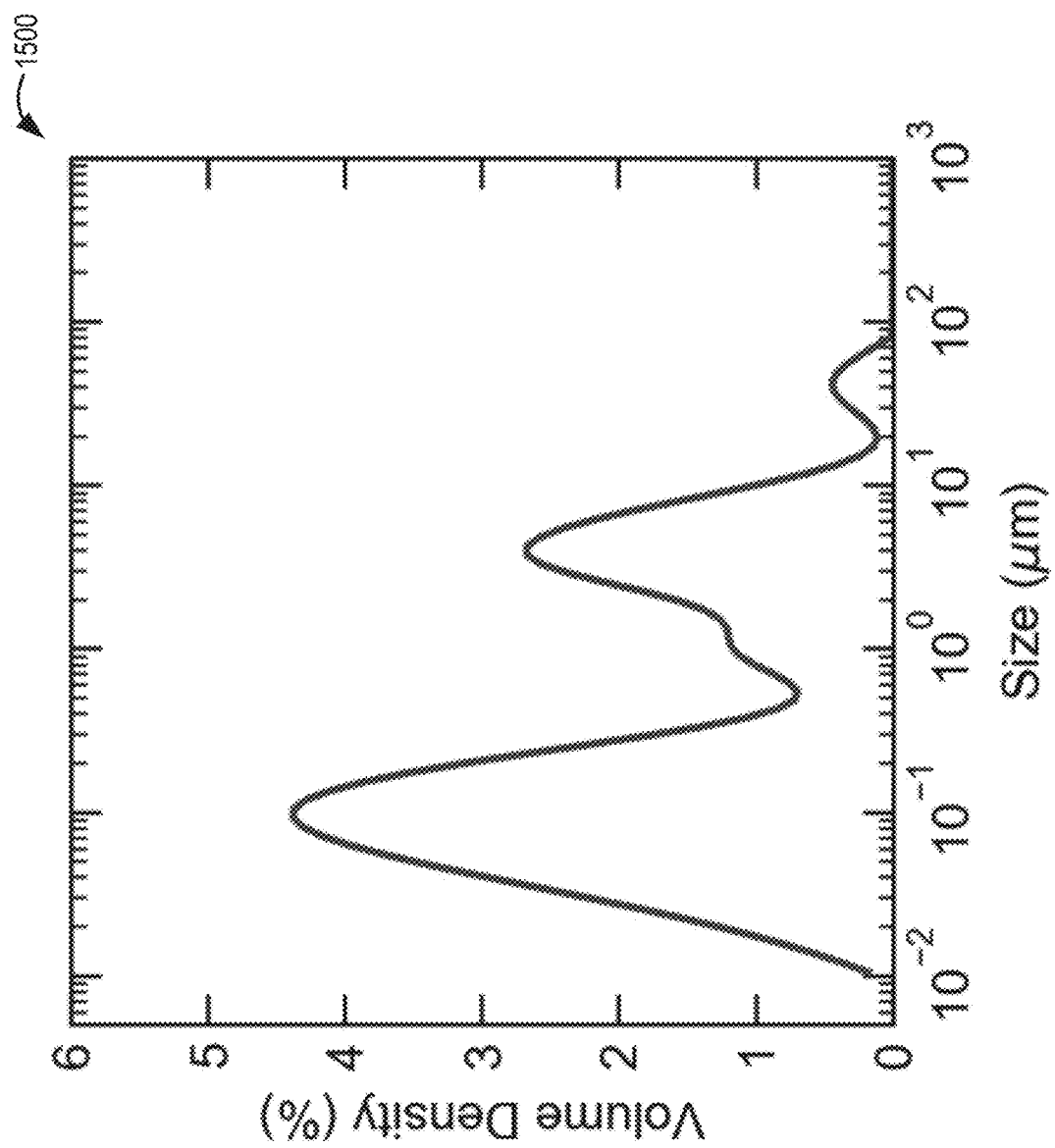
FIG. 15 shows a plot depicting a particle size distribution in a slurry for a separator coating.
Figure 16:
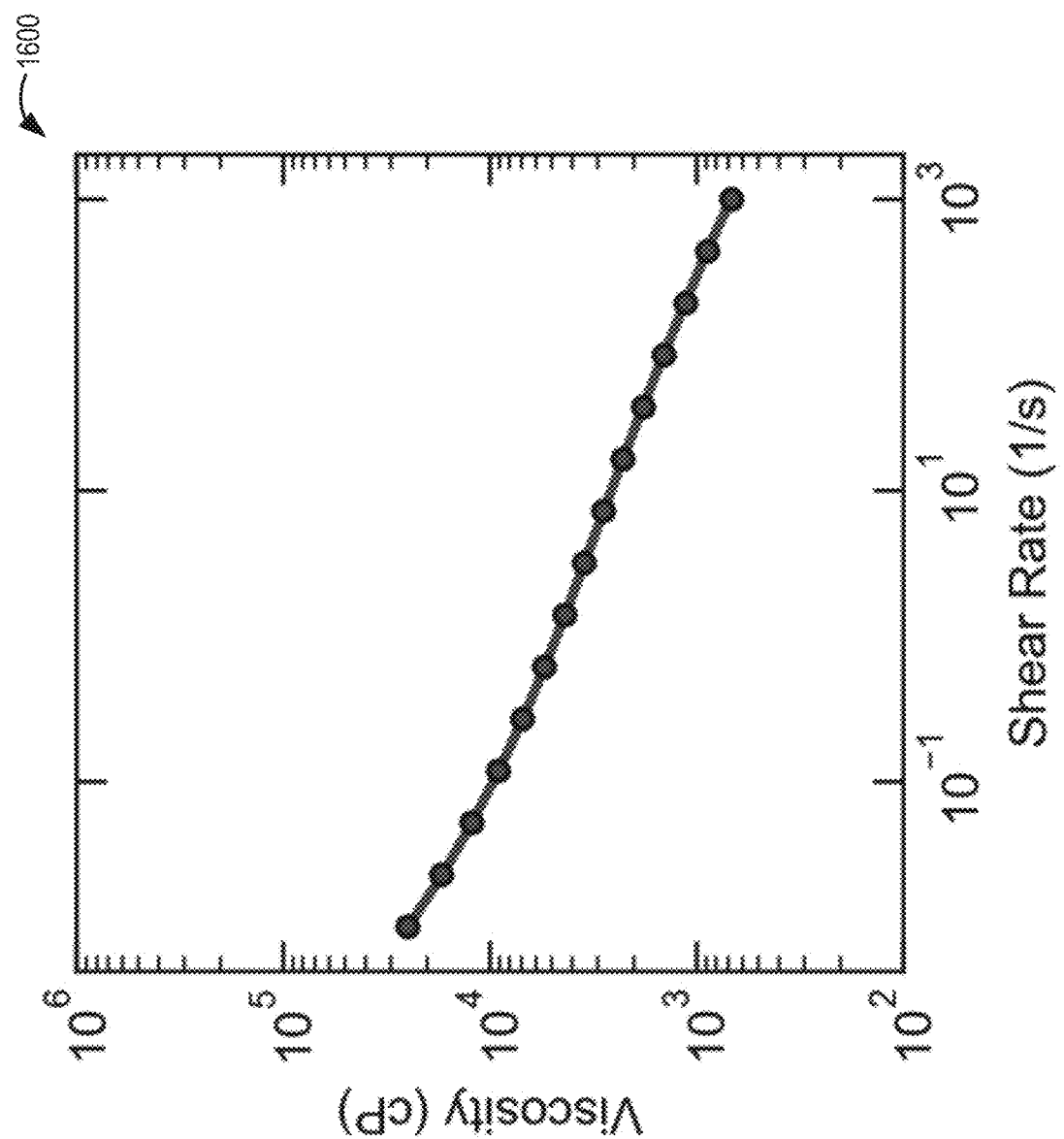
FIG. 16 shows a plot depicting viscosity versus shear rate in the slurry for the separator coating.

A process flow diagram 1400 of Example Procedure 7 for Anode Slurry Mixing Process is depicted in FIG. 14.

Example Procedure 8 for Anode Slurry Mixing Process: Four-Stage Addition of Component D1A i. Mixing Speed and Equipment Dispersion of the components may be achieved through a combination of single-shaft mixers equipped with sawtooth high-shear dispersers and multi-shaft mixers equipped with multiple high-shear dispersers, and low-shear anchor agitators, or low-shear helical-shaped paddles. Throughout the entire mixing process, the mixing speeds may be kept as described below:

Low shear axis between 10 and 55 rpm

High shear axis between 0 and 1500 rpm ii. Solution of Component D1 in Component D4

First, component D1A and component D1B may each be dissolved in component D4 to form two solutions each at 0.5 to 3 wt. % and 25 to 60 wt. %, respectively.

iii. Disperse Component D2 and B

A fraction of component D1 solution, between 55 and 90%, component D2, and component B may be mixed between 60 and 180 minutes. After this step, solid content may be between 5 and 20 wt. %.

iv. Disperse Component A

Half of component A may be added to the mixing vessel; the solution may be mixed for 60 to 240 minutes. After this step, the slurry characteristics include the solid content between 25 and 55 wt. %. The other half of the component A may be added to the slurry. A fraction of component D1A solution, between 10 and 45%, may be added at this point. The slurry may be mixed for 120 minutes to 16 hours. After this step, the solid content may be between 40 and 75 wt. %.

v. Disperse the Remainder of Component D1A

A fraction of component D1A solution, between 10 and 45%, may be added at this point. The slurry may be mixed between 30 and 60 minutes. After this step, the solid content may be between 40 and 70 wt. %.

vi. Disperse Component D1B

Component D1B solution and the rest of component D1A solution may be added to the slurry. Some solvent may also be added at this step to adjust the slurry viscosity. The slurry may be mixed between 30 minutes and 16 hours.

vii. Target Solids Percentage

Some additional solvent may be added at this point to adjust the final slurry characteristics. The slurry may be mixed for 30 minutes to 120 minutes under vacuum. The final slurry characteristics may be the following:

d10<15 µm, d50<30 µm, d90<60 µm, d99<100 µm

Hegman gauge<80 µm

Solid content between 40 and 65 wt. %

Viscosity between 1100 and 2800 cps at 85 Hz

Table 3 provides examples of the anode slurry mixing process with graphite (anode active material).

TABLE 3

Examples of the anode slurry mixing process with graphite (anode active material).

| Procedure | Dry adhesion (gf/in) | Graphite half-cell first Coulombic efficiency |
|---|---|---|
| 4 | 15 | 89% |
| 5 | 30 | 63% |
| 6 | 3 | 49% |

An alternative route to mixing for distribution of solid electrolyte component is also provided.

For example, to facilitate a distribution of component particles providing an optimum density with preservation of the component materials' functionality, the order with which the particulate populations of the different materials may be added to the mixture may be carefully selected. As described above, a tendency exists for smaller particles to intersperse amongst larger particles. For this to happen effectively, the uniformity of the distribution of the larger particles must first be established. Furthermore, to achieve as high a gravimetric capacity as possible the introduction of the totality of each of the component materials may be done in subsets to engineer the distribution of the large particle populations with respect to the smaller ones.

Given the previous definition of the composite volume of the anode layer, defined as $Vol._{total} = \% \, Vol._{Component \, A} + \% \, Volume_{Component \, B} + \% \, Volume_{Component \, C} + \% \, Volume_{Component \, D}$ Where Component A corresponds to the anode active material Where Component B corresponds to the ion conducting solid state polymer Where Component C corresponds to the free volume Where Component D corresponds to the volume arising from the presence of binder, additive, and other functional and non-functional components Of the Volume % including Component A, for which a mean particle size value $A_{mean}$ can be assigned, a percentage of the total population identified as $A_1$, will be characterized as having a size distribution for which the mean value, $A_{1,mean}$, may be greater than $A_{mean}$ Of the Volume % including Component A for which a mean particle size value $A_{mean}$ can be assigned, a percentage of the total population, identified as $A_2$, will be characterized as having a size distribution for which the mean value, $A_{2,mean}$, may be less than $A_{mean}$ Of the Volume % including Component B for which a mean particle size value $B_{mean}$ can be assigned, a percentage of the total population, identified as $B_1$, will be characterized as having a size distribution for which the mean value, $B_{1,mean}$, may be greater than $B_{mean}$ Of the Volume % including Component B for which a mean particle size value $B_{mean}$ can be assigned, a percentage of the total population, identified as $B_2$, will be characterized as having a size distribution for which the mean value, $B_{2,mean}$, may be less than $B_{mean}$ With consideration for the above design criteria the following prescribes the order by which the components of the anode layer may be combined to form a mixture of the Components A, B, C, and D by the process of mixing:

Step 1. Initially Component $A_1$ may be mixed with a portion of Component $B_2$ Step 2. Component $A_1$ may be mixed with a portion Component D providing a dispersed population of $A_1$ particles Step 3. Independently or in combination with Component $A_1$, Component $B_1$ and $A_2$ may be mixed together with further addition of a portion of Component D Step 4. A portion of Component $B_2$ may be added to the mixture Step 5. The remainder of Component $B_2$ and Component D may be added step-wise to the mixture until the mixture may include the totality of the Components $A_1$, $A_2$, $B_1$, $B_2$, and D A further limitation of the above strategy involves use of a discontinuous binder medium as part of Component D. The use of a discontinuous binder medium, which provides the functionality of a continuous and conformal coating without inhibiting the transfer of charged species at the interfaces between the active materials of the electrodes and the ionically conducting particles dispersed throughout the entirety of the battery's layers, or between the polymeric solid state particles forming the electrolyte layers. To deploy such a strategy staged mixing is again leveraged whereby the active materials of a given electrode may first be mixed in a wet or dry slurry with the solid electrolyte powder to establish a surface coating of the active material with the solid state electrolyte. This ionically conducting powder-coated active material may then be mixed with a binder vehicle which is resistant to dissolution in the slurry's solvent. Following mixing of the solid electrolyte coated active material and the non-soluble binder vehicle, additional soluble binder component(s) may be added to tune the mechanical durability of the electrode without jeopardizing the functionality of the ionically conducting and electroactive species.

An example of this process may be described as follows:

Step 1. Initially Component $A_1$ may be mixed with a portion of Component $B_2$ Step 2. The mixture of Component $A_1$ and Component $B_2$ may be mixed with a portion Component $D_{1A}$ (non-soluble binder) providing a dispersed population of $A_1$ particles decorated with $B_2$ particles and D1A (non-soluble binder) particles Step 3. A Portion of $B_1$ and Component $D_{1B}$ (soluble binder) may be added to the mixture of Component $A_1$ and Component $B_2$ and Component $D_1$ (non-soluble binder)

Step 4. Independently or in combination with the mixture of Component $A_1$, Component $B_2$ and $D_{1A}$ (non-soluble), Components $B_1$ and $A_2$ may be mixed together with further addition of a portion of Component $D_{1B}$ (soluble binder)

Step 5. A portion of Component $B_2$ may be added to the mixture

Step 6. The remainder of Component $B_2$ and Component $D_{1B}$ may be added step-wise to the mixture until the mixture may include the totality of the Components $A_1$, $A_2$, $B_1$, $B_2$, $D_{1A}$ and $D_{1B}$ To facilitate the intended distribution of the above components the following parameters may be used as to the method to guide the optimization of component particle size distributions:

The ratio of the average diameter of the electrode active materials to the solid polymer electrolyte may be less than 7, less than 6, less than 5, or less than 4.

The most prevalent particle size of the anode active material Component $A_1$ may be <30 microns, greater than 5 microns, or 1 microns The most prevalent particle size of the anode active material Component $A_2$ may be >0.5 microns, >1 micron, <5 microns, or 1.5 microns The most prevalent particle size of the solid polymer electrolyte Component $B_1$ may be <5 microns or >1.6 microns The most prevalent particle size of the solid polymer electrolyte Component $B_2$ may be <1.5 microns, >0.35 microns, or 0.7 microns The minimum characteristic particle size of the solid polymer electrolyte may be <1 micron, <0.5 microns, <0.2 microns, or <0.05 microns The maximum characteristic particle size of the solid polymer electrolyte may be >10 microns, >20 microns, or <50 microns The minimum characteristic particle size of the anode active material may be greater than 0.5, >1, >2, or >5 microns and the maximum characteristic particle size of the anode may be <70, <60, <50, <40, <30, <20, or <15 microns The particle size distributions of the subpopulations can be approximated using a log-normal distribution function including individual or multiple components. Component A and Component B can be approximated using multiple components having a log-normal distribution $$f(x) = \frac{1}{x} \cdot \frac{1}{\sigma\sqrt{2\pi}} \exp\left(-\frac{(\ln x - \mu)^2}{2\sigma^2}\right)$$

where x is the particle size, μ is the mean particle size, and σ is the standard deviation or the dispersity The dispersity of Component $A_1$ may be <0.5, <0.3, <0.2, or <0.15

The dispersity of Component $A_2$ may be <0.45, <0.4, <0.3, <0.2, or <0.15

The dispersity of Component B may be <0.7, <0.65, or <0.6

The dispersity of Component $B_1$ may be <0.7, <0.6, <0.5, <0.4, <0.3, or <0.2

The dispersity of Component $B_2$ may be <0.9, <0.8, <0.7, <0.6, <0.5, <0.45, or <0.4

Anode Slurry Coating Process

In one example, the anode slurry may be coated at a speed between 1 and 10 m/min using one of the coating methods described hereinabove (e.g., Example Procedure 4, 5, 6, 7, or 8). Following a coating, the electrode roll passes through a set of multiple ovens where the drying conditions may be set to achieve an evaporation rate range of 30-150 g/min. This range of values may be optimized for reduced migration or spatial gradient of component D1 (binder), a networked distribution of component B (the solid ionically conductive polymer material), an optimized uniformity in coat weight across the width of a coating, and good coating adhesion (≥10 gf/in). The latter parameter may be important for subsequent stamping of electrodes without compromising the integrity of the coating with delamination on the surface or along the edges of the stamped electrode.

Interfacial Cathode-Separator Layer

In another example, the interfacial cathode-separator layer of the cell may include a number of materials that in isolated populations may be characterized as powders insofar as including a multitude of particles of similar composition and characteristics. These powders may be combined with other materials to form a slurry to facilitate deposition of a continuous layer, possessing a functionality derived from the composite thereof, onto a substrate, which in the case of the present invention may be a current collector or a previously manufactured electrode, separator, or assembly including a combination thereof. In the following a description of the component materials, routes by which they may be combined to form a slurry, the characteristics of the slurry, and methods for casting of the slurry are provided.

In one example, the composite body including the interfacial cathode-separator layer, and the slurry from which it is derived, may be formed from the combination of a number of materials of both active and passive functionalities. Some of these candidate materials may be deployed on a sacrificial basis during the formation of the slurry and may later be removed after the casting of the slurry during steps required to finish manufacturing of said layer.

The slurry employed for application of the interfacial layer between the cathode layer and the separator layer must include one or more solid ionically conductive polymer materials as the primary ion-conducting medium and a cathode active material as the primary energy storage medium. The primary particle size of the solid ionically conductive polymer material(s) may be between 0.01 and 20 µm.

In one example, the composite of the interfacial cathode-separator the form of a slurry or other may be defined according to the following:

Composite(Total)=Component A+Component B+Component C+Component D

Where Component A corresponds to the cathode active material

Where Component B corresponds to the ion conducting solid state polymer

Where Component C corresponds to the free volume

Where Component D corresponds to the volume arising from the presence of binder, additive, and other functional and non-functional components Whereby the interfacial cathode-separator slurry may include the following components:

Component A
one or a combination of active materials such as one or more of the following active materials: Lithium iron phosphate (LFP), spinel LNMO, $LiCoPO_4$, $LiNiPO_4$, LVP, LVPF, $LiNi_xMn_yCo_zO_2$, or $LiNi_xCo_yAl_zO_2$, with a primary particle size between 0.01 and 20 µm Component B
one or more solid ionically conductive polymer materials as ion-conducting agent with a primary particle size between 0.01 and 20 µm Component C Component D
Component D1: a binder including at least one compound selected from the group including polyethers, polyesters, carboxymethylcellulose, or polymers based on at least one monomer, such as methyl methacrylate, acrylonitrile, styrene, butadiene, acrylic acid or vinylidene fluoride Component D2: an electronic conductor such as carbon black, super P, vapor grown carbon fiber Component D3: one or more surfactants for homogeneity of the slurry such as sulfates, sulfonates, phosphates, and carboxylates Component D4: one or more dispersing solvents such as acetone, isopropanol, methanol, toluene, n-methyl pyrrolidone, and water Component D5: one or more inorganic additives for the reduction of interfacial impedance, such as $LiNbO_3$, $LiTaO_3$, $LiNb_xTa_{1-x}O_3$, $BaTiO_3$, and including $P_2O_5$, $B_2O_3$, $Al_2O_3$, $Ga_2O_3$, $Y_2O_3$, $La_2O_3$, $SiO_2$, $ZrO_2$, $TiO_2$, and compounds arising from combinations thereof including the possible addition of $Li_2O$, with a primary particle size between 0.01 and 10 microns Component D6: one or more additives to improve the mechanical integrity of the solid electrolyte layer, such as $B_2O_3$, $Al_2O_3$, γ-AlO(OH), $Ga_2O_3$, $Y_2O_3$, $La_2O_3$, and including $P_2O_5$, $B_2O_3$, $Al_2O_3$, $Ga_2O_3$, $Y_2O_3$, $La_2O_3$, $SiO_2$, $ZrO_2$, $TiO_2$, and compounds arising from combinations thereof including the possible addition of $Li_2O$, with a primary particle size between 0.01 and 10 µm Component D7: one or more Li salts including $Li^+$ cations such as $LiClO_4$, $LiAsF_6$, $LiPF_6$, $LiBF_4$, $LiRFSO_3$, $LiCH_3SO_3$, $LiN(RFSO_2)_2$, $LiC(RFSO_2)_3$, LiTFSI (lithium trifluoromethane sulphonylimide), LiBOB (lithium bis(oxalato)borate), LiBETI (lithium bis (perfluoroethylsulfonyl)imide)

Component D8: one or more additives for interfacial impedance reduction such as urethane-containing molecules, such as urethane functionalized PEG, urethane functionalized perfluoropolyethers, and alkylurethanes; 1-methyl-3-pyrrolidinone; 1,3-dimethyl-3,4,5,6-tetrahydro-2(1H)-pyrimidinone; 1,5-dimethyl-2-pyrrolidinone; alkyl substituted pyridinium-based ionic liquids, alkyl substituted pryrolidinium-based ionic liquids, and alkyl substituted ammonium-based ionic liquids with counter anions such as TFSI, $PF_6$, $BF_4$ anions; substituted poly(ethylene glycol) with functional end groups such as carbonates (linear or cyclic), carbamates (linear or cyclic), or nitriles; poly(ethylene glycol) bis(carboxymethyl) ether; dioctyl sulfosuccinate sodium, lithium, or potassium salts; glycolic acid ethoxylate 4-tert-butylphenyl ether; glycolic acid ethoxylate lauryl ether; glycolic acid ethoxylate 4-nonylphenyl ether; glycolic acid ethoxylate oleyl ether; poly(ethylene glycol) 4-nonylphenyl 3-sulfopropyl ether sodium, lithium, or potassium salts; and sodium, lithium, or potassium dodecylbenzenesulfonate In this example, excluding the solvent, the interfacial layer slurry between the cathode layer and the separator layer may contain the previous components within the following range:

solid ionically conductive polymer materials between 12 and 45 wt. % active material between 50 and 85 wt. % binder content between 0.1 and 10 wt. % electronic conductor between 1 and 10 wt. % surfactant content between 0 and 5 wt. %

In some examples, the composite volume of the cathode-separator interfacial layer may be defined as as $Vol._{total}$=% $Vol._{Component\ A}$+% $Volume_{Component\ B}$+% $Volume_{Component\ C}$+% $Volume_{Component\ D}$ The Volume % of Component A may be >15%, >30%, >45%, >50%, >55%, or >60%

The Volume % of Component B may be <70%, <60%, <50%, <45%, <40%, <35%, <30%, or <25%

The Volume % of Component C may be <40%, <30%, <20, or <15%

The Volume % of Component D may be <30%, <25%, <10%, or <5%

The sum of the Volume % of Components C and D may be <40%, <30%, <20%, or <15%

The sizes of the particles including the powder forms of the Components A, and B may also be described by the following:

Of the Volume % including Component A, for which a mean particle size value $A_{mean}$ can be assigned, a percentage of the total population identified as $A_1$, will be characterized as having a size distribution for which the mean value, $A_{1,mean}$, may be greater than $A_{mean}$ Of the Volume % including Component A for which a mean particle size value $A_{mean}$ can be assigned, a percentage of the total population, identified as $A_2$, will be characterized as having a size distribution for which the mean value, $A_{2,mean}$, may be less than $A_{mean}$ Of the Volume % including Component A, particles belonging to a population with a size distribution described by a mean value $A_{1,mean}$>$A_{mean}$ form <20%, <15%, <10%, and <5%, with the remainder of Component A, identified by $A_2$, belonging to a population for which $A_{2,mean}$<$A_{mean}$ Of the Volume % including Component B for which a mean particle size value $B_{mean}$ can be assigned, a percentage of the total population, identified as $B_1$, will be characterized as having a size distribution for which the mean value, $B_{1,mean}$, may be greater than $B_{mean}$ Of the Volume % including Component B for which a mean particle size value $B_{mean}$ can be assigned, a percentage of the total population, identified as $B_2$, will be characterized as having a size distribution for which the mean value, $B_{2,mean}$, may be less than $B_{mean}$ Of the Volume % including Component B, particles belonging to a population with a sie distribution described by a mean value $B_{1,mean}>B_{mean}$ form <100%, <95%, <85%, or <80%, with the remainder of Component B, identified by $B_2$, belonging to a population for which $B_{2,mean}<B_{mean}$, situated in the interstices between the larger particles For example, the relative fractions of Component A and Component B forming Composite(Total) may be described as follows:

The fraction of Component A added in the form of $A_1$ to Composite(Total) may be 25%, <20%, <15%, <10%, <5%

The fraction of Component B added in the form of $B_1$ to Composite(Total) may be >35%, >45%, >55%, >65%, >75%, >85%

Prior to its coating, the cathode-separator interfacial slurry may be characterized by:
A viscosity between 500 and 2600 cps at 85 Hz as measured by parallel plate rheometry
A solid content between 40 and 75%
A Hegman gauge below 90 µm or below 50 µm
A particle size distribution as follows: d10<10 µm, d50<30 µm, d90<60 µm, d99<100 µm The positive electrode thickness including the interfacial cathode-separator interface layer post calendering may be between 105 and 450 µm. Calendering may be conducted between room temperature (20° C.) and 140° C. in a low humidity environment.

Cathode-Separator Interfacial Layer Slurry Mixing Process

A number of example processes are described below.

Example Procedure 9 for Cathode-Separator Interfacial Slurry Mixing Process: Addition of Component D1 (Binder) in Multiple Stages as a Solution i. Mixing Speed and Equipment
Dispersion of the components may be achieved through a combination of single-shaft mixers equipped with sawtooth high-shear dispersers and multi-shaft mixers equipped with multiple high-shear dispersers, and low-shear anchor agitators, or low-shear helical-shaped paddles. Throughout the entire mixing process, the mixing speeds may be kept as described below:
Low shear axis between 10 and 55 rpm
High shear axis between 0 and 1500 rpm ii. Solution of Component D1 in Component D4
First, component D1 may be dissolved in component D4 to form a solution at 1 and 15 wt. %.

iii. Disperse Component D2
A fraction of component D1 solution, between 10 and 60%, and the component D2 may be mixed between 30 and 90 minutes. After this step, the solid content lies between 5 and 30 wt. %.

iv. Disperse Component B
Component B and another fraction of component D1 solution, between 5 and 40%, may then be added to the previous suspension and mixed between 30 and 90 minutes. Following this step, the solid content may be between 10 and 50 wt. %.

v. Disperse Component A
Half of the component A may be added to the mixing vessel along with another fraction of the component D1 solution, between 10 and 70%; the solution may be mixed for another 45 to 120 minutes. After this step, the solid content may be between 40 and 80 wt. %. The other half of component A and the remaining fraction of component D1 solution may be added to the mixing vessel and mixed for 120 minutes to 16 hours.

vi. Target Solids Percentage
Some additional component D4 may be added at this point to target the final slurry characteristics described in the options provided for Component D4 hereinabove. After this step, the slurry characteristics should be:
d10<10 µm, d50<30 µm, d90<60 µm, d99<100 µm
Hegman gauge<50 µm
Solid content between 40 and 80 wt. %
Viscosity between 2000 and 2600 cps at 85 Hz A process flow diagram 900 of Example Procedure 9 is depicted in FIG. 9.

Example Procedure 10 for Cathode-Separator Interfacial Slurry Mixing Process: Addition of Binder as a Powder in a Single Stage i. Mixing Speed and Equipment
Dispersion of the components may be achieved through a combination of single-shaft mixers equipped with sawtooth high-shear dispersers and multi-shaft mixers equipped with multiple high-shear dispersers, and low-shear anchor agitators, or low-shear helical-shaped paddles. Throughout the entire mixing process, the mixing speeds may be kept as described below:
Low shear axis between 10 and 55 rpm
High shear axis between 0 and 1500 rpm ii. Disperse Component D2
Component D4, component D1, and component D2 may be mixed between 30 and 90 minutes. After this step, the solid content may be between 5 and 30 wt. %.

iii. Disperse Component B
Component B and some more of component D4 may be added to the previous suspension and mixed between 30 and 90 minutes. Following this step, the slurry solid content may be between 10 and 50 wt. %.

iv. Disperse Component A
Half of the component A may be added to the mixing vessel along with some more of component D4; the solution may be mixed for another 45 to 120 minutes. After this step, the slurry solid content lies between 40 and 80 wt. %. The other half of the component A and some more of component D4 may be added to the mixing vessel and mixed for 120 minutes to 16 hours.

v. Target Solids Percentage
Some additional solvent may be added at this point to target the final slurry characteristics described hereinabove. After this step, the slurry characteristics may be:
d10<10 µm, d50<30 µm, d90<60 µm, d99<100 µm
Hegman gauge<50 µm
Solid content between 40 and 80 wt. %
Viscosity between 1000 and 2000 cps at 85 Hz Example Procedure 11 for Cathode-Separator Interfacial Slurry Mixing Process: Mixing with Only High Shear Disperser i. Mixing Speed and Equipment Dispersion of the components may be achieved with single-shaft mixers equipped with saw-tooth high-speed dispersers. Throughout the entire mixing process, the high shear axis mixing speed may be kept between 0 and 1500 rpm.

ii. Solution of Component D1 in Component D4

First, component D1 may be dissolved in component D4 to form a solution at 1 and 15 wt. %.

iii. Disperse Component D2

Component D1 in D4 solution may be used wherein component D2A from the options provided for Component D2 hereinabove may be first dispersed. This may be mixed for 30-90 minutes. Next, a second component, component D2B, from the options provided for Component D2 hereinabove may then be dispersed for another 30-90 minutes. The solids content may be approximately 10%.

iv. Disperse Component B

Next, component B may be dispersed into the slurry for 30-90 minutes. Component A may be added in its entirety after this step where the slurry may be subjected to mix for 2-12 hours.

v. Target Solids Percentage

Finally, component D4 may be added to adjust the solids content of the slurry to between 50-60%.

An alternative route to mixing for distribution of solid electrolyte component is also provided.

As described above in the other examples, to facilitate a distribution of component particles providing an optimum density with preservation of the component materials' functionality, the order with which the particulate populations of the different materials may be added to the mixture must be carefully selected. A tendency exists for smaller particles to intersperse amongst larger particles. For this to happen effectively, the uniformity of the distribution of the larger particles must first be established. Furthermore, to achieve as high a gravimetric capacity as possible the introduction of the totality of each of the component materials can be done in subsets to engineer the distribution of the large particle populations with respect to the smaller ones.

Given the composite volume of the cathode-separator layer may be defined as $Vol._{total}=\% \, Vol._{Component\,A}+\% \, Volume_{Component\,B}+\% \, Volume_{Component\,C}+\% \, Volume_{Component\,D}$ Where Component A corresponds to the cathode active material Where Component B corresponds to the ion conducting solid state polymer Where Component C corresponds to the free volume Where Component D corresponds to the volume arising from the presence of binder, additive, and other functional and non-functional components Of the Volume % including Component A, for which a mean particle size value $A_{mean}$ can be assigned, a percentage of the total population identified as $A_1$, will be characterized as having a size distribution for which the mean value, $A_{1,mean}$, may be greater than $A_{mean}$ Of the Volume % including Component A for which a mean particle size value $A_{mean}$ can be assigned, a percentage of the total population, identified as $A_2$, will be characterized as having a size distribution for which the mean value, $A_{2,mean}$, may be less than $A_{mean}$ Of the Volume % including Component B for which a mean particle size value $B_{mean}$ can be assigned, a percentage of the total population, identified as $B_1$, will be characterized as having a size distribution for which the mean value, $B_{1,mean}$, may be greater than $B_{mean}$ Of the Volume % including Component B for which a mean particle size value $B_{mean}$ can be assigned, a percentage of the total population, identified as $B_2$, will be characterized as having a size distribution for which the mean value, $B_{2,mean}$, may be less than $B_{mean}$ With consideration for the above design criteria the following prescribes the order by which the components of the cathode-separator layer may be combined to form a mixture of the Components A, B, C, and D by the process of mixing:

Step 1. Component $A_2$ and $B_1$ may be combined in a step-wise fashion and may be mixed with a portion of Component D providing a dispersed population Step 2. A portion of Component $B_2$ may be added to the mixture with further addition of a portion of Component D Step 3. The remainder of Component $B_2$ and Component D may be added step-wise to the mixture until the mixture may include the totality of the Components $A_2$, $B_1$, $B_2$ and D Likewise, as described above, the above strategy may use a discontinuous binder medium as part of Component D. The use of a discontinuous binder medium, which provides the functionality of a continuous and conformal coating without inhibiting the transfer of charged species at the interfaces between the active materials of the electrodes and the ionically conducting particles dispersed throughout the entirety of the battery's layers, or between the polymeric solid state particles forming the separator layers. To deploy such a strategy staged mixing is again leveraged whereby the active materials of a given electrode may first be mixed in a wet or dry slurry with the solid electrolyte powder to establish a surface coating of the active material with the solid state electrolyte. This ionically conducting powder-coated active material may then be mixed with a binder vehicle which is resistant to dissolution in the slurry's solvent. Following mixing of the solid electrolyte coated active material and the non-soluble binder vehicle, additional soluble binder component(s) may be added to tune the mechanical durability of the electrode without jeopardizing the functionality of the ionically conducting and electroactive species.

For example, a version of this process may be described as follows:

Step 1. Component $A_2$ and $B_1$ may be combined in a step-wise fashion and may be mixed with a portion of Component D providing a dispersed population Step 2. The mixture of Component $A_2$ and $B_1$ may be mixed with a portion of Component $D_{1A}$ (non-soluble binder) providing a dispersed population of $A_2$, $B_1$, and $D_{1A}$ particles Step 3. A portion of Component $B_2$ may be added to the mixture with addition of a portion of Component $D_{1B}$ (soluble binder)

Step 4. The remainder of Component $B_2$ and Component $D_{1B}$ (soluble binder) may be added step-wise to the mixture until the mixture may include the totality of the Components $A_2$, $B_1$, $B_2$ and D Similar to the above descriptions, to facilitate the intended distribution of the above components the following parameters may be applied to the methods to guide the optimization of component particle size distributions:

The ratio of the average diameter of the electrode active materials to the solid polymer electrolyte may be less than 7, less than 6, less than 5, or less than 4.

The most prevalent particle size of the cathode active material Component $A_1$ may be <20 microns, greater than 5 microns, or 10 microns The most prevalent particle size of the cathode active material Component $A_2$ may be >0.5 microns, >1 micron, <15 microns, <5 microns, or 1.5 microns The minimum characteristic particle size of the cathode active material may be greater than 0.5, >1, >2, or >5 microns and the maximum characteristic particle size of the cathode may be <70, <50, <30, <20, or <15 microns The most prevalent particle size of the solid polymer electrolyte Component $B_1$ may be <5 microns or >1.6 microns The most prevalent particle size of the solid polymer electrolyte Component $B_2$ may be <1.5 microns, >0.35 microns, or 0.7 microns The minimum characteristic particle size of the solid polymer electrolyte may be <1 micron, <0.5 microns, <0.2 microns, or <0.05 microns The maximum characteristic particle size of the solid polymer electrolyte may be >10 microns, >20 microns, or <50 microns The particle size distributions of the subpopulations can be approximated using a log-normal distribution function including individual or multiple components. Component A and Component B can be approximated using multiple components having a log-normal distribution $$f(x) = \frac{1}{x} \cdot \frac{1}{\sigma\sqrt{2\pi}} \exp\left(-\frac{(\ln x - \mu)^2}{2\sigma^2}\right)$$

where x is the particle size, µ is the mean particle size, and σ is the standard deviation or the dispersity The dispersity of Component $A_1$ may be <0.5, <0.4, <0.3, <0.2, or <0.15

The dispersity of Component $A_2$ may be <0.5, <0.45, <0.4, <0.3, <0.25, or <0.15

The dispersity of Component B may be <0.7, <0.65, or <0.6

The dispersity of Component $B_1$ may be <0.7, <0.6, <0.5, <0.4, <0.3, or <0.2

The dispersity of Component $B_2$ may be <0.9, <0.8, <0.7, <0.6, <0.5, <0.45, or <0.4

Cathode-Separator Interfacial Layer Slurry Coating Process

In one example, the cathode-separator interfacial layer can be coated, casted, deposited, or laid onto the positive, the negative, or both electrodes to ensure high conformity between the separator layer and the electrodes. The coating process may be performed according to the following configurations:

The same separator formulation coated on the anode and on the cathode,

Two different separator formulations coated on the anode allowing for optimized chemical and electrochemical stability between each electrode and the separator, A succession of layers of different formulation coated on the anode and/or on the cathode to allow for a gradient of separator composition enhancing the chemical and electrochemical stability of the electrodes with the separator.

To ensure continuous coverage of the electrode onto which the separator layer is to be coated, the width of the two coated layers may be identical. The width of the separator layer may also be slightly larger than the coating width of the supporting electrode.

The cathode-separator interfacial layer slurry may be coated at a speed between 1 and 10 m/min using one of the coating methods described hereinabove (e.g., Example Procedure 9, 10, or 11). Following a coating, the electrode roll passes through a set of multiple ovens where the drying conditions may be set to achieve an evaporation rate range of 30-200 g/min. This range of values may be optimized for reduced migration or spatial gradient of component D1 (binder), a networked distribution of component B (the solid ionically conductive polymer material), an optimized uniformity in coat weight across the width of a coating, and good coating adhesion (≥10 gf/in). The latter parameter may provide for subsequent stamping of electrodes without compromising the integrity of the coating with delamination on the surface or along the edges of the stamped electrode.

Interfacial Anode-Separator Layer

In one example, the interfacial anode-separator layer of the cell may include a number of materials that in isolated populations may be characterized as powders insofar as including a multitude of particles of similar composition and characteristics. These powders may be combined with other materials to form a slurry to facilitate deposition of a continuous layer, possessing a functionality derived from the composite thereof, onto a substrate, which in the case of the present invention may be a current collector or a previously manufactured electrode, separator, or assembly including a combination thereof. In the following a description of the component materials, routes by which they may be combined to form a slurry, the characteristics of the slurry, and methods for casting of the slurry are provided.

The composite body including the interfacial anode-separator layer, and the slurry from which it is derived, may be formed from the combination of a number of materials of both active and passive functionalities. Some of these candidate materials may be deployed on a sacrificial basis during the formation of the slurry and may later be removed after the casting of the slurry during steps required to finish manufacturing of said layer.

The slurry employed for application of the interfacial layer between the anode layer and the separator layer must include one or more solid ionically conductive polymer materials as the primary ion-conducting medium and an anode active material as the primary energy storage medium. The primary particle size of the solid ionically conductive polymer material(s) may be between 0.01 and 20 µm.

The composite of the anode-separator in the form of a slurry or other may be defined according to the following:

Composite(Total)=Component A+Component B+Component C+Component D

Where Component A corresponds to the anode active material

Where Component B corresponds to the ion conducting solid state polymer

Where Component C corresponds to the free volume

Where Component D corresponds to the volume arising from the presence of binder, additive, and other functional and non-functional components Whereby the interfacial anode-separator slurry may include the following components:

Component A one or a combination of active materials such as graphite, silicon, silicon oxide, lithium metal, lithium titanium oxide, with a primary particle size between 0.01 and 20 µm or a foil thickness below 50 µm Component B
  one or more solid ionically conductive polymer materials as ion-conducting agent with a primary particle size between 0.01 and 20 μm
Component C
Component D
  Component D1: a binder including at least one compound selected from the group including polyethers, polyesters, carboxymethylcellulose, or polymers based on at least one monomer, such as methyl methacrylate, acrylonitrile, styrene, butadiene, acrylic acid or vinylidene fluoride
  Component D2: an electronic conductor such as carbon black, super P, vapor grown carbon fiber
  Component D3: one or more surfactants for homogeneity of the slurry such as sulfates, sulfonates, phosphates, and carboxylates
  Component D4: one or more dispersing solvents such as acetone, isopropanol, methanol, toluene, n-methyl pyrrolidone, and water
  Component D5: one or more inorganic additives for the reduction of interfacial impedance, such as $LiNbO_3$, $LiTaO_3$, $LiNb_xTa_{1-x}O_3$, $BaTiO_3$, and including $P_2O_5$, $B_2O_3$, $Al_2O_3$, $Ga_2O_3$, $Y_2O_3$, $La_2O_3$, $SiO_2$, $ZrO_2$, $TiO_2$, and compounds arising from combinations thereof including the possible addition of $Li_2O$, with a primary particle size between 0.01 and 10 microns
  Component D6 one or more additives to improve the mechanical integrity of the solid electrolyte layer, such as $B_2O_3$, $Al_2O_3$, γ-AlO(OH), $Ga_2O_3$, $Y_2O_3$, $La_2O_3$, and including $P_2O_5$, $B_2O_3$, $Al_2O_3$, $Ga_2O_3$, $Y_2O_3$, $La_2O_3$, $SiO_2$, $ZrO_2$, $TiO_2$, and compounds arising from combinations thereof including the possible addition of $Li_2O$, with a primary particle size between 0.01 and 10 μm
  Component D7: one or more Li salts including $Li^+$ cations such as $LiClO_4$, $LiAsF_6$, $LiPF_6$, $LiBF_4$, $LiRFSO_3$, $LiCH_3SO_3$, $LiN(RFSO_2)_2$, $LiC(RFSO_2)_3$, LiTFSI (lithium trifluoromethane sulphonylimide), LiBOB (lithium bis(oxalato)borate), LiBETI (lithium bis (perfluoroethylsulfonyl)imide)
  Component D8: one or more additives for interfacial impedance reduction such as urethane-containing molecules, such as urethane functionalized PEG, urethane functionalized perfluoropolyethers, and alkylurethanes; 1-methyl-3-pyrrolidinone; 1,3-dimethyl-3,4,5,6-tetrahydro-2(1H)-pyrimidinone; 1,5-dimethyl-2-pyrrolidinone; alkyl substituted pyridinium-based ionic liquids, alkyl substituted pryrolidinium-based ionic liquids, and alkyl substituted ammonium-based ionic liquids with counter anions such as TFSI, $PF_6$, $BF_4$ anions; substituted poly(ethylene glycol) with functional end groups such as carbonates (linear or cyclic), carbamates (linear or cyclic), or nitriles; poly(ethylene glycol) bis(carboxymethyl) ether; dioctyl sulfosuccinate sodium, lithium, or potassium salts; glycolic acid ethoxylate 4-tert-butylphenyl ether; glycolic acid ethoxylate lauryl ether; glycolic acid ethoxylate 4-nonylphenyl ether; glycolic acid ethoxylate oleyl ether; poly(ethylene glycol) 4-nonylphenyl 3-sulfopropyl ether sodium, lithium, or potassium salts; and sodium, lithium, or potassium dodecylbenzenesulfonate Excluding the solvent, the interfacial layer slurry between the anode layer and the separator layer shall contain the previous components within the following range:
  solid ionically conductive polymer materials between 10 and 70 wt. %
  active material between 30 and 85 wt. %
  binder content between 0.1 and 10 wt. %
  electronic conductor between 1 and 10 wt. %
  surfactant content between 0 and 5 wt. %

For which the composite volume of the anode-separator interfacial layer may be defined as as $Vol._{total}$=% $Vol._{Component\ A}$+% $Volume_{Component\ B}$+% $Volume_{Component\ C}$+% $Volume_{Component\ D}$
  The Volume % of Component A may be >10%, >20%, >30%, >40%, >50%, or >60%
  The Volume % of Component B may be <85%, <75%, <65%, <55%, <45%, <35%, or <30%
  The Volume % of Component C may be <40%, <30%, <20%, or <15%
  The Volume % of Component D may be <30%, <25%, <10%, or <5%
  The sum of the Volume % of Components C and D may be <40%, <30%, <20%, or <15%

The sizes of the particles including the powder forms of the Components A, and B may also be described by the following:
  Of the Volume % including Component A, for which a mean particle size value $A_{mean}$ can be assigned, a percentage of the total population identified as $A_1$, will be characterized as having a size distribution for which the mean value, $A_{1,mean}$, may be greater than $A_{mean}$
  Of the Volume % including Component A for which a mean particle size value $A_{mean}$ can be assigned, a percentage of the total population, identified as $A_2$, will be characterized as having a size distribution for which the mean value, $A_{2,mean}$, may be less than $A_{mean}$
  Of the Volume % including Component A, particles belonging to a population with a size distribution described by a mean value $A_{1,mean}>A_{mean}$ form <20%, <15%, <10%, or <5%, with the remainder of Component A, identified by $A_2$, belonging to a population for which $A_{2,mean}<A_{mean}$
  Of the Volume % including Component B for which a mean particle size value $B_{mean}$ can be assigned, a percentage of the total population, identified as $B_1$, will be characterized as having a size distribution for which the mean value, $B_{1,mean}$, may be greater than $B_{mean}$
  Of the Volume % including Component B for which a mean particle size value $B_{mean}$ can be assigned, a percentage of the total population, identified as $B_2$, will be characterized as having a size distribution for which the mean value, $B_{2,mean}$, may be less than $B_{mean}$
  Of the Volume % including Component B, particles belonging to a population with a size distribution described by a mean value $B_{1,mean}>B_{mean}$ form <100%, <95%, <85%, or <80%, with the remainder of Component B, identified by $B_2$, belonging to a population for which $B_{2,mean}<B_{mean}$, situated in the interstices between the larger particles The relative fractions of Component A and Component B forming Composite(Total) may be described as follows:
  The fraction of Component A added in the form of $A_1$ to Composite(Total) may be 25%, <20%, <15%, <10%, <5%
  The fraction of Component B added in the form of $B_1$ to Composite(Total) may be >35%, >45%, >55%, >65%, >75%, >85%

Prior to its coating, the anode-separator interfacial slurry may be characterized by:
  A viscosity between 500 and 2600 cps at 85 Hz
  A solid content between 40 and 75%
  A Hegman gauge below 90 μm or below 50 μm A particle size distribution as follows: d10<10 µm, d50<30 µm, d90<60 µm, d99<100 µm In this example, the positive electrode thickness including the interfacial anode-separator interface layer post calendering may be between 105 and 450 µm.

Anode-Separator Interfacial Layer Slurry Mixing Process

Provided below are example procedures of forming an anode-separator interfacial slurry.

Example Procedure 12 for Anode-Separator Interfacial Slurry Mixing Process: Three-Stage Addition of Component D1A Component D1A may be added in steps ii, iii, and vi.

i. Mixing Speed and Equipment

Dispersion of the components may be achieved through a combination of single-shaft mixers equipped with saw-tooth high-shear dispersers and multi-shaft mixers equipped with multiple high-shear dispersers, and low-shear anchor agitators, or low-shear helical-shaped paddles. Throughout the entire mixing process, the mixing speeds may be kept as described below:
Low shear axis between 10 and 55 rpm
High shear axis between 0 and 1500 rpm ii. Solution of Component D1 in Component D4

First, component D1A and component D1B may each be dissolved in component D4 to form two solutions each at 0.5 to 3 wt. % and 25 to 60 wt. %, respectively.

iii. Disperse Component D2

A fraction of component D1A solution, between 5 and 30%, and component D2 may be mixed between 30 and 90 minutes. After this step, the slurry may be characterized by a solid content between 1 and 25 wt. %.

iv. Disperse Component B

Component B and another fraction of component D1A solution, between 30 and 70%, may be added to the previous slurry and mixed between 30 and 90 minutes. After this step, the solid content may be between 5 and 30 wt. %.

v. Disperse Component A

Half of component A may be added to the mixing vessel leading to a solid content between 25 and 60 wt. %; the solution may be mixed for 45 to 120 minutes. The other half of component A may be added to the mixing vessel leading to a solid content between 40 and 70 wt. % and mixed for 120 minutes to 16 hours.

vi. Disperse Component D1B

Another fraction of the component D1A, between 10 and 50%, may be added to the previous slurry and mixed between 30 and 90 minutes, bringing the solid content between 40 and 70 wt. %. The component D1B solution may be added to the slurry and mixed between 30 and 90 minutes. After this step, the slurry may be characterized by a solid content between 40 and 65 wt. % and a viscosity between 1100 and 2800 cps.

vii. Target Solids Percentage

Some additional solvent may be added at this point to adjust the final slurry characteristics. The slurry may be mixed for 30 to 120 minutes under vacuum.

Example Procedure 13 for Anode-Separator Interfacial Slurry Mixing Process: Two-Stage Addition of Component D1A Component D1A may be added in steps ii and v.

i. Mixing Speed and Equipment

Dispersion of the components may be achieved through a combination of single-shaft mixers equipped with saw-tooth high-shear dispersers and multi-shaft mixers equipped with multiple high-shear dispersers, and low-shear anchor agitators, or low-shear helical-shaped paddles. Throughout the entire mixing process, the mixing speeds may be kept as described below:
Low shear axis between 10 and 55 rpm
High shear axis between 0 and 1500 rpm ii. Solution of Component D1 in Component D4

First, component D1A and component D1B may each be dissolved in component D4 to form two solutions each at 0.5 to 3 wt. % and 25 to 60 wt. %, respectively.

iii. Disperse Component D2

A fraction of component D1A, between 50 and 85%, and component D2B may be mixed between 30 and 90 minutes. After this step, the solid content may be between 1 and 25 wt. %.

iv. Disperse Component B

Component B may be added to the previous slurry and mixed between 30 and 90 minutes. After this step, the solid content may be between 5 and 30 wt. %.

v. Disperse Component A

Half of the component A may be added to the mixing vessel; the solution may be mixed for 45 to 120 minutes. After this step, the solid content lies between 25 and 60 wt. %. The other half of component A and a fraction of component D1A solution, between 15 and 50%, may be added to the mixing vessel and mixed for 120 minutes to 16 hours. After this step, the slurry characteristics may include the solid content between 40 and 70 wt. %.

vi. Disperse Component D1B

Component D1B solution may be added to the slurry and mixed between 30 and 90 minutes.

viii. Target Solids Percentage

Some additional solvent may be added at this point to adjust the final slurry characteristics. The slurry may be mixed for 30 minutes to 120 minutes under vacuum. The final slurry characteristics may be the following:
d10<15 µm, d50<30 µm, d90<60 µm, d99<100 µm
Hegman gauge<80 µm
Solid content between 40 and 65 wt. %
Viscosity between 1100 and 2800 cps at 85 Hz Example Procedure 14 for Anode-Separator Interfacial Slurry Mixing Process: Single Stage Addition of Primary Components A and B i. Mixing Speed and Equipment Dispersion of the components may be achieved with single-shaft mixers equipped with saw-tooth high-speed dispersers. Throughout the entire mixing process, the high shear axis mixing speed may be kept between 500 and 1200 rpm.

ii. Solution of Component D1 in Component D4

First, component D1A and component D1B may each be dissolved in component D4 to form two solutions each at 0.5 to 3 wt. % and 25 to 60 wt. %, respectively.

iii. Disperse Components D2, B, and A

Component D2 may be dispersed into a fraction of the component D1A solution together with component B, and all of component A for 90-120 minutes. The solids content of the slurry at this step may be 40-60%.

iv. Disperse Component D1B

Next, the slurry may be diluted with the remaining portion of the component D1A solution for 60-90 minutes. Lastly, a component D1B solution may be mixed into the slurry for 60-90 minutes. The final solids content may be between 45-50%.

Example Procedure 15 for Anode-Separator Interfacial Slurry Mixing Process: Single Stage Addition of Primary Component A i. Mixing Speed and Equipment Dispersion of the components may be achieved with single-shaft mixers equipped with saw-tooth high-speed dispersers. Throughout the entire mixing process, the high shear axis mixing speed may be kept between 500 and 1200 rpm.

ii. Solution of Component D1 in Component D4

First, component D1A and component D1B may each be dissolved in component D4 to form two solutions each at 0.5 to 3 wt. % and 25 to 60 wt. %, respectively.

iii. Disperse Component D2 and D3

Component D2 and component D3 may be dispersed into component D1A solution. The solids content at this step may be 1-15%.

iv. Disperse Component B

Component B may be added and mixed for 30-90 minutes. The solids content at this step may be 5-30%.

v. Disperse Component A

Next, all of component A may be dispersed into the slurry for 90-120 minutes. The solids content at this step may be 40-70%.

v. Disperse Component D1B

Lastly, component D1B solution may be mixed into the slurry for 30-60 minutes. The solids content at this step may be 45-65%.

Example Procedure 16 for Anode-Separator Interfacial Slurry Mixing Process: Four-Stage Addition of Component D1A i. Mixing Speed and Equipment Dispersion of the components may be achieved through a combination of single-shaft mixers equipped with saw-tooth high-shear dispersers and multi-shaft mixers equipped with multiple high-shear dispersers, and low-shear anchor agitators, or low-shear helical-shaped paddles. Throughout the entire mixing process, the mixing speeds may be kept as described below:
Low shear axis between 10 and 55 rpm
High shear axis between 0 and 1500 rpm ii. Solution of Component D1 in Component D4

First, component D1A and component D1B may each be dissolved in component D4 to form two solutions each at 0.5 to 3 wt. % and 25 to 60 wt. %, respectively.

iii. Disperse Component D2 and B

A fraction of component D1 solution, between 55 and 90%, component D2, and component B may be mixed between 60 and 180 minutes. After this step, solid content may be between 5 and 20 wt. %.

iv. Disperse Component A

Half of component A may be added to the mixing vessel; the solution may be mixed for 60 to 240 minutes. After this step, the slurry characteristics may include the solid content between 25 and 55 wt. %. The other half of the component A may be added to the slurry. A fraction of component D1A solution, between 10 and 45%, may be added at this point. The slurry may be mixed for 120 minutes to 16 hours. After this step, the solid content may be between 40 and 75 wt. %.

v. Disperse the Remainder of Component D1A

A fraction of component D1A solution, between 10 and 45%, may be added at this point. The slurry may be mixed between 30 and 60 minutes. After this step, the solid content may be between 40 and 70 wt. %.

vi. Disperse Component D1B

Component D1B solution and the rest of component D1A solution may be added to the slurry. Some solvent may also be added at this step to adjust the slurry viscosity. The slurry may be mixed between 30 minutes and 16 hours.

vii. Target Solids Percentage

Some additional solvent may be added at this point to adjust the final slurry characteristics. The slurry may be mixed for 30 minutes to 120 minutes under vacuum. The final slurry characteristics may be the following:
d10<15 µm, d50<30 µm, d90<60 µm, d99<100 µm
Hegman gauge<80 µm
Solid content between 40 and 65 wt. %
Viscosity between 1100 and 2800 cps at 85 Hz An alternative route to mixing for distribution of solid electrolyte component is also provided, similar to the discussion above as to the other layers.

Specifically, to facilitate a distribution of component particles providing an optimum density with preservation of the component materials' functionality, the order with which the particulate populations of the different materials may be added to the mixture must be carefully selected. A tendency exists for smaller particles to intersperse amongst larger particles. For this to happen effectively, the uniformity of the distribution of the larger particles must first be established. Furthermore, to achieve as high a gravimetric capacity as possible the introduction of the totality of each of the component materials can be done in subsets to engineer the distribution of the large particle populations with respect to the smaller ones.

Given the composite volume of the anode-separator layer may be defined as $Vol._{total} = \% \, Vol._{Component\ A} + \% \, Volume_{Component\ B} + \% \, Volume_{Component\ C} + \% \, Volume_{Component\ D}$ Where Component A corresponds to the anode active material Where Component B corresponds to the ion conducting solid state polymer Where Component C corresponds to the free volume Where Component D corresponds to the volume arising from the presence of binder, additive, and other functional and non-functional components Of the Volume % including Component A, for which a mean particle size value $A_{mean}$ can be assigned, a percentage of the total population identified as $A_1$, will be characterized as having a size distribution for which the mean value, $A_{1,mean}$, may be greater than $A_{mean}$ Of the Volume % including Component A for which a mean particle size value $A_{mean}$ can be assigned, a percentage of the total population, identified as $A_2$, will be characterized as having a size distribution for which the mean value, $A_{2,mean}$, may be less than $A_{mean}$ Of the Volume % including Component B for which a mean particle size value $B_{mean}$ can be assigned, a percentage of the total population, identified as $B_1$, will be characterized as having a size distribution for which the mean value, $B_{1,mean}$, may be greater than $B_{mean}$ Of the Volume % including Component B for which a mean particle size value $B_{mean}$ can be assigned, a percentage of the total population, identified as $B_2$, will be characterized as having a size distribution for which the mean value, $B_{2,mean}$, may be less than $B_{mean}$ With consideration for the above design criteria the following prescribes the order by which the components of the anode-separator layer may be combined to form a mixture of the Components A, B, C, and D by the process of mixing:

Component $A_2$ and $B_1$ may be combined in a step-wise fashion and may be mixed with a portion of Component D providing a dispersed population A portion of Component $B_2$ may be added to the mixture with further addition of a portion of Component D The remainder of Component $B_2$ and Component D may be added step-wise to the mixture until the mixture may include the totality of the Components $A_2$, $B_1$, $B_2$ and D A further limitation of the above strategy involves use of a discontinuous binder medium as part of Component D. The use of a discontinuous binder medium, which provides the functionality of a continuous and conformal coating without inhibiting the transfer of charged species at the interfaces between the active materials of the electrodes and the ionically conducting particles dispersed throughout the entirety of the battery's layers, or between the polymeric solid state particles forming the separator layers. To deploy such a strategy staged mixing is again leveraged whereby the active materials of a given electrode may first be mixed in a wet or dry slurry with the solid electrolyte powder to establish a surface coating of the active material with the solid state electrolyte. This ionically conducting powder-coated active material may then be mixed with a binder vehicle which is resistant to dissolution in the slurry's solvent. Following mixing of the solid electrolyte coated active material and the non-soluble binder vehicle, additional soluble binder component(s) may be added to tune the mechanical durability of the electrode without jeopardizing the functionality of the ionically conducting and electroactive species.

A version of this process may be described as follows:

Step 1. Component $A_2$ and $B_1$ may be combined in a step-wise fashion and may be mixed with a portion of Component D providing a dispersed population Step 2. The mixture of Component $A_2$ and $B_1$ may be mixed with a portion of Component $D_{1A}$ (non-soluble binder) providing a dispersed population of $A_2$, $B_1$, and $D_{1A}$ particles Step 3. A portion of Component $B_2$ may be added to the mixture with addition of a portion of Component $D_{1B}$ (soluble binder)

Step 4. The remainder of Component $B_2$ and Component $D_{1B}$ (soluble binder) may be added step-wise to the mixture until the mixture may include the totality of the Components $A_2$, $B_1$, $B_2$ and D To facilitate the intended distribution of the above components the following criteria may be applied to guide the optimization of component particle size distributions:

The ratio of the average diameter of the electrode active materials to the solid polymer electrolyte may be less than 7, less than 6, less than 5, or less than 4.

The most prevalent particle size of the anode active material Component $A_1$ may be <30 microns, greater than 5 microns, or 1 microns The most prevalent particle size of the anode active material Component $A_2$ may be >0.5 microns, >1 micron, <5 microns, or 1.5 microns The most prevalent particle size of the solid polymer electrolyte Component $B_1$ may be <5 microns or >1.6 microns The most prevalent particle size of the solid polymer electrolyte Component $B_2$ may be <1.5 microns, >0.35 microns, or 0.7 microns The minimum characteristic particle size of the solid polymer electrolyte may be <1 micron, <0.5 microns, <0.2 microns, or <0.05 microns The maximum characteristic particle size of the solid polymer electrolyte may be >10 microns, >20 microns, or <50 microns The minimum characteristic particle size of the anode active material may be greater than 0.5, >1, >2, or >5 microns and the maximum characteristic particle size of the anode may be <70, <60, <50, <40, <30, <20, or <15 microns The particle size distributions of the subpopulations can be approximated using a log-normal distribution function including individual or multiple components. Component A and Component B can be approximated using multiple components having a log-normal distribution $$f(x) = \frac{1}{x} \cdot \frac{1}{\sigma\sqrt{2\pi}} \exp\left(-\frac{(\ln x - \mu)^2}{2\sigma^2}\right)$$

where x is the particle size, $\mu$ is the mean particle size, and $\sigma$ is the standard deviation or the dispersity The dispersity of Component $A_1$ may be <0.5, <0.3, <0.2, or <0.15

The dispersity of Component $A_2$ may be <0.45, <0.4, <0.3, <0.2, or <0.15

The dispersity of Component B may be <0.7, <0.65, or <0.6

The dispersity of Component $B_1$ may be <0.7, <0.6, <0.5, <0.4, <0.3, or <0.2

The dispersity of Component $B_2$ may be <0.9, <0.8, <0.7, <0.6, <0.5, <0.45, or <0.4

Anode-Separator Interfacial Layer Slurry Coating Process

In one example, the anode-separator interfacial layer can be coated, casted, deposited, or laid onto the positive, the negative, or both electrodes to ensure high conformity between the separator layer and the electrodes. The coating process may be performed according to the following configurations:

The same separator formulation coated on the anode and on the anode,

Two different separator formulations coated on the anode allowing for optimized chemical and electrochemical stability between each electrode and the separator, A succession of layers of different formulation coated on the anode and/or on the anode to allow for a gradient of separator composition enhancing the chemical and electrochemical stability of the electrodes with the separator.

To ensure continuous coverage of the electrode onto which the separator layer is to be coated, the width of the two coated layers may be identical. The width of the separator layer may also be slightly larger than the coating width of the supporting electrode.

The anode-separator interfacial layer slurry may be coated at a speed between 1 and 10 m/min using one of the coating methods described hereinabove (e.g., Example Procedure 12, 13, 14, 15, or 16). Following coating, the electrode roll passes through a set of four ovens which temperature and fan exhaust may be set as follows:

Oven 1 between 40 and 100° C. and 300 and 900 rpm,
Oven 2 between 50 and 110° C. and 300 and 900 rpm,
Oven 3 between 60 and 120° C. and 300 and 900 rpm,
Oven 4 between 80 and 140° C. and 300 and 900 rpm.

Separator Layer (Cathode Side)

In one example, the separator layer of the cell may include a number of materials that in isolated populations may be characterized as powders insofar as including a multitude of particles of similar composition and characteristics. These powders may be combined with other materials to form a slurry to facilitate deposition of a continuous layer, possessing a functionality derived from the composite thereof, onto a substrate, which in the case of the present invention may be a current collector or a previously manufactured electrode, separator, or assembly including a combination thereof. In the following a description of the component materials, routes by which they may be combined to form a slurry, the characteristics of the slurry, and methods for casting of the slurry are provided. Details presented below apply to the casting of a separator layer onto a cathode layer.

In one example, the composite body including the separator layer, and the slurry from which it is derived, may be formed from the combination of a number of materials of both active and passive functionalities. Some of these candidate materials may be deployed on a sacrificial basis during the formation of the slurry and may later be removed after the casting of the slurry during steps required to finish manufacturing of said layer.

The slurry employed for application of the separator layer on the electrodes must include one or more solid ionically conductive polymer materials as the primary ion-conducting medium. The primary particle size of the solid ionically conductive polymer material(s) may be between 0.01 and 20 µm.

The composite of the separator in the form of a slurry or other may be defined according to the following:

Composite(Total)=Component A+Component B+Component C+Component D

Where Component A corresponds to the electrode active material (not present)
Where Component B corresponds to the ion conducting solid state polymer
Where Component B corresponds to the free volume
Where Component D corresponds to the binder, additives, and other functional and non-functional components Whereby the separator slurry may include the following components:

Component A
(Not present)
Component B
  one or more solid ionically conductive polymer materials as ion-conducting agent with a primary particle size between 0.01 and 20 µm
Component C
Component D
  Component D1: a binder including at least one compound selected from the group including polyethers, polyesters, carboxymethylcellulose, or polymers based on at least one monomer, such as methyl methacrylate, acrylonitrile, styrene, butadiene, acrylic acid or vinylidene fluoride
  Component D3: one or more surfactants for homogeneity of the slurry such as sulfates, sulfonates, phosphates, and carboxylates
  Component D4: a dispersing solvent such as acetone, isopropanol, methanol, toluene, n-methyl pyrrolidone, and water
  Component D5: one or more inorganic additives for the reduction of interfacial impedance, such as $LiNbO_3$, $LiTaO_3$, $LiNb_xTa_{1-x}O_3$, $BaTiO_3$, and including $P_2O_5$, $B_2O_3$, $Al_2O_3$, $Ga_2O_3$, $Y_2O_3$, $La_2O_3$, $SiO_2$, $ZrO_2$, $TiO_2$, and compounds arising from combinations thereof including the possible addition of $Li_2O$, with a primary particle size between 0.01 and 10 microns
  Component D6: one or more additives to improve the mechanical integrity of the solid electrolyte layer, such as $B_2O_3$, $Al_2O_3$, $\gamma$-AlO(OH), $Ga_2O_3$, $La_2O_3$, and including $P_2O_5$, $B_2O_3$, $Al_2O_3$, $Ga_2O_3$, $Y_2O_3$, $La_2O_3$, $SiO_2$, $ZrO_2$, $TiO_2$, and compounds arising from combinations thereof including the possible addition of $Li_2O$, with a primary particle size between 0.01 and 10 µm
  Component D7: one or more Li salts including $Li^+$ cations such as $LiClO_4$, $LiAsF_6$, $LiPF_6$, $LiBF_4$, $LiRFSO_3$, $LiCH_3SO_3$, $LiN(RFSO_2)_2$, $LiC(RFSO_2)_3$, LiTFSI (lithium trifluoromethane sulphonylimide), LiBOB (lithium bis(oxalato)borate), LiBETI (lithium bis (perfluoroethylsulfonyl)imide),
  Component D8: one or more additives for interfacial impedance reduction such as urethane-containing molecules, such as urethane functionalized PEG, urethane functionalized perfluoropolyethers, and alkylurethanes; 1-methyl-3-pyrrolidinone; 1,3-dimethyl-3,4,5,6-tetrahydro-2(1H)-pyrimidinone; 1,5-dimethyl-2-pyrrolidinone; alkyl substituted pyridinium-based ionic liquids, alkyl substituted pryrolidinium-based ionic liquids, and alkyl substituted ammonium-based ionic liquids with counter anions such as TFSI, $PF_6$, $BF_4$ anions; substituted poly(ethylene glycol) with functional end groups such as carbonates (linear or cyclic), carbamates (linear or cyclic), or nitriles; poly(ethylene glycol) bis(carboxymethyl) ether; dioctyl sulfosuccinate sodium, lithium, or potassium salts; glycolic acid ethoxylate 4-tert-butylphenyl ether; glycolic acid ethoxylate lauryl ether; glycolic acid ethoxylate 4-nonylphenyl ether; glycolic acid ethoxylate oleyl ether; poly(ethylene glycol) 4-nonylphenyl 3-sulfopropyl ether sodium, lithium, or potassium salts; and sodium, lithium, or potassium dodecylbenzenesulfonate Excluding the solvent, the separator layer slurry shall contain the previous components within the following range:
  solid ionically conductive polymer materials between 1 and 98 wt. %,
  binder content between 1 and 10 wt. %,
  Li salt content between 0 and 10 wt. %,
  additives content between 15 and 95 wt. %,
  surfactant content between 0 and 5 wt. %.

For which the composite volume of the separator layer may be defined as $Vol._{total}=\% Vol._{Component\ A}+\% Volume_{Component\ B}+\% Volume_{Component\ C}+\% Volume_{ComponentD}$ Where Component A corresponds to the electrode active material(s) (not present)
Where Component B corresponds to the ion conducting solid state polymer
Where Component C corresponds to the free volume
Where Component D corresponds to the volume arising from the presence of binder, additive, and other functional and non-functional components The Volume % of Component A may be 0%
The Volume % of Component B may be >80%, >85%, >90%, >95, or >97%
The Volume % of Component C may be <20%, <15%, <10%, <5%, or <3%
The Volume % of Component D may be <20%, <15%, <10%, <5%, or <3%
The sum of the Volume % of Components C and D may be <20%, <15%, <10%, <5%, or <3%

The sizes of the particles including the powder forms of Component B may also be described by the following:
  Of the Volume % including Component B, for which a mean particle size value B mean can be assigned, a percentage of the total population identified as $B_1$, will be characterized as having a size distribution for which the mean value, $B_{1,mean}$, may be greater than $B_{mean}$ Of the Volume % including Component B for which a mean particle size value $B_{mean}$ can be assigned, a percentage of the total population, identified as $B_2$, will be characterized as having a size distribution for which the mean value, $B_{2,mean}$, may be less than $B_{mean}$ Of the Volume % including Component B, particles belonging to a population with a size distribution described by a mean value $B_{1,mean} > B_{mean}$ form <100%, <95%, <85%, or <80%, with the remainder of Component B, identified by $B_2$, belonging to a population for which $B_{2,mean} < B_{mean}$, situated in the interstices between the larger particles Prior to its coating, the separator layer slurry may be characterized by:
A viscosity between 500 and 2200 cps at 85 Hz
A solid content between 40 and 55%
A Hegman gauge below 90 μm or below 50 μm
A particle size distribution as follows: d10<1 μm, d50<15 μm, d90<60 μm, d99<100 μm
A representative particle size distribution curve is shown in plot 1500 of FIG. 15. Further, a representative viscosity curve is shown in plot 1600 of FIG. 16, where the viscosity is plotted against the shear rate.

The separator layer thickness post calendering may be between 5 and 50 μm. Calendering may be conducted between room temperature (20° C.) and 140° C. in a low-moisture environment.

Separator Layer Slurry Mixing Process

Provided below are example procedures of forming a separator slurry.

Example Procedure 17 for Separator Slurry Mixing Process: Two Separate Starting Suspension of Component B in Component D4 and Components D3+D6 in Component D4 Combined in Two Stages i. Mixing Speed and Equipment
Dispersion of the components may be achieved through a combination of single-shaft mixers equipped with sawtooth high-shear dispersers and multi-shaft mixers equipped with multiple high-shear dispersers, and low-shear anchor agitators, low-shear helical-shaped paddles, or ultra high-shear rotor/stator mixers. Throughout the entire mixing process, the mixing speeds may be kept as described below:
Low shear axis between 10 and 55 rpm
High shear axis between 0 and 1500 rpm ii. Suspension 1: Solution of Component D1 and D3 in Component D4
First, component D1 may be dissolved in component D4 to form a solution at 1 and 15 wt. %. After dissolution of component D1, component D3 may be added to the solution and mixed for 30 to 90 minutes.

iii. Suspension 1: Disperse Component D6
Component D6 may then be added and mixed between 30 and 90 minutes. An ultra high-shear rotor/stator mixer may be employed to stabilize/homogenize the suspension. The suspension may be characterized by the following:
d10<1 μm, d50<5 μm, d90<10 μm, d99<30 μm
Hegman gauge<50 μm
Solid content between 40 and 65 wt. %
*Alternatively, the previous suspension may be prepared by adding component D6 first, followed by component D3, and finally component D1. The suspension characteristics shall remain the same as the ones listed above.

iv. Suspension 2: Disperse Component B in Component D4
In a separate mixing vessel, component B may be mixed with component D4 for 30 to 180 minutes at a solid content between 70 and 95 wt. %. After this step, an addition of component D4 may be added to the mixing vessel and mixed for 30 to 90 minutes. The slurry characteristics may then be:
d10<1 μm, d50<2 μm, d90<15 μm, d99<30 μm
Hegman gauge<50 μm
Solid content between 30 and 60 wt. % v. Disperse Suspension 1 into Suspension 2 in Two Stages
Half of suspension 1 containing the components D6, D1, and D3 in D4 may be added to the suspension 2 from step iv. Above and mixed for 30 to 120 minutes. After this step, the solids content may be between 30 and 60 wt. %. The remaining half of suspension 1 containing the components D6, D1, and D3 in D4 may be added to the slurry and mixed for 30 minutes to 16 hours. After this step, the slurry characteristics are:
d10<1 μm, d50<2 μm, d90<15 μm, d99<30 μm
Hegman gauge<70 μm
Solid content between 30 and 60 wt. %
Viscosity between 2000 and 4500 cps at 85 Hz.

vi. Target Solids Percentage
Component D4 may then be added progressively to adjust the slurry viscosity to the final target. Each addition may be followed by a mixing step of 30 to 60 minutes. The slurry may also be mixed for 30 minutes to 120 minutes under vacuum prior to coating. A sieving step may be used to achieve the required particle size distribution.

Figure 17:
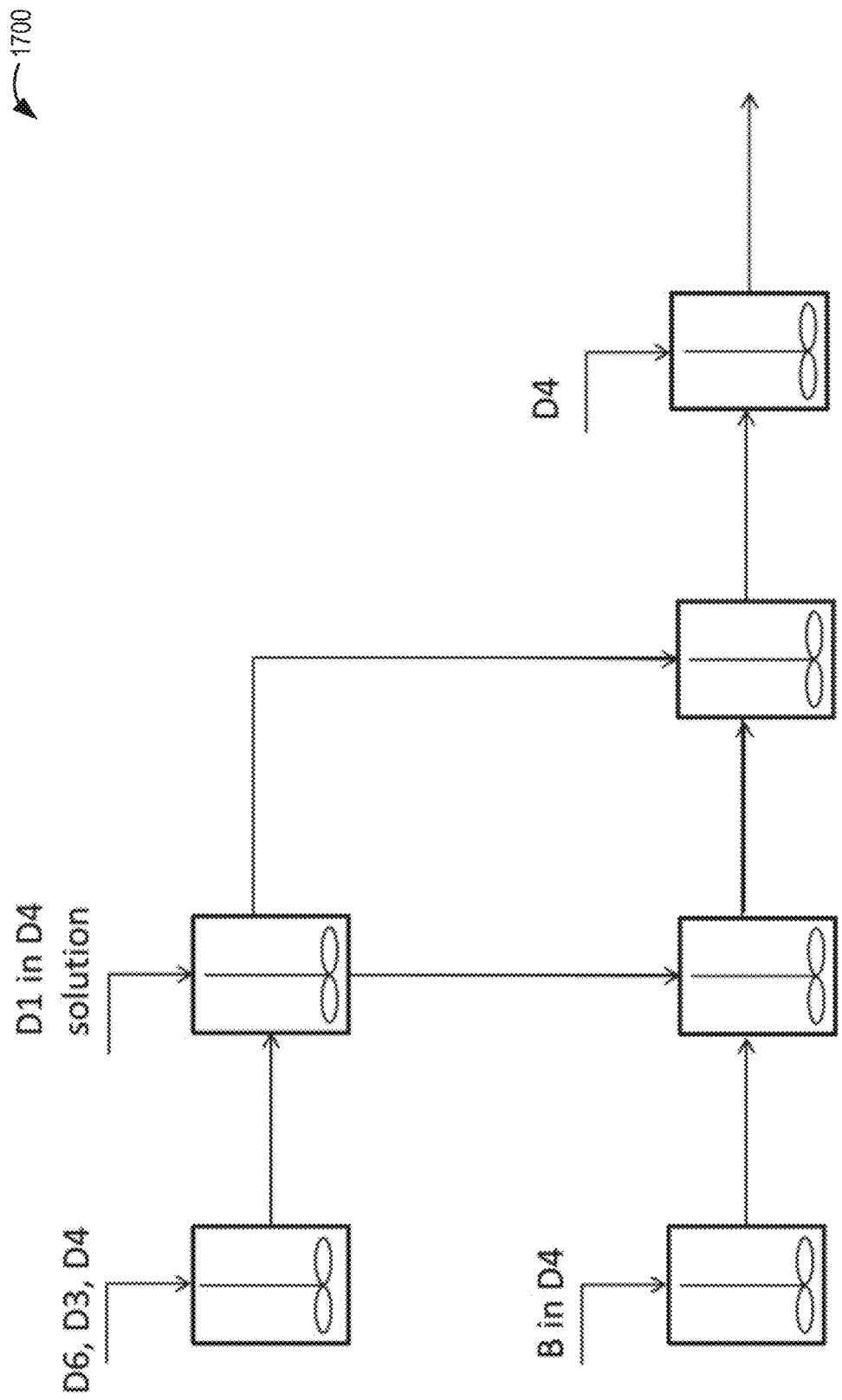
FIG. 17 shows a first process flow diagram for forming the slurry for the separator coating.

A process flow diagram 1700 of Example Procedure 17 is depicted in FIG. 17.

Example Procedure 18 for Separator Slurry Mixing Process: Three-Stage Addition of a Single Suspension of Component D6 in D4 to Component B i. Mixing Speed and Equipment
Dispersion of the components may be achieved through a combination of single-shaft mixers equipped with sawtooth high-shear dispersers and multi-shaft mixers equipped with multiple high-shear dispersers, and low-shear anchor agitators, low-shear helical-shaped paddles, or ultra high-shear rotor/stator mixers. Throughout the entire mixing process, the mixing speeds may be kept as described below:
Low shear axis between 10 and 55 rpm
High shear axis between 0 and 1500 rpm ii. Suspension 1: Component D6 in Component D4
Component D6 may be suspended in component D4 at a concentration of 40 to 60 wt. %. The suspension may be characterized by the following particle size distribution: d10<1 μm, d50<2 μm, d90<15 μm, d99<30 μm.

iii. Disperse Component B in Fractions of Suspension 1
Component B and component D1 may be added to a third of the suspension described in step ii, leading to a solids content between 50 and 65%. The slurry may be mixed for 30 to 120 minutes. Another third of the suspension from step ii may be added to the slurry decreasing the solid content between 45 and 60%. The slurry may be mixed for 30 to 120 minutes. The last third of the suspension from step ii may be added and mixed for 30 to 16 hours. After this step, the Hegman gauge should be below 100 μm and the solid content between 40 and 55%.

iv. Target Solids Percentage

Some solvent may be added progressively to adjust the slurry viscosity to the final target.

Figure 18:
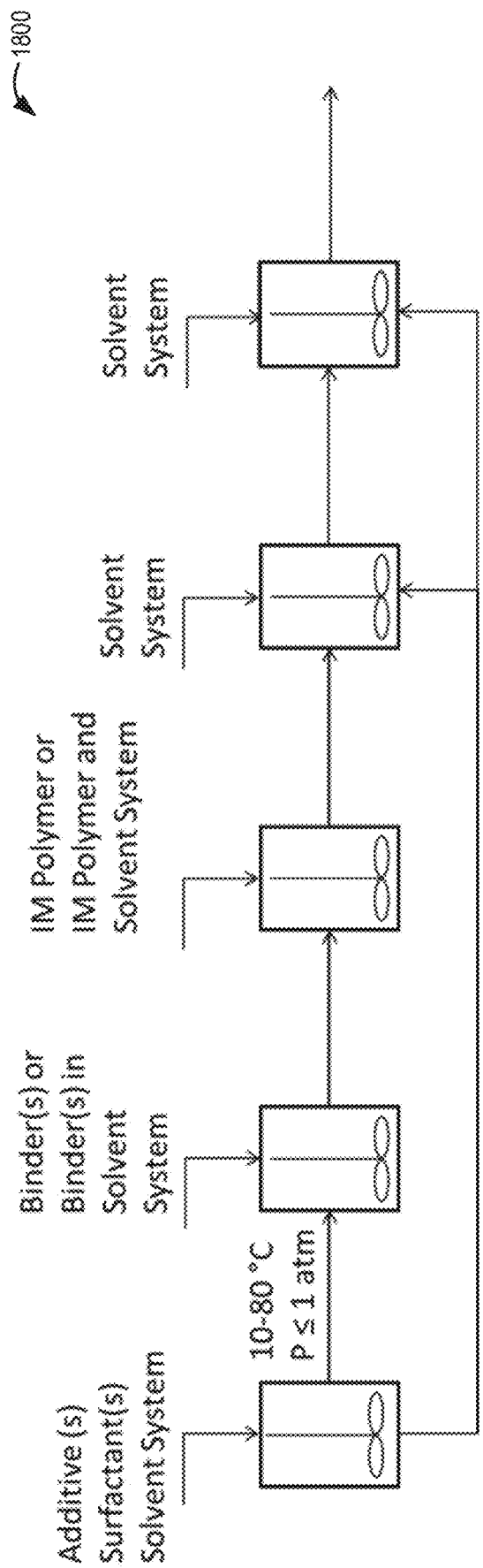
FIG. 18 shows a second process flow diagram for forming the slurry for the separator coating.

A process flow diagram 1800 of Example Procedure 18 is depicted in FIG. 18.

Example Procedure 19 for Separator Slurry Mixing Process: Two-Stage Addition of a Single Suspension of Component D6 in D4 to Component B i. Mixing Speed and Equipment Dispersion of the components may be achieved through a combination of single-shaft mixers equipped with sawtooth high-shear dispersers and multi-shaft mixers equipped with multiple high-shear dispersers, and low-shear anchor agitators, low-shear helical-shaped paddles, or ultra high-shear rotor/stator mixers. Throughout the entire mixing process, the mixing speeds may be kept as described below:
  i. Low shear axis between 10 and 40 rpm
  ii. High shear axis between 0 and 3500 rpm ii. Suspension of Component D6 in Component D4

Half of component D6 may be suspended in component D4 at a concentration between 45 and 60 wt. % and mixed between 30 and 120 minutes.

iii. Disperse Component B

Component B and component D1 may be added to the suspension along with component D4 targeting a solid content between 50 and 70 wt. %. The slurry may be mixed for 30 to 120 minutes.

iv. Disperse the Remainder of Component D6

The remaining half of component D6 and component D4 may be added to the mixing vessel leading to a solid content between 45 and 60 wt. %. The slurry may be mixed for 30 to 120 minutes. After this step, the Hegman gauge should be below 90 μm. Additional component D4 may be added progressively to adjust the slurry viscosity to the final target.

Example Procedure 20 for Separator Slurry Mixing Process: Two Separate Starting Suspension of Component B in Component D4 and Components D6 in Component D4 Combined in Three Stages i. Mixing Speed and Equipment Dispersion of the components may be achieved through a combination of single-shaft mixers equipped with sawtooth high-shear dispersers and multi-shaft mixers equipped with multiple high-shear dispersers, and low-shear anchor agitators, low-shear helical-shaped paddles, or ultra high-shear rotor/stator mixers. Throughout the entire mixing process, the mixing speeds may be kept as described below:
Low shear axis between 10 and 45 rpm
High shear axis between 0 and 1300 rpm ii. Suspension 1: Suspension of Component D6 in Component D4

Component D6 may first be suspended in the solvent at a concentration of 40 to 60 wt. %. The suspension may be characterized by the following particle size distribution: d10<1 μm, d50<2 μm, d90<15 μm, d99<30 μm.

iii. Suspension 1: Disperse Component D1

Component D1 may then be added to the suspension and mixed for 30 minutes to 16 hours. After mixing, the suspension has a Hegman gauge<80 μm and a solid content between 40 and 65 wt. %.

iv. Suspension 2: Disperse Component B

In a separate mixing vessel, component B may be mixed with a portion of component D4 for 30 to 180 minutes at a solid content between 70 and 95 wt. %. After this step, an additional portion of component D4 may be added to the mixing vessel and mixed for 30 to 90 minutes to reach a solid content between 40 and 65 wt. %.

v. Disperse Suspension 1 into Suspension 2 in Three Stages

One third of the suspension 1 containing the components D6 and D4 may be added to the slurry from step iv and mixed for 30 to 120 minutes. The solid content may be between 40 and 65 wt. % and the Hegman gauge<40 μm. The second third of suspension 2 may be added to the slurry and mixed for 30 to 120 minutes. The solid content may be between 35 and 63 wt. % and the Hegman gauge<40 μm. The final third of suspension 2 may be added to the slurry and mixed for 30 minutes to 16 hours. After this step, the slurry characteristics are:
Hegman gauge<40 μm
Solid content between 30 and 60 wt. %
Viscosity between 3500 and 4500 cps at 85 Hz.

vi. Target Solids Percentage

Component D4 may then be added progressively to adjust the slurry viscosity to the final target. Each addition may be followed by a mixing step of 30 to 60 minutes. The slurry may also be mixed for 30 to 120 minutes under vacuum prior to coating.

Table 4 provides examples of the separator slurry mixing process.

TABLE 4

Examples of the separator slurry mixing process with $LiNi_{0.8}Mn_{0.1}Co_{0.1}O_2$ (NMC811) (cathode active material) and graphite (anode active material).

| | Slurry particle size distribution | | | | NMC811 + graphite |
|---|---|---|---|---|---|
| Procedure | D10 (μm) | D50 (μm) | D90 (μm) | D99 (μm) | full-cell first Coulombic efficiency |
| 17 | 0.02 | 0.12 | 6 | 67 | 77% |
| 18 | 0.46 | 7.88 | 47.30 | 81.30 | 55% |
| 19 | 0.75 | 6.61 | 34.90 | 75.70 | — |
| 20 | 2.95 | 55 | 123 | 184 | — |

The slurry particle size distribution was evaluated using a Malvern Mastersizer 3000 laser particle size analyzer. For the separator layer, target dry thicknesses may be less than 30 microns. Thus, achieving a particle size distribution in which the majority of the particles is below the target thickness may be desirable. This has been achieved with Example Procedure 17 as indicated in the table. Furthermore, the best full cell performance, as indicated by first cycle efficiency, is also achieved through separator slurry mixing Example Procedure 17.

An alternative route to mixing for distribution of solid electrolyte component is again discussed.

For example, to facilitate a distribution of component particles providing an optimum density with preservation of the component materials' functionality, the order with which the particulate populations of the different materials may be added to the mixture must be carefully selected. A tendency exists for smaller particles to intersperse amongst larger particles. For this to happen effectively, the uniformity of the distribution of the larger particles must first be established. Furthermore, to achieve as high a gravimetric capacity as possible the introduction of the totality of each of the component materials can be done in subsets to engineer the distribution of the large particle populations with respect to the smaller ones.

Given the previous definition of the composite volume of the separator layer, defined as $Vol._{total} = \% Vol._{Component\ A} + \% Volume_{Component\ B} + \% Volume_{Component\ C}$ Where Component A corresponds to the ion conducting solid state polymer Where Component B corresponds to the free volume Where Component C corresponds to the volume arising from the presence of binder, additive, and other functional and non-functional components Of the Volume % including Component A, for which a mean particle size value $A_{mean}$ can be assigned, a percentage of the total population identified as $A_1$, will be characterized as having a size distribution for which the mean value, $A_{1,mean}$, may be greater than $A_{mean}$ Of the Volume % including Component A for which a mean particle size value $A_{mean}$ can be assigned, a percentage of the total population, identified as $A_2$, will be characterized as having a size distribution for which the mean value, $A_{2,mean}$, may be less than $A_{mean}$ Of the Volume % including Component A, particles belonging to a population with a size distribution described by a mean value $A_{1,mean} > A_{mean}$ form <100%, <95%, <85%, or <80%, with the remainder of Component A, identified by $A_2$, belonging to a population for which $A_{2,mean} < A_{mean}$, situated in the interstices between the larger particles With consideration for the above design criteria the following prescribes the order by which the components of the separator coated on the cathode layer may be combined to form a mixture of the Components A, B, and C by the process of mixing:

A portion of Component $A_1$ may be mixed with a portion of Component C providing a dispersed population of $A_1$ particles A further portion of Component $A_1$ may be mixed with a portion of Component $A_2$ and Component C providing a dispersed population of $A_1$ particles The remainder of Component $A_2$ and Component C may be added step-wise to the mixture until the mixture may include the totality of the Components $A_1$, $A_2$, B and C To facilitate the intended distribution of the above components the following criteria may be applied to guide the optimization of component particle size distributions:

The minimum characteristic particle size of the solid polymer electrolyte may be <1 micron, <0.5 microns, or <0.2 microns The maximum characteristic particle size of the solid polymer electrolyte may be >1.5 microns, <2.0 microns, or <2.5 microns The particle size distributions of the subpopulations can be approximated using a log-normal distribution function including individual or multiple components. Component A can be approximated using multiple components ($A_1$ and $A_2$) having a log-normal distribution $$f(x) = \frac{1}{x} \cdot \frac{1}{\sigma\sqrt{2\pi}} \exp\left(-\frac{(\ln x - \mu)^2}{2\sigma^2}\right)$$

where x is the particle size, μ is the mean particle size, and σ is the standard deviation or the dispersity The dispersity of Component $A_1$ may be <0.75, <0.6, <0.5, <0.4, <0.3, <0.2, or <0.15

The dispersity of Component $A_2$ may be <0.8, <0.7, <0.6, <0.5, <0.45, <0.4, or <0.3

Separator Layer Coating Process

In one example, the separator can be coated, casted, deposited, or laid onto the positive, the negative, or both electrodes to ensure high conformity between the separator layer and the electrodes. The coating process may be performed according to the following configurations:

i. The same separator formulation coated on the anode and on the cathode, ii. Two different separator formulations coated on the anode allowing for optimized chemical and electrochemical stability between each electrode and the separator, iii. A succession of layers of different formulation coated on the anode and/or on the cathode to allow for a gradient of separator composition enhancing the chemical and electrochemical stability of the electrodes with the separator.

To ensure continuous coverage of the electrode onto which the separator layer is to be coated, the width of the two coated layers may be identical. The width of the separator layer may also be slightly larger than the coating width of the supporting electrode.

The separator layer slurry may be coated at a speed between 1 and 10 m/min using one of the coating methods described hereinabove (e.g., Example Procedure 17, 18, 19, or 20). Following a coating, the electrode roll passes through a set of multiple ovens where the drying conditions may be set to achieve an evaporation rate range of 5-70 g/min. This range of values may be optimized for reduced migration or spatial gradient of component D1 (binder), a networked distribution of component B (the solid ionically conductive polymer material), an optimized uniformity in coat weight across the width of a coating, and good coating adhesion (≥10 gf/in). The latter parameter may be important for subsequent stamping of electrodes without compromising the integrity of the coating with delamination on the surface or along the edges of the stamped electrode.

Characterization of Polymer Electrolyte 2D Distribution in the Separator Layer

Figure 19:
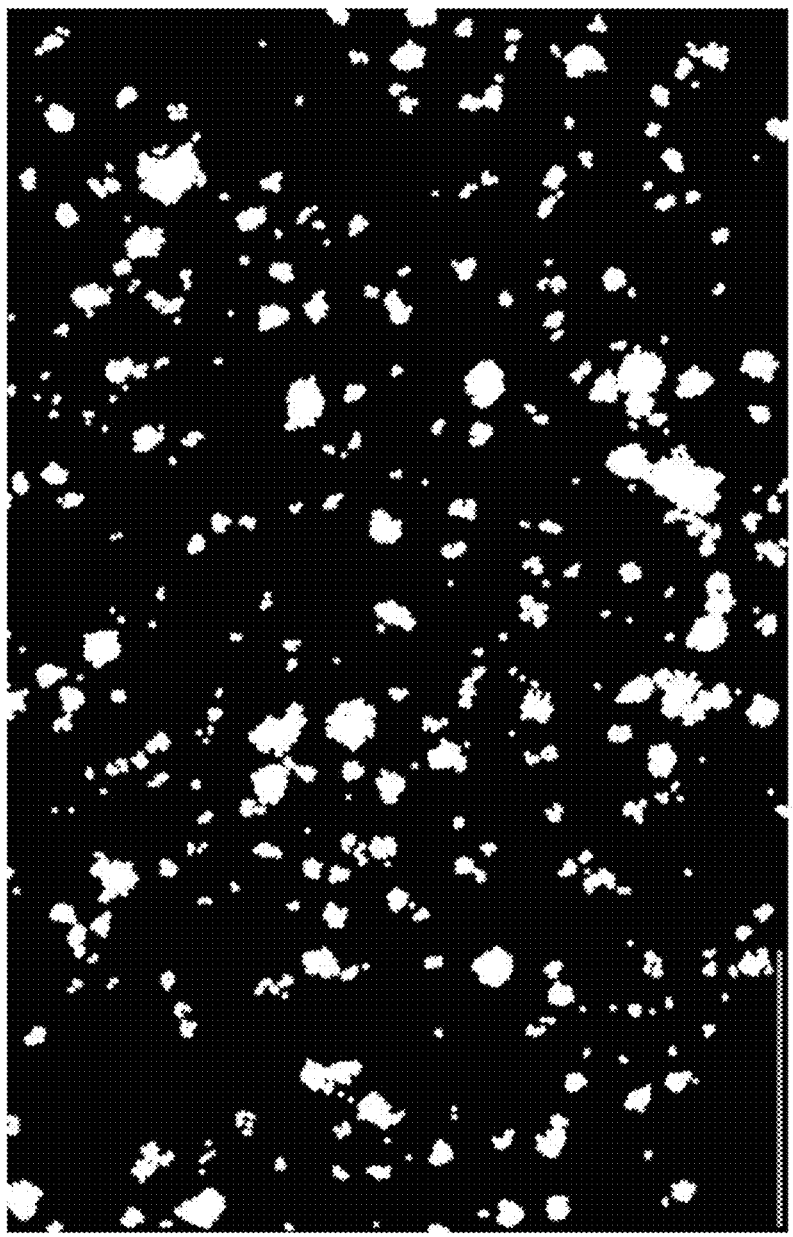
FIG. 19 shows an SEM image of the particle size distribution in the slurry for the separator coating.

The 2D distribution of component B is quantified from SEM-EDS images. In SEM image 1900 as shown by FIG. 19, the surface of the separator coating is shown where component B is highlighted in white, and the background is shown in black.

Using a nearest neighbor distance (NND) analysis, the 2D distribution of the polymer electrolyte may be clustered with an average NND between 2-5 μm.

The maximum feret distance, the longest distance between two points on a boundary of a polymer electrolyte particle(s) may be between 1-30 μm.

The area of particles may be between 0.5-180 μm².

The circularity of particle(s) in the separator, defined by $$4\pi \frac{Area}{Perimeter^2}$$

may be between 0.2-1.0.

Separator Layer (Anode Side)

In one example, the separator layer of the cell may include a number of materials that in isolated populations may be characterized as powders insofar as including a multitude of particles of similar composition and characteristics. These powders may be combined with other materials to form a slurry to facilitate deposition of a continuous layer, possessing a functionality derived from the composite thereof, onto a substrate, which in the case of the present invention may be a current collector or a previously manufactured electrode, separator, or assembly including a combination thereof. In the following a description of the component materials, routes by which they may be combined to form a slurry, the characteristics of the slurry, and methods for casting of the slurry are provided. Details presented below apply to the casting of a separator layer onto an anode layer.

In one example, the composite body including the separator layer, and the slurry from which it is derived, may be formed from the combination of a number of materials of both active and passive functionalities. Some of these candidate materials may be deployed on a sacrificial basis during the formation of the slurry and may later be removed after the casting of the slurry during steps required to finish manufacturing of said layer.

The slurry employed for application of the separator layer on the electrodes must include one or more solid ionically conductive polymer materials as the primary ion-conducting medium. The primary particle size of the solid ionically conductive polymer material(s) may be between 0.01 and 20 μm.

The composite of the separator in the form of a slurry or other may be defined according to the following:

Composite(Total)=Component A+Component B+Component C+Component D

Where Component A corresponds to the electrode active material (not present)

Where Component B corresponds to the ion conducting solid state polymer

Where Component C corresponds to the free volume

Where Component D corresponds to the binder, additives, and other functional and non-functional components Whereby the separator slurry may include the following components:

Component A
(Not present)
Component B
  one or more solid ionically conductive polymer materials as ion-conducting agent with a primary particle size between 0.01 and 20 μm
Component C
Component D
  Component D1: a binder including at least one compound selected from the group including polyethers, polyesters, carboxymethylcellulose, or polymers based on at least one monomer, such as methyl methacrylate, acrylonitrile, styrene, butadiene, acrylic acid or vinylidene fluoride
  Component D3: one or more surfactants for homogeneity of the slurry such as sulfates, sulfonates, phosphates, and carboxylates
  Component D4: a dispersing solvent such as acetone, isopropanol, methanol, toluene, n-methyl pyrrolidone, and water
  Component D5: one or more inorganic additives for the reduction of interfacial impedance, such as $LiNbO_3$, $LiTaO_3$, $LiNb_xTa_{1-x}O_3$, $BaTiO_3$, including $P_2O_5$, $B_2O_3$, $Al_2O_3$, $Ga_2O_3$, $Y_2O_3$, $La_2O_3$, $SiO_2$, $ZrO_2$, $TiO_2$, and compounds arising from combinations thereof including the possible addition of $Li_2O$, with a primary particle size between 0.01 and 10 microns
  Component D6: one or more additives to improve the mechanical integrity of the solid electrolyte layer, such as $B_2O_3$, $Al_2O_3$, γ-AlO(OH), $Ga_2O_3$, $Y_2O_3$, $La_2O_3$, including $P_2O_5$, $B_2O_3$, $Al_2O_3$, $Ga_2O_3$, $Y_2O_3$, $La_2O_3$, $SiO_2$, $ZrO_2$, $TiO_2$, and compounds arising from combinations thereof including the possible addition of $Li_2O$, with a primary particle size between 0.01 and 10 μm
  Component D7: one or more Li salts including $Li^+$ cations such as $LiClO_4$, $LiAsF_6$, $LiPF_6$, $LiBF_4$, $LiRFSO_3$, $LiCH_3SO_3$, $LiN(RFSO_2)_2$, $LiC(RFSO_2)_3$, LiTFSI (lithium trifluoromethane sulphonylimide), LiBOB (lithium bis(oxalato)borate), LiBETI (lithium bis (perfluoroethylsulfonyl)imide)
  Component D8: one or more additives for interfacial impedance reduction such as urethane-containing molecules, such as urethane functionalized PEG, urethane functionalized perfluoropolyethers, and alkylurethanes; 1-methyl-3-pyrrolidinone; 1,3-dimethyl-3,4,5,6-tetrahydro-2(1H)-pyrimidinone; 1,5-dimethyl-2-pyrrolidinone; alkyl substituted pyridinium-based ionic liquids, alkyl substituted pryrolidinium-based ionic liquids, and alkyl substituted ammonium-based ionic liquids with counter anions such as TFSI, $PF_6$, $BF_4$ anions; substituted poly(ethylene glycol) with functional end groups such as carbonates (linear or cyclic), carbamates (linear or cyclic), or nitriles; poly(ethylene glycol) bis(carboxymethyl) ether; dioctyl sulfosuccinate sodium, lithium, or potassium salts; glycolic acid ethoxylate 4-tert-butylphenyl ether; glycolic acid ethoxylate lauryl ether; glycolic acid ethoxylate 4-nonylphenyl ether; glycolic acid ethoxylate oleyl ether; poly(ethylene glycol) 4-nonylphenyl 3-sulfopropyl ether sodium, lithium, or potassium salts; and sodium, lithium, or potassium dodecylbenzenesulfonate Excluding the solvent, the separator layer slurry shall contain the previous components within the following range:
  i. solid ionically conductive polymer materials between 1 and 98 wt. %,
  ii. binder content between 1 and 10 wt. %,
  iii. Li salt content between 0 and 10 wt. %,
  iv. additives content between 15 and 95 wt. %,
  v. surfactant content between 0 and 5 wt. %.

For which the composite volume of the separator layer may be defined as $Vol._{total}$=% $Vol._{Component\ A}$+% $Volume_{Component\ B}$+% $Volume_{Component\ C}$+% $Volume_{ComponentD}$ Where Component A corresponds to the electrode active material(s) (not present)

Where Component B corresponds to the ion conducting solid state polymer

Where Component C corresponds to the free volume

Where Component D corresponds to the volume arising from the presence of binder, additive, and other functional and non-functional components The Volume % of Component A may be 0%

The Volume % of Component B may be >80%, >85%, >90%, >95%, or >97%

The Volume % of Component C may be <20%, <15%, <10%, <5%, or <3%

The Volume % of Component D may be <20%, <15%, <10%, <5%, or <3%

The sum of the Volume % of Components C and D may be <20%, <15%, <10%, <5%, or <3%

The sizes of the particles including the powder forms of Component B may also be described by the following:
  Of the Volume % including Component B, for which a mean particle size value $B_{mean}$ can be assigned, a percentage of the total population identified as $B_1$, will be characterized as having a size distribution for which the mean value, $B_{1,mean}$, may be greater than $B_{mean}$ Of the Volume % including Component B for which a mean particle size value $B_{mean}$ can be assigned, a percentage of the total population, identified as $B_2$, will be characterized as having a size distribution for which the mean value, $B_{2,mean}$, may be less than $B_{mean}$ Of the Volume % including Component B, particles belonging to a population with a size distribution described by a mean value $B_{1,mean} > B_{mean}$ form <100%, <95%, <85%, or <80%, with the remainder of Component B, identified by $B_2$, belonging to a population for which $B_{2,mean} < B_{mean}$, situated in the interstices between the larger particles Prior to its coating, the separator layer slurry may be characterized by:
  i. A viscosity between 500 and 2200 cps at 85 Hz
  ii. A solid content between 40 and 55%
  iii. A Hegman gauge below 90 µm or below 50 µm
  iv. A particle size distribution as follows: d10<1 µm, d50<15 µm, d90<60 µm, d99<100 µm The separator layer thickness post calendering may be between 5 and 50 µm. Calendering may be conducted between room temperature (20° C.) and 140° C. in a low-moisture environment.

Separator Layer Slurry Mixing Process

Provided below are example procedures of forming a separator slurry.

Example Procedure 21 for Separator Slurry Mixing Process: Two Separate Starting Suspension of Component B in Component D4 and Components D3+D6 in Component D4 Combined in Two Stages
  i. Mixing Speed and Equipment
  Dispersion of the components may be achieved through a combination of single-shaft mixers equipped with sawtooth high-shear dispersers and multi-shaft mixers equipped with multiple high-shear dispersers, and low-shear anchor agitators, low-shear helical-shaped paddles, or ultra high-shear rotor/stator mixers. Throughout the entire mixing process, the mixing speeds may be kept as described below:
    Low shear axis between 10 and 55 rpm
    High shear axis between 0 and 1500 rpm
  ii. Suspension 1: Solution of Component D1 and D3 in Component D4
  First, component D1 may be dissolved in component D4 to form a solution at 1 and 15 wt. %. After dissolution of component D1, component D3 may be added to the solution and mixed for 30 to 90 minutes.
  iii. Suspension 1: Disperse Component D6
  Component D6 may then be added and mixed between 30 and 90 minutes. An ultra high-shear rotor/stator mixer may be employed to stabilize/homogenize the suspension. The suspension may be characterized by the following:
    d10<1 µm, d50<5 µm, d90<10 µm, d99<30 µm
    Hegman gauge<50 µm
    Solid content between 40 and 65 wt. %
  Alternatively, the previous suspension may be prepared by adding component D6 first, followed by component D3, and finally component D1. The suspension characteristics shall remain the same as the ones listed above.
  iv. Suspension 2: Disperse Component B in Component D4
  In a separate mixing vessel, component B may be mixed with component D4 for 30 to 180 minutes at a solid content between 70 and 95 wt. %. After this step, an addition of component D4 may be added to the mixing vessel and mixed for 30 to 90 minutes. The slurry characteristics may then be:
    d10<1 µm, d50<2 µm, d90<15 µm, d99<30 µm
    Hegman gauge<50 µm
    Solid content between 30 and 60 wt. %
  v. Disperse Suspension 1 into Suspension 2 in Two Stages
  Half of suspension 1 containing the components D6, D1, and D3 in D4 may be added to the suspension 2 from step iv. Above and mixed for 30 to 120 minutes. After this step, the solids content may be between 30 and 60 wt. %. The remaining half of suspension 1 containing the components D6, D1, and D3 in D4 may be added to the slurry and mixed for 30 minutes to 16 hours. After this step, the slurry characteristics are:
    d10<1 µm, d50<2 µm, d90<15 µm, d99<30 µm
    Hegman gauge<70 µm
    Solid content between 30 and 60 wt. %
    Viscosity between 2000 and 4500 cps at 85 Hz.
  vi. Target Solids Percentage
  Component D4 may then be added progressively to adjust the slurry viscosity to the final target. Each addition may be followed by a mixing step of 30 to 60 minutes. The slurry may also be mixed for 30 minutes to 120 minutes under vacuum prior to coating. A sieving step may be used to achieve the required particle size distribution.

A process flow diagram 1700 of Example Procedure 21 is depicted in FIG. 17.

Example Procedure 22 for Separator Slurry Mixing Process: Three-Stage Addition of a Single Suspension of Component D6 in D4 to Component B
  i. Mixing Speed and Equipment
  Dispersion of the components may be achieved through a combination of single-shaft mixers equipped with sawtooth high-shear dispersers and multi-shaft mixers equipped with multiple high-shear dispersers, and low-shear anchor agitators, low-shear helical-shaped paddles, or ultra high-shear rotor/stator mixers. Throughout the entire mixing process, the mixing speeds may be kept as described below:
    Low shear axis between 10 and 55 rpm
    High shear axis between 0 and 1500 rpm
  ii. Suspension 1: Component D6 in Component D4
  Component D6 may be suspended in component D4 at a concentration of 40 to 60 wt. %. The suspension may be characterized by the following particle size distribution: d10<1 µm, d50<2 µm, d90<15 µm, d99<30 µm.
  iii. Disperse Component B in Fractions of Suspension 1
  Component B and component D1 may be added to a third of the suspension described in step ii, leading to a solids content between 50 and 65%. The slurry may be mixed for 30 to 120 minutes. Another third of the suspension from step ii may be added to the slurry decreasing the solid content between 45 and 60%. The slurry may be mixed for 30 to 120 minutes. The last third of the suspension from step ii may be added and mixed for 30 to 16 hours. After this step, the Hegman gauge should be below 100 µm and the solid content between 40 and 55%.
  iv. Target Solids Percentage
  Some solvent may be added progressively to adjust the slurry viscosity to the final target.

A process flow diagram 1800 of Example Procedure 22 is depicted in FIG. 18.

Example Procedure 23 for Separator Slurry Mixing Process: Two-Stage Addition of a Single Suspension of Component D6 in D4 to Component B i. Mixing Speed and Equipment Dispersion of the components may be achieved through a combination of single-shaft mixers equipped with sawtooth high-shear dispersers and multi-shaft mixers equipped with multiple high-shear dispersers, and low-shear anchor agitators, low-shear helical-shaped paddles, or ultra high-shear rotor/stator mixers. Throughout the entire mixing process, the mixing speeds may be kept as described below:

Low shear axis between 10 and 40 rpm
High shear axis between 0 and 3500 rpm ii. Suspension of Component D6 in Component D4

Half of component D6 may be suspended in component D4 at a concentration between 45 and 60 wt. % and mixed between 30 and 120 minutes.

iii. Disperse Component B

Component B and component D1 may be added to the suspension along with component D4 targeting a solid content between 50 and 70 wt. %. The slurry may be mixed for 30 to 120 minutes.

iv. Disperse the Remainder of Component D6

The remaining half of component D6 and component D4 may be added to the mixing vessel leading to a solid content between 45 and 60 wt. %. The slurry may be mixed for 30 to 120 minutes. After this step, the Hegman gauge should be below 90 μm. Additional component D4 may be added progressively to adjust the slurry viscosity to the final target.

Example Procedure 24 for Separator Slurry Mixing Process: Two Separate Starting Suspension of Component B in Component D4 and Components D6 in Component D4 Combined in Three Stages i. Mixing Speed and Equipment Dispersion of the components may be achieved through a combination of single-shaft mixers equipped with sawtooth high-shear dispersers and multi-shaft mixers equipped with multiple high-shear dispersers, and low-shear anchor agitators, low-shear helical-shaped paddles, or ultra high-shear rotor/stator mixers. Throughout the entire mixing process, the mixing speeds may be kept as described below:

Low shear axis between 10 and 45 rpm
High shear axis between 0 and 1300 rpm ii. Suspension 1: Suspension of Component D6 in Component D4

Component D6 may first be suspended in the solvent at a concentration of 40 to 60 wt. %. The suspension may be characterized by the following particle size distribution: d10<1 μm, d50<2 μm, d90<15 μm, d99<30 μm.

iii. Suspension 1: Disperse Component D1

Component D1 may then be added to the suspension and mixed for 30 minutes to 16 hours. After mixing, the suspension has a Hegman gauge<80 μm and a solid content between 40 and 65 wt. %.

iv. Suspension 2: Disperse Component B

In a separate mixing vessel, component B may be mixed with a portion of component D4 for 30 to 180 minutes at a solid content between 70 and 95 wt. %. After this step, an additional portion of component D4 may be added to the mixing vessel and mixed for 30 to 90 minutes to reach a solid content between 40 and 65 wt. %.

v. Disperse Suspension 1 into Suspension 2 in Three Stages

One third of the suspension 1 containing the components D6 and D4 may be added to the slurry from step iv and mixed for 30 to 120 minutes. The solid content may be between 40 and 65 wt. % and the Hegman gauge<40 μm. The second third of suspension 2 may be added to the slurry and mixed for 30 to 120 minutes. The solid content may be between 35 and 63 wt. % and the Hegman gauge<40 μm. The final third of suspension 2 may be added to the slurry and mixed for 30 minutes to 16 hours. After this step, the slurry characteristics are:

Hegman gauge<40 μm
Solid content between 30 and 60 wt. %
Viscosity between 3500 and 4500 cps at 85 Hz.

vi. Target Solids Percentage

Component D4 may then be added progressively to adjust the slurry viscosity to the final target. Each addition may be followed by a mixing step of 30 to 60 minutes. The slurry may also be mixed for 30 to 120 minutes under vacuum prior to coating.

Table 5 provides examples of the separator slurry mixing process.

TABLE 5

Examples of the separator slurry mixing process with $LiNi_{0.8}Mn_{0.1}Co_{0.1}O_2$ (NMC811) (cathode active material) and graphite (anode active material).

| Procedure | Slurry particle size distribution | | | | NMC811 + graphite |
|---|---|---|---|---|---|
| | D10 (μm) | D50 (μm) | D90 (μm) | D99 (μm) | full-cell first Coulombic efficiency |
| 21 | 0.02 | 0.12 | 6 | 67 | 77% |
| 22 | 0.46 | 7.88 | 47.30 | 81.30 | 55% |
| 23 | 0.75 | 6.61 | 34.90 | 75.70 | — |
| 24 | 2.95 | 55 | 123 | 184 | — |

The slurry particle size distribution was evaluated using a Malvern Mastersizer 3000 laser particle size analyzer. For the separator layer, target dry thicknesses may be less than 30 microns. Thus, achieving a particle size distribution in which the majority of the particles is below the target thickness may be desirable. This has been achieved with Example Procedure 21 as indicated in the table. Furthermore, the best full cell performance, as indicated by first cycle efficiency, is also achieved through separator slurry mixing Example Procedure 21.

An alternative route to mixing for distribution of solid electrolyte component is also disclosed. For example, to facilitate a distribution of component particles providing an optimum density with preservation of the component materials' functionality, the order with which the particulate populations of the different materials may be added to the mixture must be carefully selected. A tendency exists for smaller particles to intersperse amongst larger particles. For this to happen effectively, the uniformity of the distribution of the larger particles must first be established. Furthermore, to achieve as high a gravimetric capacity as possible the introduction of the totality of each of the component materials can be done in subsets to engineer the distribution of the large particle populations with respect to the smaller ones.

Given the previous definition of the composite volume of the separator layer, defined as $Vol._{total} = \% Vol._{Component\ A} + \% Volume_{Component\ B} + \% Volume_{Component\ C}$ Where Component A corresponds to the ion conducting solid state polymer Where Component B corresponds to the free volume Where Component C corresponds to the volume arising from the presence of binder, additive, and other functional and non-functional components Of the Volume % including Component A, for which a mean particle size value $A_{mean}$ can be assigned, a percentage of the total population identified as $A_1$, will be characterized as having a size distribution for which the mean value, $A_{1,mean}$, may be greater than $A_{mean}$ Of the Volume % including Component A for which a mean particle size value $A_{mean}$ can be assigned, a percentage of the total population, identified as $A_2$, will be characterized as having a size distribution for which the mean value, $A_{2,mean}$, may be less than $A_{mean}$ Of the Volume % including Component A, particles belonging to a population with a size distribution described by a mean value $A_{1,mean} > A_{mean}$ form <100%, <95%, <85%, or <80%, with the remainder of Component A, identified by $A_2$, belonging to a population for which $A_{2,mean} < A_{mean}$, situated in the interstices between the larger particles With consideration for the above design criteria the following prescribes the order by which the components of the separator coated on the cathode layer may be combined to form a mixture of the Components A, B, and C by the process of mixing:

A portion of Component $A_1$ may be mixed with a portion of Component C providing a dispersed population of $A_1$ particles A further portion of Component $A_1$ may be mixed with a portion of Component $A_2$ and Component C providing a dispersed population of $A_1$ particles The remainder of Component $A_2$ and Component C may be added step-wise to the mixture until the mixture may include the totality of the Components $A_1$, $A_2$, B and C To facilitate the intended distribution of the above components the following criteria may be applied to guide the optimization of component particle size distributions:

The minimum characteristic particle size of the solid polymer electrolyte may be <1 micron, <0.5 microns, or <0.2 microns The maximum characteristic particle size of the solid polymer electrolyte may be >1.5 microns, <2.0 microns, or <2.5 microns The particle size distributions of the subpopulations can be approximated using a log-normal distribution function including individual or multiple components. Component A can be approximated using multiple components ($A_1$ and $A_2$) having a log-normal distribution $$f(x) = \frac{1}{x} \cdot \frac{1}{\sigma\sqrt{2\pi}} \exp\left(-\frac{(\ln x - \mu)^2}{2\sigma^2}\right)$$

where x is the particle size, μ is the mean particle size, and σ is the standard deviation or the dispersity The dispersity of Component $A_1$ may be <0.75, <0.6, <0.5, <0.4, <0.3, <0.2, or <0.15

The dispersity of Component $A_2$ may be <0.8, <0.7, <0.6, <0.5, <0.45, <0.4, or <0.3

Separator Layer Coating Process

In one example, the separator can be coated, casted, deposited, or laid onto the positive, the negative, or both electrodes to ensure high conformity between the separator layer and the electrodes. The coating process may be performed according to the following configurations:

i. The same separator formulation coated on the anode and on the cathode, ii. Two different separator formulations coated on the anode allowing for optimized chemical and electrochemical stability between each electrode and the separator, iii. A succession of layers of different formulation coated on the anode and/or on the cathode to allow for a gradient of separator composition enhancing the chemical and electrochemical stability of the electrodes with the separator.

To ensure continuous coverage of the electrode onto which the separator layer is to be coated, the width of the two coated layers may be identical. The width of the separator layer may also be slightly larger than the coating width of the supporting electrode.

The separator layer slurry may be coated at a speed between 1 and 10 m/min using one of the coating methods described hereinabove (e.g., Example Procedure 21, 22, 23, or 24). Following coating, the electrode roll passes through a set of four ovens which temperature and fan exhaust may be set as follows:

i. Oven 1 between 40 and 100° C. and 300 and 900 rpm,
ii. Oven 2 between 50 and 110° C. and 300 and 900 rpm,
iii. Oven 3 between 60 and 120° C. and 300 and 900 rpm,
iv. Oven 4 between 80 and 140° C. and 300 and 900 rpm.

Characterization of Polymer Electrolyte 2D Distribution in the Separator Layer

The 2D distribution of component B is quantified from SEM-EDS images. In SEM image 1900 as shown by FIG. 19, the surface of the separator coating is shown where component B is highlighted in white, and the background is shown in black.

Using a nearest neighbor distance (NND) analysis, the 2D distribution of the polymer electrolyte may be clustered with an average NND between 2-5 μm.

The maximum feret distance, the longest distance between two points on a boundary of a polymer electrolyte particle(s) may be between 1-30 μm.

The area of particles may be between 0.5-180 μm².

The circularity of particle(s) in the separator, defined by $$4\pi \frac{\text{Area}}{\text{Perimeter}^2}$$

may be between 0.2-1.0.

Tab Protection Strip

In addition to the introduction of layers between the electrode, separator, and current collector layers, combination of the aforementioned component can be facilitated through the placement of additional layers which may be placed so as to coat a portion of one or several of the pre-existing layers. As an example, a tab protection layer may be introduced to protect tabs extending from the current collectors from shorting in the cell's assembled form. The tab protection layer of the cell may include a number of materials that in isolated populations may be characterized as powders insofar as including a multitude of particles of similar composition and characteristics. These powders may be combined with other materials to form a slurry to facilitate deposition of a continuous layer, possessing a functionality derived from the composite thereof, onto a substrate, which in the case of the present invention may be a current collector or a previously manufactured electrode, separator, or assembly including a combination thereof. In the following a description of the component materials, routes by which they may be combined to form a slurry, the characteristics of the slurry, and methods for casting of the slurry are provided.

The composite body including the interfacial cathode-separator layer, and the slurry from which it is derived, may be formed from the combination of a number of materials of both active and passive functionalities. Some of these candidate materials may be deployed on a sacrificial basis during the formation of the slurry and may later be removed after the casting of the slurry during steps required to finish manufacturing of said layer.

An additional coating adjacent to the electrode coating may be necessary to protect the tabs from shorting on contact with bare current collector exposed on the edges of the electrodes.

The composite may be defined according to the following:
Where Component A corresponds to the electrode active material (not present)
Where Component B corresponds to the ion conducting solid state polymer (not present)
Where Component C corresponds to the free volume
Where Component D corresponds to the binder, additives, and other functional and non-functional components
Whereby the tab protection strip slurry may include the following components:
Component A
(not present)
Component B
(not present)
Component C
Component D
  Component D1: a binder including at least one compound selected from the group including polyethers, polyesters, carboxymethylcellulose, or polymers based on at least one monomer, such as methyl methacrylate, acrylonitrile, styrene, butadiene, acrylic acid or vinylidene fluoride
  Component D3: one or more surfactants for slurry homogeneity such as sulfates, sulfonates, phosphates, and carboxylates
  Component D4: a dispersing solvent such as acetone, isopropanol, methanol, toluene, n-methyl pyrrolidone, and water
  Component D6: one or more additives for mechanical integrity, such as $B_2O_3$, $Al_2O_3$, $\gamma$-AlO(OH), $Ga_2O_3$, $Y_2O_3$, $La_2O_3$, with a primary particle size below 1 μm Excluding the solvent, the tab protection slurry shall contain the previous components within the following range:
Component D1 content between 5 and 100 wt. %,
Component D6 content between 0 and 95 wt. %,
Component D3 content between 0 and 2 wt. %.

Prior its coating, the tab protection slurry may be characterized by:
A viscosity between 500 and 3000 cps at 85 Hz
A solid content between 3 and 40%
A Hegman gauge below 30 μm or below 10 μm
A particle size distribution as follows: d10<1 μm, d50<5 μm, d90<10 μm, d99<30 μm The tab protection strip thickness post calendering may be between 5 and 40 μm with a width between 3 and 10 mm. Calendering may be conducted between room temperature (20° C.) and 140° C. in a low-moisture environment.

Tab Protection Slurry Mixing Process

The binder may be dissolved in the solvent at a concentration between 1 and 15 wt. %. After dissolution of the binder, the surfactant may be added to the solution and mix for 30 to 90 minutes. The additives may then be added and mixed between 30 and 90 minutes. A step of sonication or homogenization may be required to stabilize the suspension.

Alternatively, the previous suspension may be prepared by adding the additives first, followed by the surfactant, and finally the binder. The suspension characteristics shall remain the same as the ones listed above.

Tab Protection Strip Coating Process

The tab protection strip may be coated on either the positive electrode tab, the negative electrode tab, or both of the electrode tabs. It shall be coated adjacent to the electrode coating, minimizing the overlap with the electrode coating as well as the presence of bare current collector between the electrode coating and the tab protection strip coating.

The tab protection slurry may be coated at a speed between 1 and 10 m/min using one of the coating methods described hereinabove. Following a coating, the electrode roll passes through a set of multiple ovens where the drying conditions may be set to achieve an evaporation rate range of 0.1-15 g/min. This range of values may be optimized for reduced migration or spatial gradient of component D1 (binder), a networked distribution of component B (the solid ionically conductive polymer material), an optimized uniformity in coat weight across the width of a coating, and good coating adhesion (≥10 gf/in). The latter parameter may be important for subsequent stamping of electrodes without compromising the integrity of the coating with delamination on the surface or along the edges of the stamped electrode.

The methods described herein improve manufacture of rechargeable lithium ion batteries, and provides a method for the replacement of the liquid electrolyte component in conventional batteries with a solid state electrolyte. These methods provide enhanced safety by reduction or elimination of the quantity of liquid electrolyte in the finished cells, but also provide performance benefits of the resulting devices. In this regard, the methods increase performance benefits by the optimization of the cell's energy and power density by virtue of optimized powder packing strategies leading to increased specific capacities, reduced porosity and reduced internal resistance.

The methods described herein including staged introduction of component materials tuned to provide matching between material sub-systems and free-volume populating the matrices deliver the functionality of the components from which they are made. Furthermore, the methods of selection and deployment of materials that support the slurry formulation and casting processes increases the integrity and functionality of the individual and combined layers in composite form. Not only does the sequence with which the materials may be added affect the relative distribution of the component materials, but so the methods used to mix these materials once placed in contact for the intended intermixing effect the overall distribution of component materials.

Subsequent to the mixing of the slurries further complexity may be encountered during the casting procedures as the fluid dynamics of the casted slurries evolve towards those of a solid film, the characteristics of which may be sensitive to the parameters defining the path between the liquid and the solid states. The described methods for combining the device layers, during the casting of liquid phase slurries and the combining of solid phase layered structures improve stability without compromising the functionality for the individual materials or the composites structures produced therefrom.

The described mixing and casting methods provided herein for the manufacture of slurries and layers therefrom for the production of solid state battery slurries which when combined with other operations the entirety of a solid state battery may be generated. The following method is provided to produce a functioning cell or battery:

Step 1. Process constituent powders (Components A, B, D1, D2, D5, D6, D7, D8) using various means such as milling and sieving to produce populations of said powders for the production of the slurries.
  a. Examples of materials subject to particle size engineering include in a non-limiting fashion, the cathode or anode active materials, the polymeric solid state electrolyte, inorganic solid electrolyte materials, inorganic mechanical stabilizing powders, conducting additives, binder materials, salts, among others.

Step 2. Evaluate the particles size distribution of the aforementioned materials using a combination of laser or white light particle size analysis, scanning electron microscopy, test sieves, as an example.

Step 3. Disperse components using a combination of high and low shear mixing techniques by their staged combination with one another and components including the slurry vehicle, non-limiting examples of which may include (Components D1, D3, D4):
  a. Solvent(s), binders, surfactants, defoaming agents, thickeners, thinners, among others.

Step 4. The slurry may be characterized in a staged parallel workflow using such techniques as rheometry, particle size analysis, a Hegman gauge, among others.

Step 5. A cathode slurry (Components A, B, C, D1-D8) may be casted using a roll-to-roll coating technique such as slot-die coating onto one or both sides of a current collector to form a cathode layer.
  a. The cathode layer may be subjected to in-line drying subsequent to the casting process.

Step 6. An anode slurry (Components A, B, C, D1-D8) may be casted using a roll-to-roll coating technique such as slot-die coating onto one or both sides of a current collector to form an anode layer.
  a. The anode layer may be subjected to in-line drying subsequent to the casting process.

Step 7. The anode or cathode structures may be subjected to a calendering process.

Step 8. A separator slurry (Components B, C, D1, D3, D4, D5, D6, D7, D8) may be casted using a roll-to-roll coating technique such as slot-die coating onto one or both sides of a cathode or anode.
  a. The layered electrode-separator structure may be subjected to in-line drying subsequent to the casting process.

Step 9. The layered electrode-separator structures may be subjected to a calendering process.

Step 10. The layered electrode-separator structures may be subjected to a bake-out routine involving one or both elevated temperatures and reduced pressures.

Step 11. The electrodes may then be interposed with one another so as to align cathode and anode current collector tabs with the same of other electrodes to form a stack.

Step 12. The stacked electrodes may then be packaged in a hermetically sealed container such as a pouch.

Step 13. The cell may then subjected to forming routines to condition the cell for service.

In this way, a slurry for applying a coating to an electrode structure for a solid-state battery cell may be formed utilizing an optimized particle distribution and a selectively staged component introduction. A technical effect of forming the slurry in this manner is that the coating formed therefrom may have a reduced porosity and improved percolation networks. Further, the slurry may form a separator coating including a solid ionically conductive polymer material. The technical effect of incorporating the solid ionically conductive polymer material is lowering resistance to Li-ion transport and providing mechanical stability in a formed battery cell.

In one example, a method, comprising dividing a solvent into portions, in accordance with a step ordering, mixing a solid ionically conductive polymer material, for example, formed from a polyphenylene sulfide or liquid crystal polymer, the solid ionically conductive polymer material having an ionic conductivity greater than $1 \times 10^{-5}$ S/cm at room temperature, and where the solid ionically conductive polymer material is in a glass state at room temperature, in a first portion of the solvent to form a suspension, wherein the first portion of the solvent is approximately half of an overall solvent content, mixing a first additive in the suspension, and following the mixing the first additive in the suspension, mixing a second portion of the solvent with the suspension to form a slurry having a solid content between 25 and 80 wt. %, a d50 particle size of less than 30 μm, a Hegman gauge of less than 90 μm, and a viscosity between 500 and 2800 cps at 85 Hz, wherein mixing includes mixing at a high shear and mixing at a low shear, where the low shear is between 10 and 55 rpm. A first example of the method further includes wherein the high shear is between 0 and 1500 rpm. A second example of the method, optionally including the first example of the method, further includes wherein the high shear is between 0 and 3500 rpm, and wherein the low shear is between 10 and 40 rpm. A third example of the method, optionally including one or more of the first and second examples of the method, further includes wherein the high shear is between 0 and 1300 rpm, and wherein the low shear is between 10 and 45 rpm. A fourth example of the method, optionally including one or more of the first through third examples of the method, further includes wherein mixing includes simultaneously mixing at the high shear and mixing at the low shear. A fifth example of the method, optionally including one or more of the first through fourth examples of the method, further includes wherein an amount of the first portion of the solvent and an amount of the second portion of the solvent are approximately equivalent. A sixth example of the method, optionally including one or more of the first through fifth examples of the method, further includes wherein the first additive comprises an electrode active material, a binder, a surfactant, or an inorganic ceramic. A seventh example of the method, optionally including one or more of the first through sixth examples of the method, further includes wherein the mixing the first additive in the suspension comprises mixing the first additive and one or more further additives in the suspension. An eighth example of the method, optionally including one or more of the first through seventh examples of the method, further includes wherein the first additive is an inorganic ceramic, wherein the one or more further additives are a binder and a surfactant, and wherein the mixing the first additive and the one or more further additives in the suspension comprises mixing the binder and the surfactant in a third portion of the solvent to form a solution, mixing the inorganic ceramic in the solution, following the mixing the inorganic ceramic in the solution, dividing the solution into portions, mixing a portion of the solution in the suspension, and thereafter mixing a remaining portion of the solution in the suspension. A ninth example of the method, optionally including one or more of the first through eighth examples of the method, further includes wherein the first additive is an electrode active material, wherein the mixing the solid ionically conductive polymer material in the first portion of the solvent to form the suspension comprises dividing a binder into portions, mixing a first portion of the binder in the first portion of the solvent to form a first solution, dividing the first solution into portions, mixing an electronic conductor in a first portion of the first solution to form the suspension, and mixing the solid ionically conductive polymer material and a second portion of the first solution in the suspension, and wherein the mixing the first additive in the suspension comprises mixing the electrode active material and a remaining portion of the first solution in the suspension. A tenth example of the method, optionally including one or more of the first through ninth examples of the method, further includes wherein the electrode active material is a cathode active material. An eleventh example of the method, optionally including one or more of the first through tenth examples of the method, further includes wherein the mixing the electrode active material and the remaining portion of the first solution in the suspension comprises dividing the first additive into portions, mixing a first portion of the electrode active material and a third portion of the first solution with the suspension for 45 to 120 min, and thereafter mixing a second portion of the electrode active material and a fourth portion of the first solution with the suspension for 2 to 16 hrs. A twelfth example of the method, optionally including one or more of the first through eleventh examples of the method, further includes wherein the viscosity is between 2000 and 2600 cps at 85 Hz. A thirteenth example of the method, optionally including one or more of the first through twelfth examples of the method, further includes wherein the electrode active material is an anode active material. A fourteenth example of the method, optionally including one or more of the first through thirteenth examples of the method, further comprises following the mixing the electrode active material and the remaining portion of the first solution in the suspension, mixing the second portion of the binder with a third portion of the solvent to form a second solution, and mixing the second solution in the suspension. A fifteenth example of the method of the method, optionally including one or more of the first through fourteenth examples of the method, further includes wherein the solid content is between 25 and 75 wt. %. A sixteenth example of the method, optionally including one or more of the first through fifteenth examples of the method, further includes wherein the viscosity is between 1100 and 2800 cps at 85 Hz. A seventeenth example of the method, optionally including one or more of the first through sixteenth examples of the method, further includes wherein the mixing the electrode active material and the remaining portion of the first solution in the suspension comprises dividing the electrode active material into portions, mixing a first portion of the electrode active material and a third portion of the first solution with the suspension for 45 to 120 min, and thereafter mixing a second portion of the electrode active material and a fourth portion of the first solution with the suspension for 2 to 16 hrs, and thereafter mixing a fifth portion of the first solution with the suspension for 30 to 90 min. An eighteenth example of the method, optionally including one or more of the first through seventeenth examples of the method, further includes wherein the solid content is between 25 and 65 wt. %. An nineteenth example of the method, optionally including one or more of the first through eighteenth examples of the method, further includes wherein the viscosity is between 500 and 2600 cps at 85 Hz. A twentieth example of the method, optionally including one or more of the first through nineteenth examples of the method, further includes wherein the slurry has a d10 particle size of less than 1 μm, a d90 particle size of less than 60 μm, and a d99 particle size of less than 140 μm. A twenty-first example of the method, optionally including one or more of the first through twentieth examples of the method, further includes wherein the slurry has the d99 particle size of less than 100 μm. A twenty-second example of the method, optionally including one or more of the first through twenty-first examples of the method, further includes wherein the Hegman gauge is less than 80 μm. A twenty-third example of the method, optionally including one or more of the first through twenty-second examples of the method, further includes wherein the Hegman gauge is less than 50 μm. A twenty-fourth example of the method, optionally including one or more of the first through twenty-third examples of the method, further includes wherein the mixing the second portion of the solvent with the suspension to form the slurry occurs under a vacuum.

In another example, a method for forming a coating on an electrode structure, the method comprising dividing a solvent into portions, in accordance with a step ordering, mixing a solid ionically conductive polymer material, for example, formed from a polyphenylene sulfide or liquid crystal polymer, the solid ionically conductive polymer material having an ionic conductivity greater than $1 \times 10^{-5}$ S/cm at room temperature, and where the solid ionically conductive polymer material is in a glass state at room temperature, in a first portion of the solvent to form a suspension, wherein the first portion of the solvent is approximately half of an overall solvent content, mixing a first additive in the suspension, and following the mixing the first additive in the suspension, mixing a second portion of the solvent with the suspension to form a slurry having a solid content between 25 and 80 wt. %, a d50 particle size of less than 30 μm, a Hegman gauge of less than 90 μm, and a viscosity between 500 and 2800 cps at 85 Hz, wherein mixing includes mixing at a high shear and mixing at a low shear, where the low shear is between 10 and 55 rpm, coating the slurry onto the electrode structure, drying the coated electrode structure, and calendering the coated electrode structure, wherein the electrode structure comprises one of an anode material coating deposited on an anode current collector and a cathode material coating deposited on a cathode current collector, and wherein an adhesion interface between the coating and the electrode structure has a 180° peel strength of greater than 200 gf/in.

In yet another example, a method, comprising dividing a solvent into portions, dispersing, at a low shear, a solid ionically conductive polymer material, for example, formed from a polyphenylene sulfide or liquid crystal polymer, the solid ionically conductive polymer material having an ionic conductivity greater than $1 \times 10^{-5}$ S/cm at room temperature, and where the solid ionically conductive polymer material is in a glass state at room temperature, in a first portion of the solvent to form a suspension, mixing a binder in the suspension, and following the mixing the binder in the suspension, mixing a second portion of the solvent with the suspension to form a slurry having a solid content between 25 and 55 wt. %, a d50 particle size of less than 15 μm, a Hegman gauge of less than 90 μm, and a viscosity between 500 and 2200 cps at 85 Hz, wherein mixing includes mixing at a high shear and mixing at the low shear, where the low shear is between 10 and 55 rpm. A first example of the method further includes wherein the high shear is between 0 and 1500 rpm. A second example of the method, optionally including the first example of the method, further includes wherein the high shear is between 0 and 3500 rpm, and wherein the low shear is between 10 and 40 rpm. A third example of the method, optionally including one or more of the first and second examples of the method, further includes wherein the high shear is between 0 and 1300 rpm, and wherein the low shear is between 10 and 45 rpm. A fourth example of the method, optionally including one or more of the first through third examples of the method, further includes wherein the low shear is about 15 rpm. A fifth example of the method, optionally including one or more of the first through fourth examples of the method, further includes wherein mixing includes simultaneously mixing at the high shear and mixing at the low shear. A sixth example of the method, optionally including one or more of the first through fifth examples of the method, further includes wherein an amount of the first portion of the solvent is about 15% of an overall amount of the solvent. A seventh example of the method, optionally including one or more of the first through sixth examples of the method, further includes wherein the mixing the binder in the suspension comprises mixing the binder and one or more additives in the suspension. An eighth example of the method, optionally including one or more of the first through seventh examples of the method, further includes wherein the one or more additives comprise an inorganic ceramic, and wherein the mixing the binder and the one or more additives in the suspension comprises mixing the inorganic ceramic in a third portion of the solvent to form a solution, dividing the solution into portions, mixing a portion of the solution in the suspension, and thereafter mixing a remaining portion of the solution in the suspension. A ninth example of the method, optionally including one or more of the first through eighth examples of the method, further includes wherein the one or more additives further comprise a surfactant, and wherein the mixing the binder and the one or more additives in the suspension further comprises first mixing the binder and the surfactant in the third portion of the solvent. A tenth example of the method, optionally including one or more of the first through ninth examples of the method, further comprises, prior to the dispersing the solid ionically conductive polymer material in the first portion of the solvent to form the suspension, dividing an inorganic ceramic into portions, and mixing a first portion of the inorganic ceramic in the first portion of the solvent. An eleventh example of the method, optionally including one or more of the first through tenth examples of the method, further includes wherein the one or more additives comprise a second portion of the inorganic ceramic, and wherein the mixing the binder and the one or more additives in the suspension comprises mixing the binder in the suspension, mixing the second portion of the inorganic ceramic in a third portion of the solvent to form a solution, and following the mixing the binder in the suspension, mixing the solution in the suspension. A twelfth example of the method, optionally including one or more of the first through eleventh examples of the method, further includes wherein the mixing the solution in the suspension comprises dividing the solution into portions, mixing a portion of the solution in the suspension, and thereafter mixing a remaining portion of the solution in the suspension. A thirteenth example of the method, optionally including one or more of the first through twelfth examples of the method, further includes wherein the slurry has a d10 particle size of less than 1 μm, a d90 particle size of less than 60 μm, and a d99 particle size of less than 100 μm. A fourteenth example of the method, optionally including one or more of the first through thirteenth examples of the method, further includes wherein the Hegman gauge is less than 50 μm. A fifteenth example of the method of the method, optionally including one or more of the first through fourteenth examples of the method, further includes wherein the mixing the second portion of the solvent with the suspension to form the slurry occurs under a vacuum.

In yet another example, a slurry for forming a coating on an electrode structure, the slurry comprising a solid ionically conductive polymer material, for example, formed from a polyphenylene sulfide or liquid crystal polymer, the solid ionically conductive polymer material having an ionic conductivity greater than $1 \times 10^{-5}$ S/cm at room temperature, and where the solid ionically conductive polymer material is in a glass state at room temperature, a solvent, and one or more additives, the one or more additives comprising an electrode active material, a binder, a surfactant, and an inorganic ceramic, wherein the slurry has a solid content between 25 and 80 wt. %, a d50 particle size of less than 30 μm, a Hegman gauge of less than 90 μm, and a viscosity between 500 and 2800 cps at 85 Hz, and where the slurry is formed from a process of sequentially mixing the solid ionically conductive polymer material, the solvent and the one or more additives, the process comprising dividing the solvent into portions, mixing the solid ionically conductive polymer material in a first portion of the solvent to form a suspension, wherein the first portion of the solvent is approximately half of an overall solvent content, mixing the one or more additives in the suspension, and following the mixing the one or more additives in the suspension, mixing a second portion of the solvent with the suspension to form the slurry, wherein mixing includes mixing at a high shear and mixing at a low shear, where the low shear is between 10 and 55 rpm. A first example of the slurry further includes wherein the slurry has a d10 particle size of less than 1 μm, a d90 particle size of less than 60 μm, and a d99 particle size of less than 140 μm.

In yet another example, a coated hybrid electrode, comprising an anode current collector, a cathode current collector, an anode material coating, a cathode material coating, and a solid polymer electrolyte coating formed as a separator, wherein the anode material coating, the cathode material coating, and the solid polymer electrolyte coating are respectively formed from a first slurry, a second slurry, and a third slurry, where each of the first slurry, the second slurry, and the third slurry are formed by dividing a solvent into portions, in accordance with a step ordering, mixing a solid ionically conductive polymer material, for example, formed from a polyphenylene sulfide or liquid crystal polymer, the solid ionically conductive polymer material having an ionic conductivity greater than $1 \times 10^{-5}$ S/cm at room temperature, and where the solid ionically conductive polymer material is in a glass state at room temperature, in a first portion of the solvent to form a suspension, mixing an additive in the suspension, and following the mixing the additive in the suspension, mixing a second portion of the solvent with the suspension to form a composition having a solid content between 25 and 80 wt. %, a d50 particle size of less than 30 μm, a Hegman gauge of less than 90 μm, and a viscosity between 500 and 2800 cps at 85 Hz, wherein mixing includes mixing at a high shear and mixing at a low shear, where the low shear is between 10 and 55 rpm. A first example of the coated hybrid electrode further includes wherein mixing includes simultaneously mixing at the high shear and mixing at the low shear. A second example of the coated hybrid electrode, optionally including the first example of the coated hybrid electrode, further includes wherein a Hegman gauge of the first slurry is less than 50 μm and a viscosity of the first slurry is between 2000 and 2600 cps at 85 Hz. A third example of the coated hybrid electrode, optionally including one or more of the first and second examples of the coated hybrid electrode, further includes wherein a solid content of the second slurry is between 25 and 65 wt. %, a Hegman gauge of the second slurry is less than 80 µm, and a viscosity of the second slurry is between 1100 and 2800 cps at 85 Hz. A fourth example of the coated hybrid electrode, optionally including one or more of the first through third examples of the coated hybrid electrode, further includes wherein a solid content of the third slurry is between 25 and 55 wt. %, a d50 particle size of the third slurry is less than 15 µm, and a viscosity of the third slurry is between 500 and 2200 cps at 85 Hz. A fifth example of the coated hybrid electrode, optionally including one or more of the first through fourth examples of the coated hybrid electrode, further includes wherein the solid polymer electrolyte coating is disposed between the anode material coating and the cathode material coating, and wherein the solid polymer electrolyte coating has a different composition in a first region adjacent to the cathode material coating than in a second region adjacent to the anode material coating. A sixth example of the coated hybrid electrode, optionally including one or more of the first through fifth examples of the coated hybrid electrode, further comprises a cathode separator interfacial coating disposed between the cathode material coating and the solid polymer electrolyte coating, wherein the cathode separator interfacial coating comprises the solid ionically conductive polymer material, and wherein the cathode separator interfacial coating is formed from a fourth slurry, the fourth slurry having a solid content between 25 and 80 wt. %, a d50 particle size of less than 30 µm, a Hegman gauge of less than 50 µm, and a viscosity between 2000 and 2600 cps at 85 Hz. A seventh example of the coated hybrid electrode, optionally including one or more of the first through sixth examples of the coated hybrid electrode, further comprises an anode separator interfacial coating disposed between the anode material coating and the solid polymer electrolyte coating, wherein the anode separator interfacial coating comprises the solid ionically conductive polymer material, and wherein the anode separator interfacial coating is formed from a fifth slurry, the fifth slurry having a solid content between 25 and 75 wt. %, a d50 particle size of less than 30 µm, a Hegman gauge of less than 90 µm, and a viscosity between 500 and 2600 cps at 85 Hz. An eighth example of the coated hybrid electrode, optionally including one or more of the first through seventh examples of the coated hybrid electrode, further comprises a first tab protection strip disposed between the anode current collector and the anode material coating, and a second tab protection strip disposed between the cathode current collector and the cathode material coating, wherein the first tab protection strip and the second tab protection strip are respectively formed from a sixth slurry and a seventh slurry, each of the sixth slurry and the seventh slurry having a solid content between 3 and 40 wt. %, a d50 particle size of less than 5 µm, a Hegman gauge of less than 30 µm, and a viscosity between 500 and 3000 cps at 85 Hz.

In yet another example, a battery cell, comprising a plurality of hybrid electrodes, each of the plurality of hybrid electrodes comprising an anode current collector, a cathode current collector, an anode material coating, a cathode material coating, and a solid polymer electrolyte coating formed as a separator, and a hermetically-sealed pouch, the hermetically-sealed pouch containing the plurality of hybrid electrodes, wherein the anode material coating, the cathode material coating, and the solid polymer electrolyte coating are respectively formed from a plurality of slurries, wherein each of the plurality of slurries is formed by dividing a solvent into portions, in accordance with step ordering, mixing a solid ionically conductive polymer material, for example, formed from a polyphenylene sulfide or liquid crystal polymer, the solid ionically conductive polymer material having an ionic conductivity greater than $1 \times 10^{-5}$ S/cm at room temperature, and where the solid ionically conductive polymer material is in a glass state at room temperature, in at least a first portion of the solvent to form a suspension, mixing an additive in the suspension, and following the mixing the additive in the suspension, mixing a second portion of the solvent with the suspension to form a composition having a solid content between 25 and 80 wt. %, a d50 particle size of less than 30 µm, a Hegman gauge of less than 90 µm, and a viscosity between 500 and 2800 cps at 85 Hz, wherein mixing includes mixing at a high shear and mixing at a low shear, where the low shear is between 10 and 55 rpm. A first example of the battery cell further includes wherein mixing includes simultaneously mixing at the high shear and mixing at the low shear. A second example of the battery cell, optionally including the first example of the battery cell, further includes wherein each of the plurality of hybrid electrodes further comprises a first tab protection strip disposed on the anode current collector, and a second tab protection strip disposed on the cathode current collector.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
    dividing a solvent into portions;
    in accordance with a step ordering, first mixing a solid ionically conductive polymer material having an ionic conductivity greater than $1 \times 10^{-5}$ S/cm at room temperature, and where the solid ionically conductive polymer material is in a glass state at room temperature, in a first portion of the solvent to form a suspension, wherein the first portion of the solvent is approximately half of an overall solvent content;
    second mixing a first additive in the suspension;
    following the second mixing the first additive in the suspension, third mixing a second portion of the solvent with the suspension to form a slurry having a solid content between 25 and 80 wt. %;
    influencing based on the first mixing, the second mixing, and the third mixing a d50 particle size, Hegman gauge, and viscosity of the slurry, the slurry having a d50 particle size of less than 30 µm, a Hegman gauge of less than 90 µm, and a viscosity between 500 and 2800 cps at 85 Hz; and
    differentially tuning the d50 particle size, the Hegman gauge, the viscosity, and a relative fraction of the solid ionically conductive polymer material and the first additive in an electrode layer and in a solid electrolyte layer, the relative fraction including a relative volume percent of the solid ionically conductive polymer and volume percent of the first additive;
wherein mixing includes mixing at a high shear and mixing at a low shear, where the low shear is between 10 and 55 rpm.

2. The method of claim 1, wherein the high shear is between 0 and 1500 rpm.

3. The method of claim 1, wherein the high shear is between 0 and 3500 rpm; and
wherein the low shear is between 10 and 40 rpm.

4. The method of claim 1, wherein the high shear is between 0 and 1300 rpm; and
wherein the low shear is between 10 and 45 rpm.

5. The method of claim 1, wherein mixing includes simultaneously mixing with a multi-shaft mixer.

6. The method of claim 1, wherein an amount of the first portion of the solvent and an amount of the second portion of the solvent are approximately equivalent.

7. The method of claim 1, wherein the first additive comprises an electrode active material, a binder, a surfactant, or an inorganic ceramic.

8. The method of claim 1, wherein the slurry has a d10 particle size of less than 1 µm, a d90 particle size of less than 60 µm, and a d99 particle size of less than 140 µm.

9. The method of claim 8, wherein the slurry has the d99 particle size of less than 100 µm.

10. The method of claim 1, wherein the Hegman gauge is less than 80 µm.

11. The method of claim 10, wherein the Hegman gauge is less than 50 µm.

12. The method of claim 1, wherein the mixing the second portion of the solvent with the suspension to form the slurry occurs under a vacuum.

13. The method of claim 1, further comprising forming a coating on an electrode structure, including:
coating the slurry onto the electrode structure;
drying the coated electrode structure; and
calendering the coated electrode structure;
wherein the electrode structure comprises one of an anode material coating deposited on an anode current collector and a cathode material coating deposited on a cathode current collector; and
wherein an adhesion interface between the coating and the electrode structure has a 180° peel strength of greater than 200 gf/in.

14. A slurry for forming a coating on an electrode structure, the slurry comprising:
a solid ionically conductive polymer material having an ionic conductivity greater than $1 \times 10^{-5}$ S/cm at room temperature, and where the solid ionically conductive polymer material is in a glass state at room temperature;
a solvent; and
one or more additives, the one or more additives comprising an electrode active material, a binder, a surfactant, or an inorganic ceramic;
wherein the slurry has a solid content between 25 and 80 wt. %, a d50 particle size of less than 30 µm, a Hegman gauge of less than 90 µm, and a viscosity between 500 and 2800 cps at 85 Hz; and wherein the slurry is formed from a process of sequentially mixing the solid ionically conductive polymer material, the solvent and the one or more additives, the process comprising:
dividing the solvent into portions;
first mixing the solid ionically conductive polymer material in a first portion of the solvent to form a suspension, wherein the first portion of the solvent is approximately half of an overall solvent content;
second mixing the one or more additives in the suspension;
following the mixing the one or more additives in the suspension, third mixing a second portion of the solvent with the suspension to form the slurry;
influencing based on the first mixing, the second mixing, and the third mixing the d50 particle size, Hegman gauge, and viscosity of the slurry; and
differentially tuning the d50 particle size, the Hegman gauge, the viscosity, and a relative fraction of the solid ionically conductive polymer material and the one or more additives in an electrode layer and in a solid electrolyte layer;
wherein mixing includes mixing at a high shear and mixing at a low shear, where the low shear is between 10 and 55 rpm.

15. The slurry of claim 14, wherein the slurry has a d10 particle size of less than 1 µm, a d90 particle size of less than 60 µm, and a d99 particle size of less than 140 µm.

16. A coated hybrid electrode, comprising:
an anode current collector;
a cathode current collector;
an anode material coating;
a cathode material coating; and
a solid polymer electrolyte coating formed as a separator;
wherein the solid polymer electrolyte coating is disposed between the anode material coating and the cathode material coating;
wherein the solid polymer electrolyte coating has a different composition in a first region adjacent to the cathode material coating than in a second region adjacent to the anode material coating; and
wherein the anode material coating, the cathode material coating, and the solid polymer electrolyte coating are respectively formed from a first slurry, a second slurry, and a third slurry, where each of the first slurry, the second slurry, and the third slurry are formed by:
dividing a solvent into portions;
in accordance with a step ordering, first mixing a solid ionically conductive polymer material having an ionic conductivity greater than $1 \times 10^{-5}$ S/cm at room temperature, and where the solid ionically conductive polymer material is in a glass state at room temperature, in a first portion of the solvent to form a suspension;
second mixing an additive in the suspension;
following the mixing the additive in the suspension, third mixing a second portion of the solvent with the suspension to form a composition having a solid content between 25 and 80 wt. %;
influencing based on the first mixing, the second mixing, and the third mixing a d50 particle size, Hegman gauge, and viscosity of the slurry, the slurry having a d50 particle size of less than 30 µm, a Hegman gauge of less than 90 µm, and a viscosity between 500 and 2800 cps at 85 Hz; and
differentially tuning the d50 particle size, the Hegman gauge, the viscosity, and a relative fraction of the solid ionically conductive polymer material and the additive in the first slurry, the second slurry, and the third slurry;
wherein mixing includes mixing at a high shear and mixing at a low shear, where the low shear is between 10 and 55 rpm.

17. The coated hybrid electrode of claim 16, wherein mixing includes simultaneously mixing with a multi-shaft mixer equipped with a high-shear disperser and one of a low-shear anchor agitator or a low-shear helical-shaped paddle.

18. The coated hybrid electrode of claim 16, wherein an adhesion interface is defined between the solid polymer electrolyte coating and one of the anode material coating deposited on the anode current collector and the cathode material coating deposited on the cathode current collector, the adhesion interface having a 180° peel strength of greater than 200 gf/in.

19. The coated hybrid electrode of claim 16, wherein the additive comprises one or more of an electrode active material, a binder, a surfactant, and an inorganic ceramic.

\* \* \* \* \*